United States Patent
Ganguly et al.

(10) Patent No.: US 12,288,566 B1
(45) Date of Patent: Apr. 29, 2025

(54) BEAMFORMING USING MULTIPLE SENSOR DATA

(71) Applicant: Amazon Technologies, Inc., Seattle, WA (US)

(72) Inventors: Anshuman Ganguly, Cambridge, MA (US); Srivatsan Kandadai, Danville, CA (US); Trausti Thor Kristjansson, San Jose, CA (US); Wontak Kim, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 17/849,823

(22) Filed: Jun. 27, 2022

(51) Int. Cl.
*G10L 21/0216* (2013.01)
*G10L 21/0264* (2013.01)
*G10L 25/51* (2013.01)
*G10L 25/78* (2013.01)

(52) U.S. Cl.
CPC ...... *G10L 21/0216* (2013.01); *G10L 21/0264* (2013.01); *G10L 25/51* (2013.01); *G10L 25/78* (2013.01); *G10L 2021/02166* (2013.01)

(58) Field of Classification Search
CPC .......................................... G10L 2021/02166
See application file for complete search history.

(56) References Cited

U.S. PATENT DOCUMENTS

| | | | |
|---|---|---|---|
| 9,330,673 B2 * | 5/2016 | Cho | H04R 29/005 |
| 9,432,768 B1 * | 8/2016 | O'Neill | H04R 3/005 |
| 10,019,996 B2 * | 7/2018 | Wang | G10L 15/22 |
| 10,178,301 B1 * | 1/2019 | Welbourne | G06V 40/172 |
| 10,937,418 B1 | 3/2021 | Chatlani et al. | |
| 2010/0128892 A1 * | 5/2010 | Chen | H04R 3/005 381/92 |
| 2014/0219471 A1 * | 8/2014 | Deshpande | H04R 3/005 381/92 |
| 2018/0232201 A1 | 8/2018 | Holtmann et al. | |
| 2019/0074991 A1 * | 3/2019 | Peterson | H04L 12/2829 |
| 2019/0108837 A1 * | 4/2019 | Christoph | G10L 15/22 |
| 2019/0179594 A1 * | 6/2019 | Alameh | G06F 3/167 |
| 2019/0198042 A1 * | 6/2019 | Cho | G10L 15/25 |
| 2019/0320260 A1 * | 10/2019 | Alders | G10L 21/0316 |
| 2019/0378530 A1 * | 12/2019 | Zhu | G10L 17/02 |
| 2021/0227383 A1 * | 7/2021 | Alameh | H04W 12/63 |
| 2021/0327447 A1 * | 10/2021 | Maeng | H04R 1/406 |
| 2022/0180887 A1 * | 6/2022 | Pirjanian | G06Q 10/10 |
| 2022/0405154 A1 * | 12/2022 | Kumar Agrawal | H04W 12/08 |
| 2023/0104070 A1 * | 4/2023 | Liu | H04R 1/326 381/92 |
| 2023/0164508 A1 * | 5/2023 | Shin | G06F 3/165 381/303 |

OTHER PUBLICATIONS

U.S. Non-Final Office Action issued on Mar. 19, 2025 for U.S. Appl. No. 17/849,864, filed Jun. 27, 2022.

\* cited by examiner

*Primary Examiner* — Shaun Roberts
(74) *Attorney, Agent, or Firm* — Pierce Atwood LLP

(57) ABSTRACT

A device capable of using data from multiple sensors to determine an estimated position/direction of a user with respect to the device. The device may use estimated position data, along with confidence data, that originated from a plurality of sensors to fuse the data to determine the user's estimated position and comprehensive confidence of the estimated position. The system may use the location information to perform beamforming/beam steering and/or other downstream operations using the comprehensive estimated position.

20 Claims, 36 Drawing Sheets

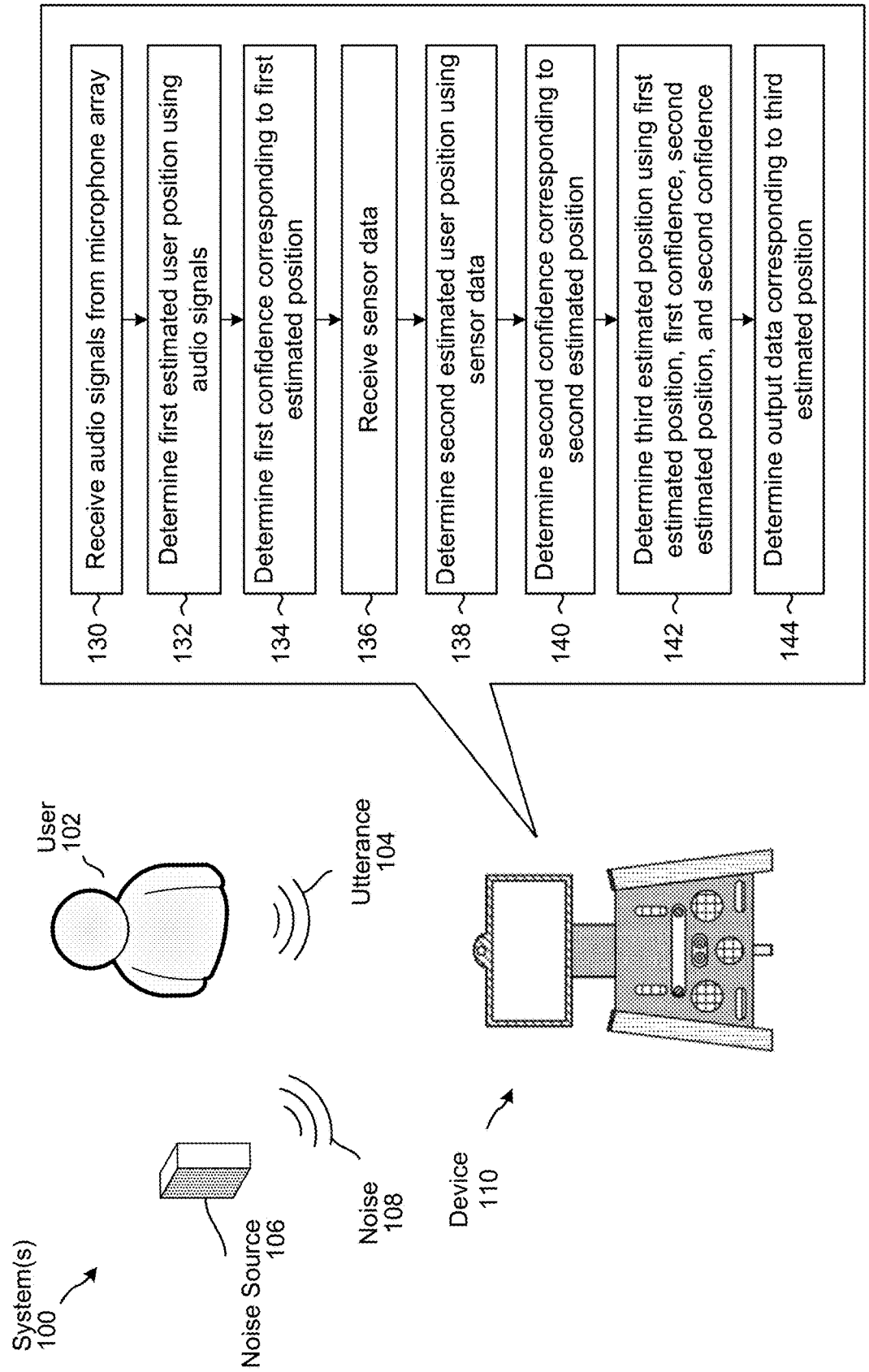

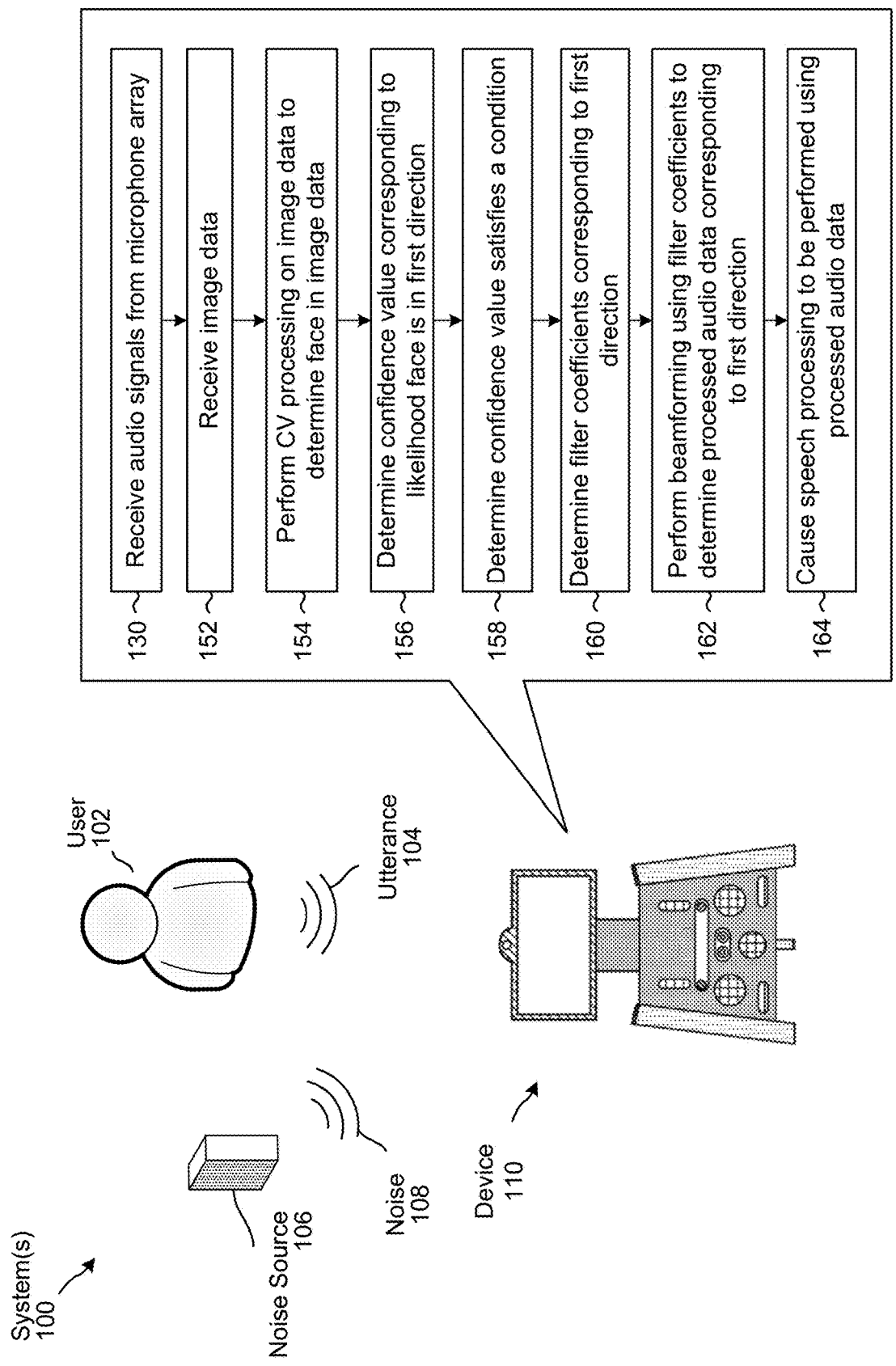

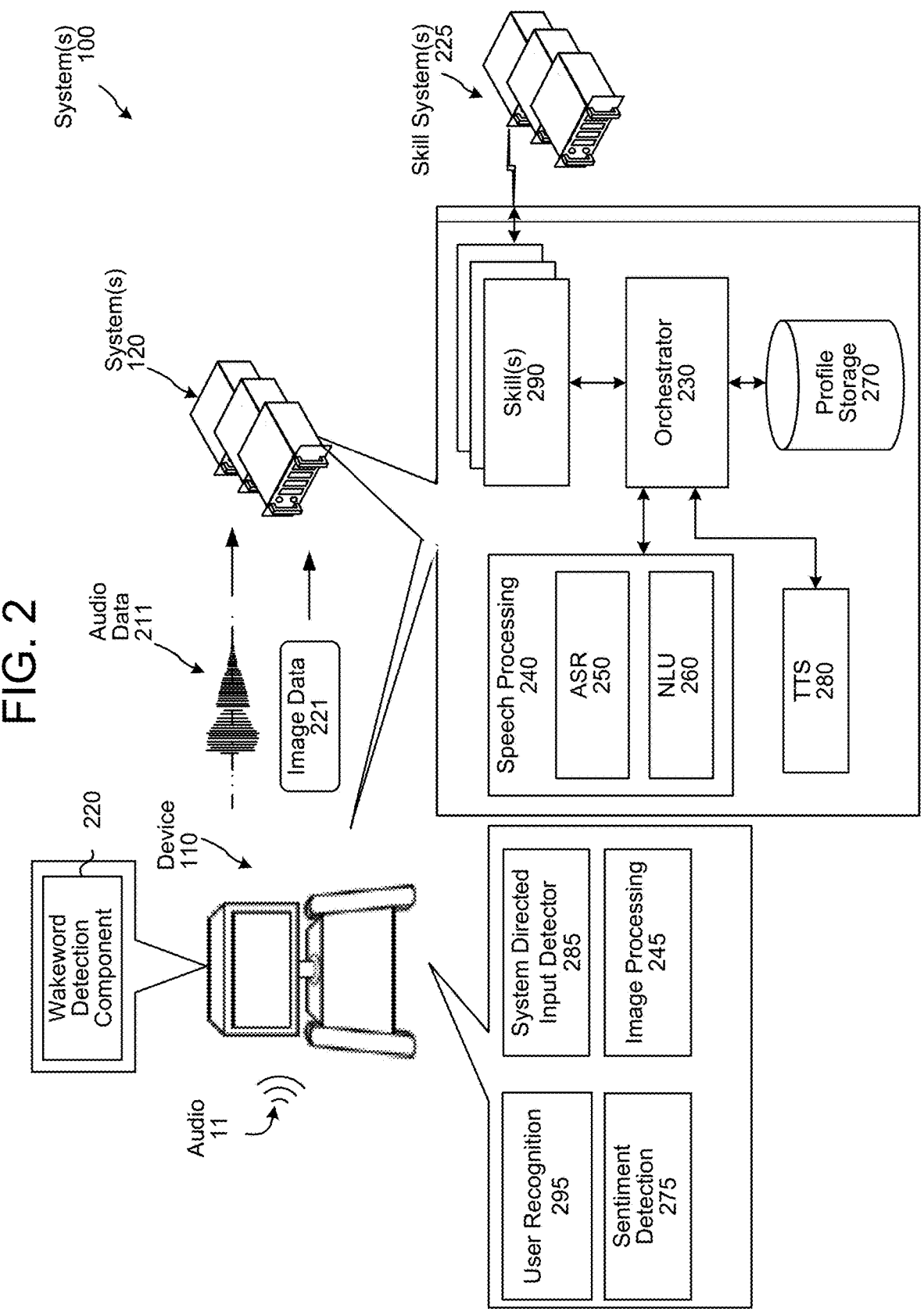

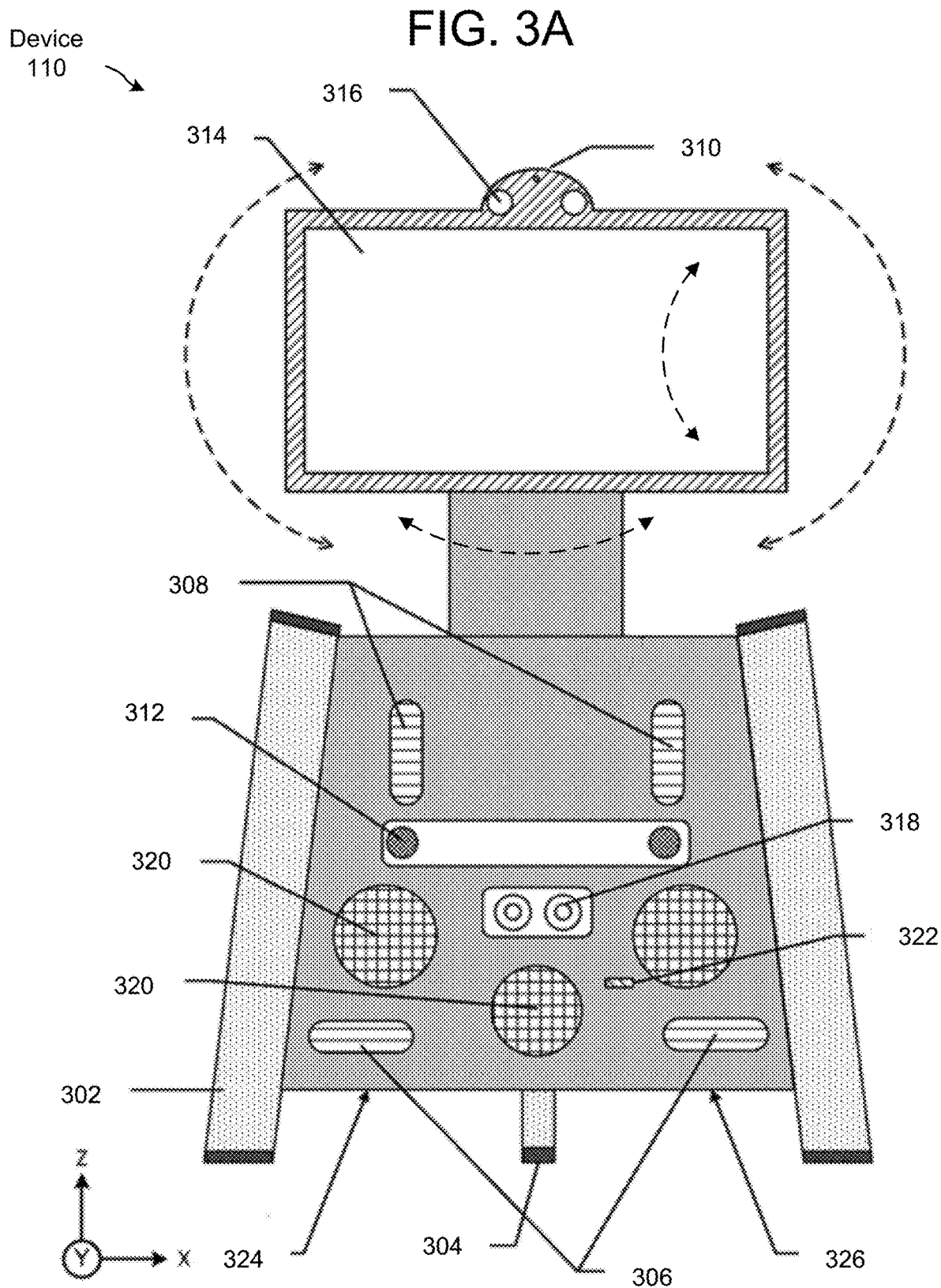

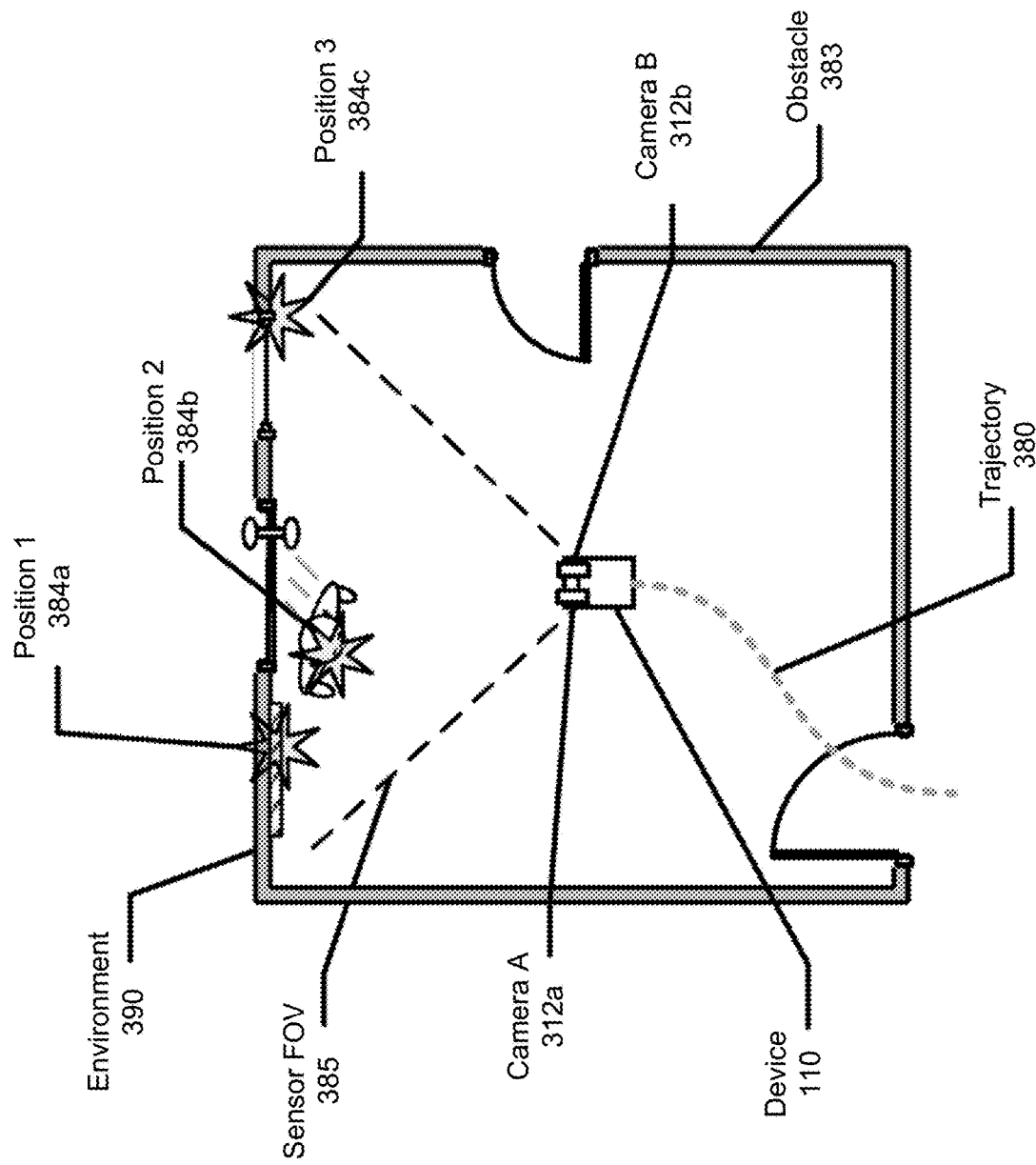

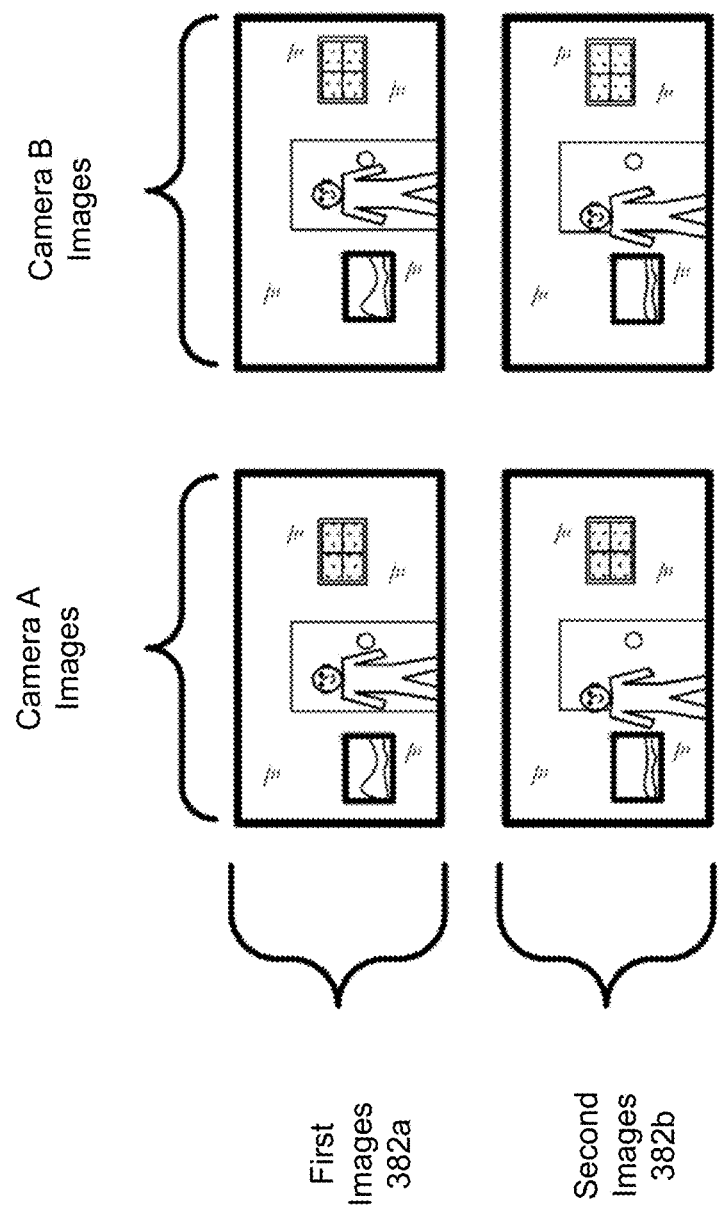

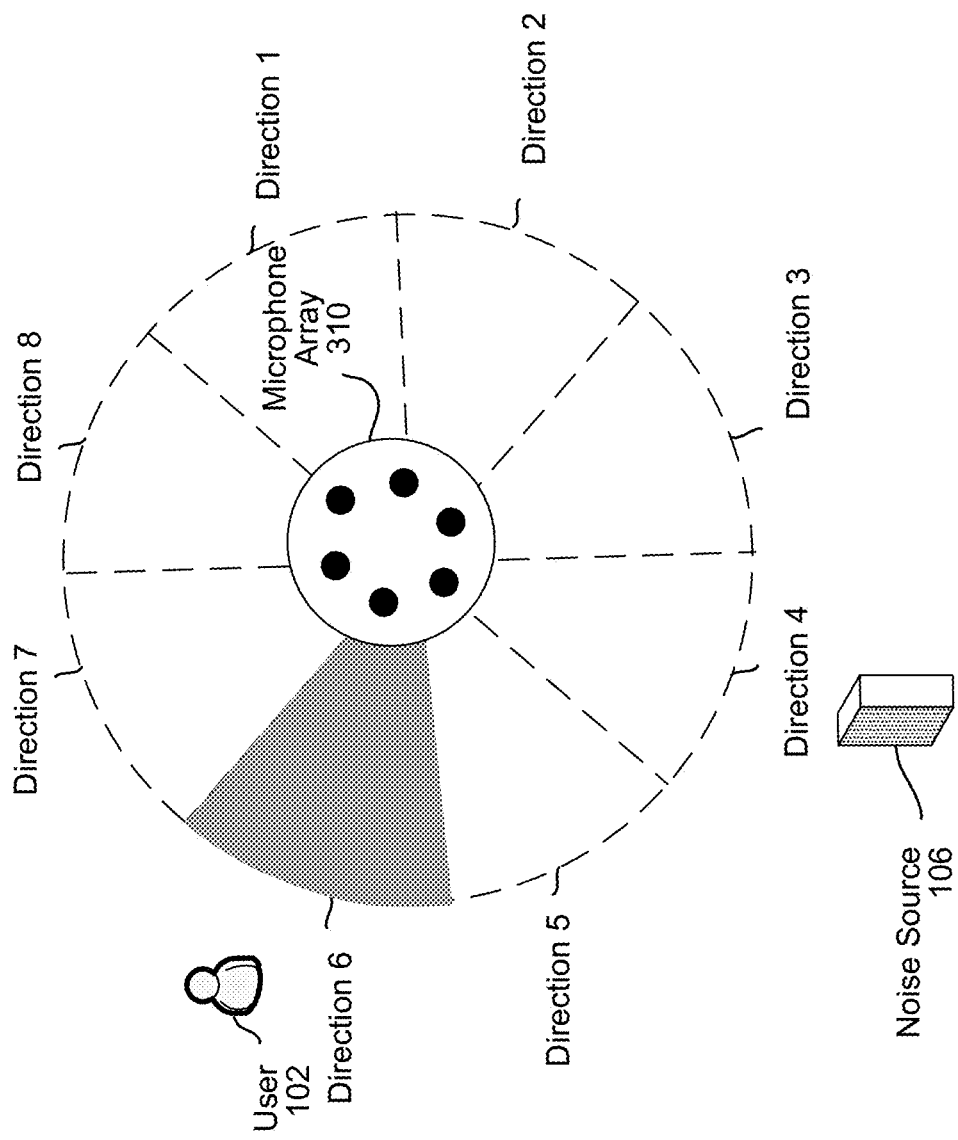

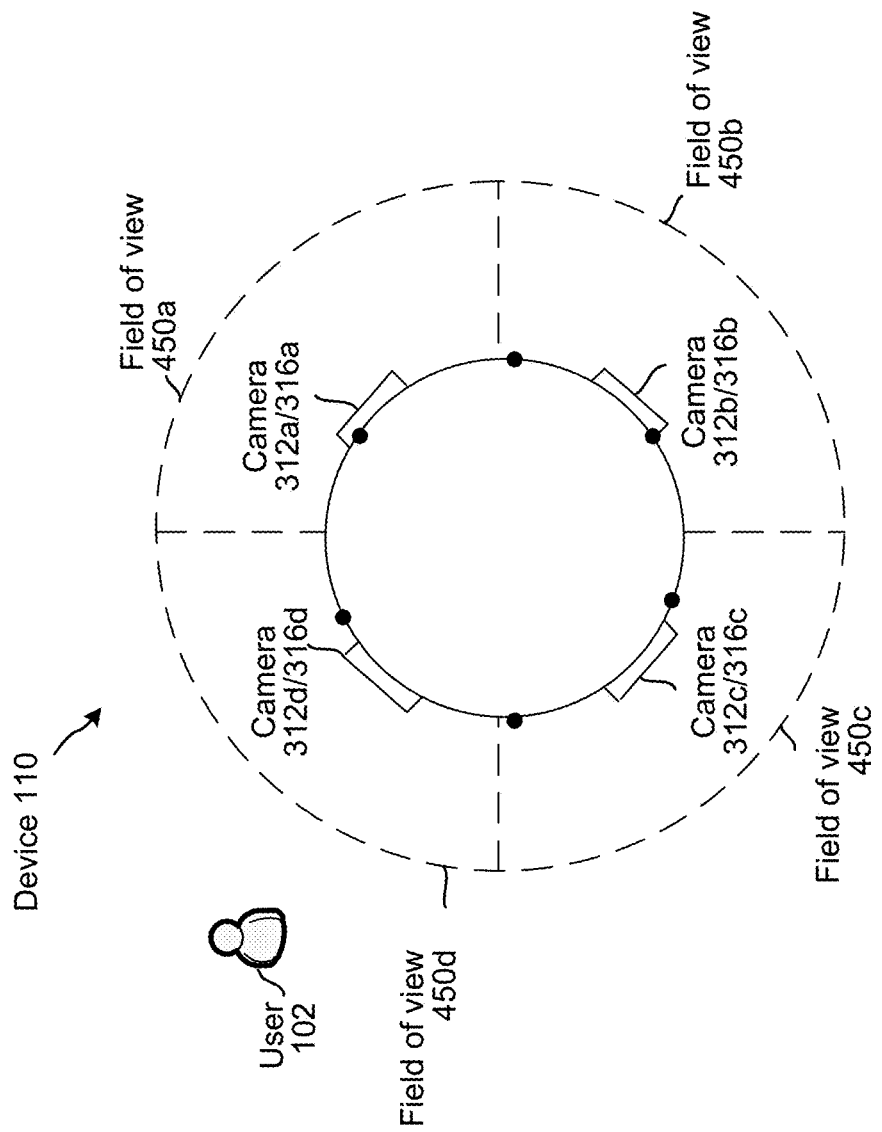

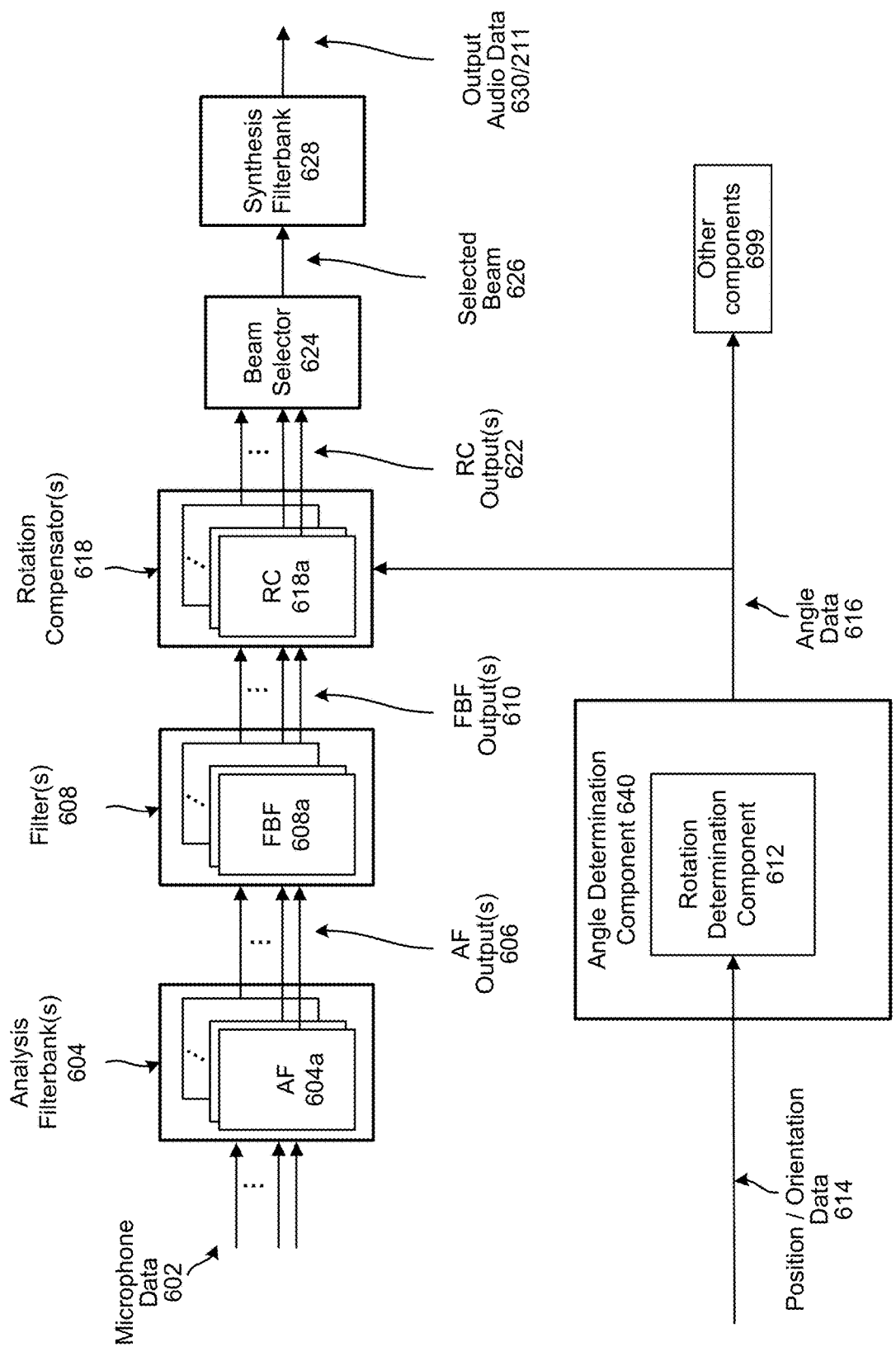

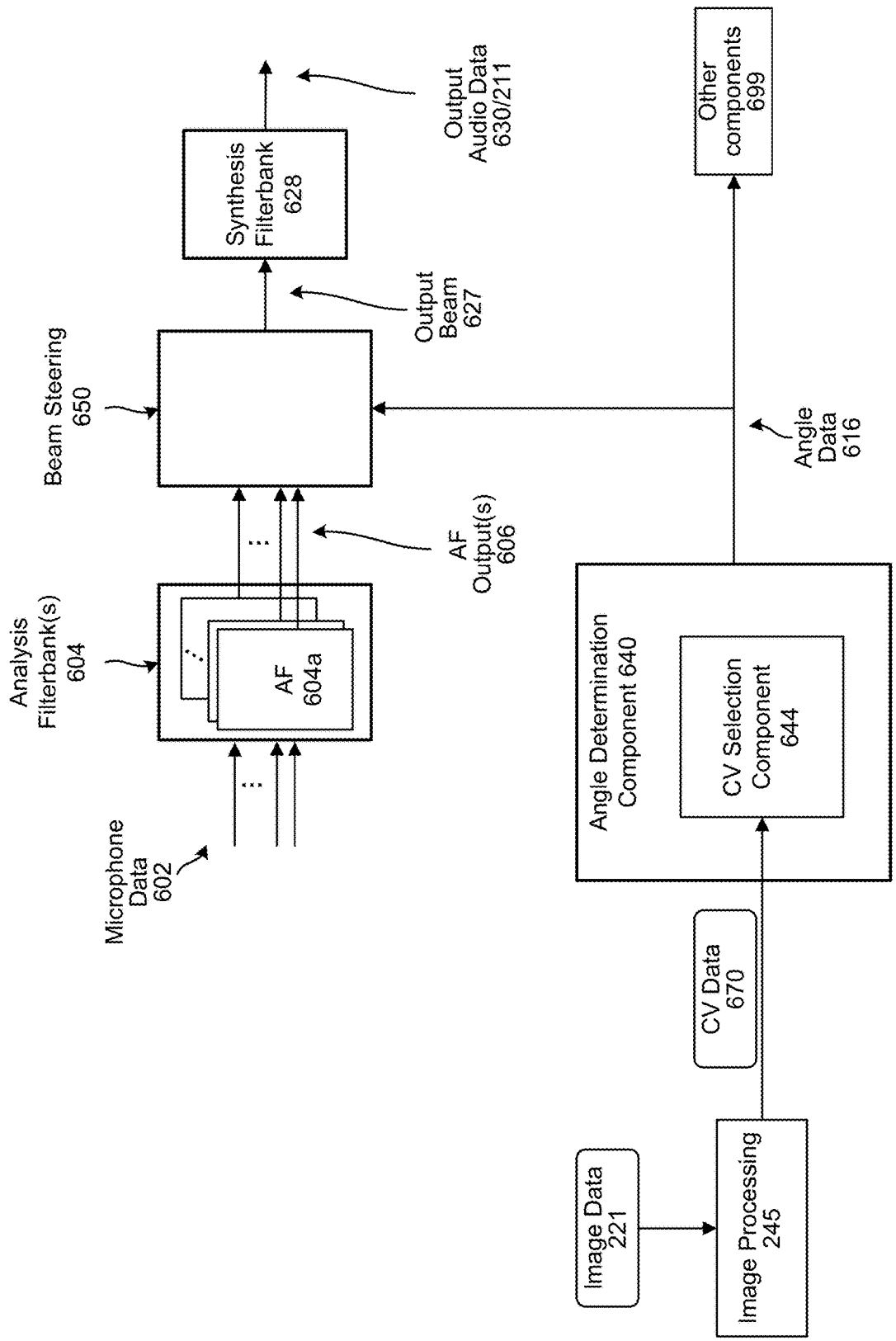

Fusing Angle Likelihoods $$C_{fus} = \sum_i \frac{1}{\sigma_i} \cos(\theta_i)$$

$$S_{fus} = \sum_i \frac{1}{\sigma_i} \sin(\theta_i)$$

$$\theta_{fus} = \tan^{-1} \frac{C_{fus}}{S_{fus}}$$

$$\kappa_{fus} = \sum_i \frac{1}{\sigma_i}$$

Tracking Angle - Random Walk Model

Prediction $$\theta_n = \theta_{n-1}$$

$$M_n = M_{n-1} + \sigma_{mod}$$

$$\kappa_n = \frac{M_n}{M_{n-1} + \sigma_{obs}}$$

Update $$C_n = \frac{1}{M_n}\cos\theta_n + \frac{1}{\sigma_{obs}}\cos\theta_{fus}$$

$$S_n = \frac{1}{M_n}\sin\theta_n + \frac{1}{\sigma_{obs}}\sin\theta_{fus}$$

$$\theta_n^* = \tan^{-1}\frac{C_n}{S_n},\ M_n^* = (1-\kappa_n)M_n$$

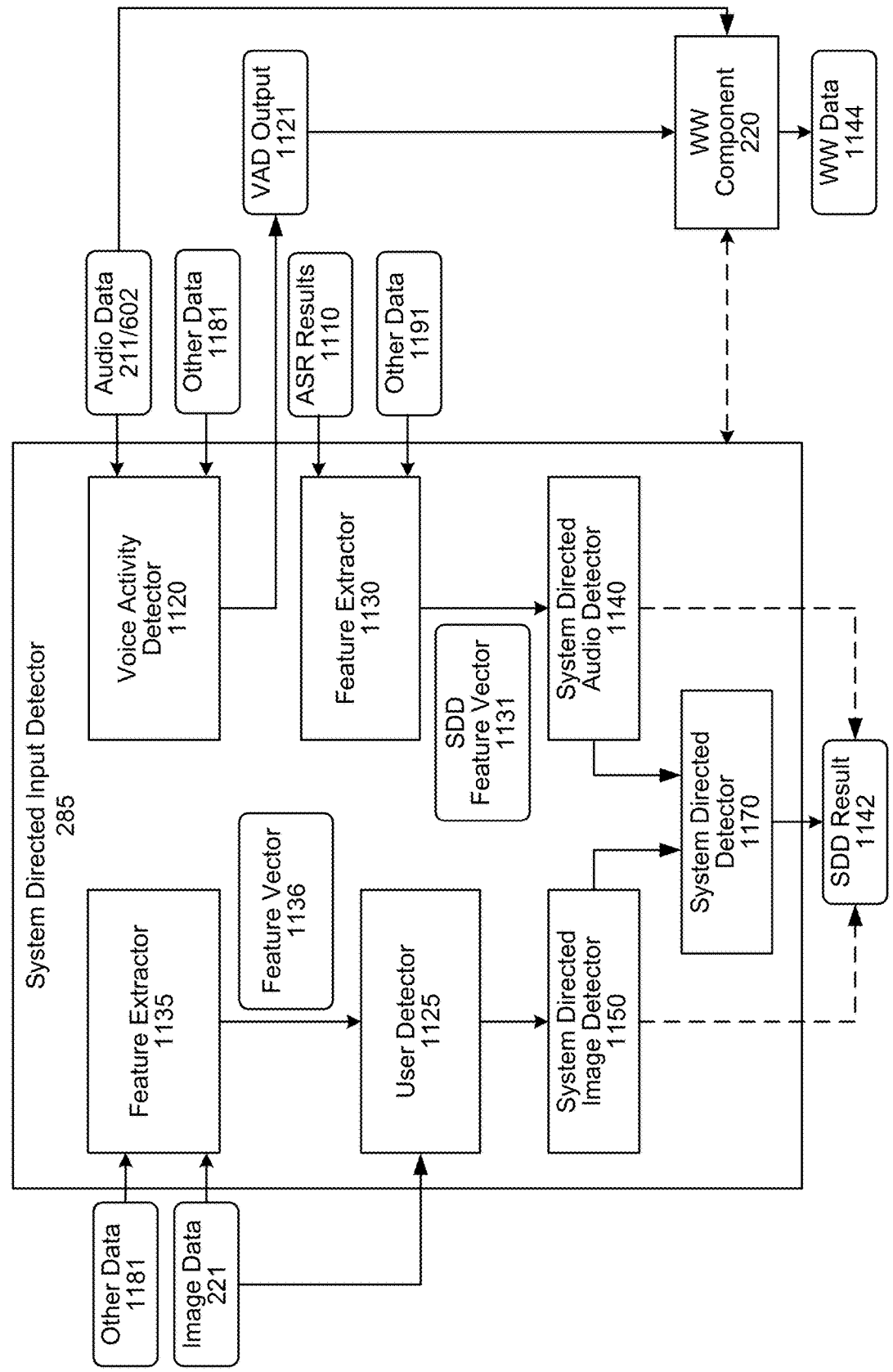

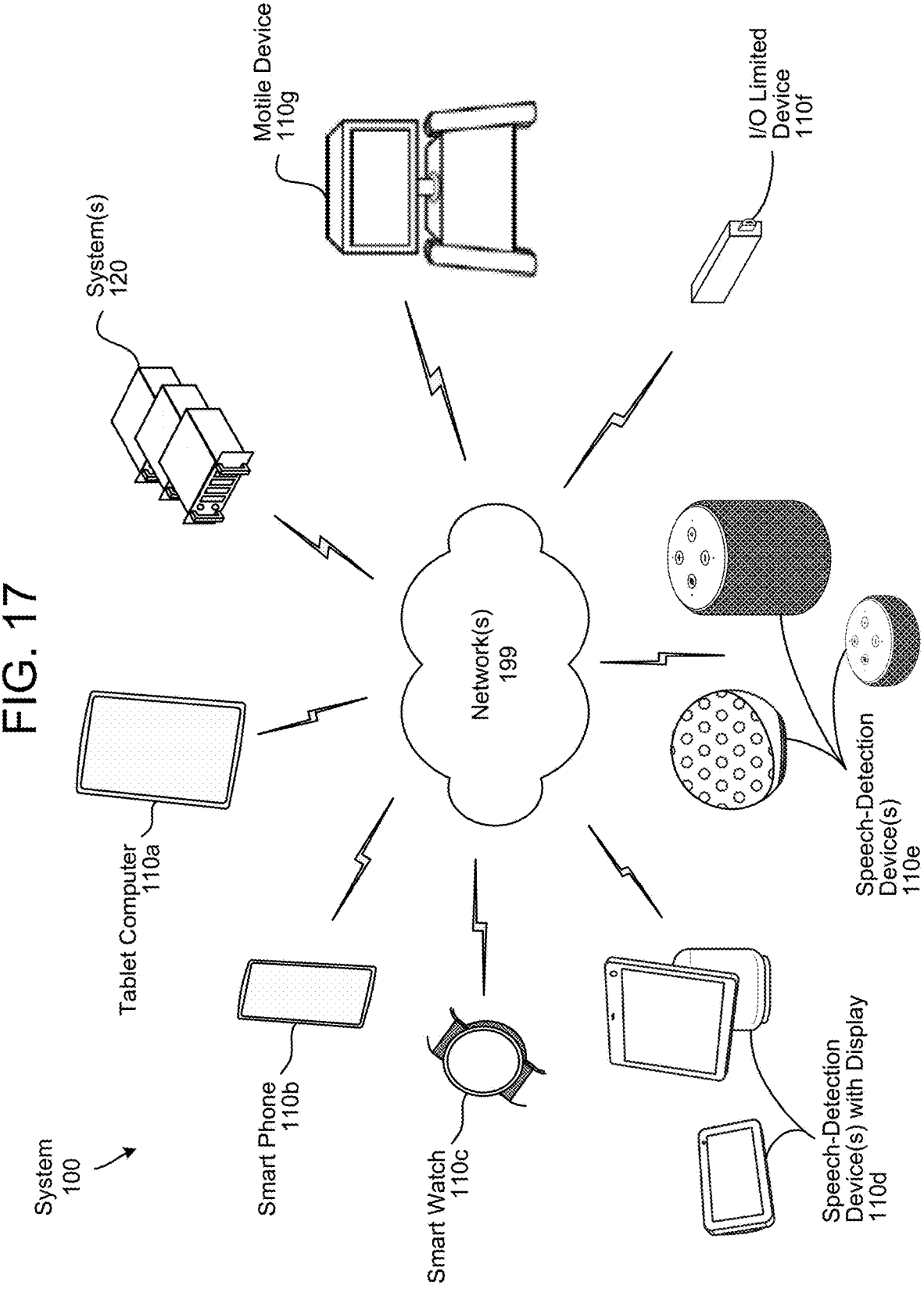

BEAMFORMING USING MULTIPLE SENSOR DATA

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 1A illustrates a system and method for estimating a user position using audio data, sensor data, and respective confidence information according to embodiments of the present disclosure.

FIG. 1B illustrates a system and method for estimating a user position using computer vision data for purposes of performing audio processing according to embodiments of the present disclosure.

FIG. 2 is a conceptual diagram of speech processing components of a system according to embodiments of the present disclosure.

FIGS. 3A, 3B, and 3C illustrate views of a voice-controlled device capable of autonomous motion according to embodiments of the present disclosure.

FIG. 3D illustrates a view of an autonomously motile device in an environment according to embodiments of the present disclosure.

FIGS. 3E and 3F illustrate images captured by an autonomously motile device in an environment according to embodiments of the present disclosure.

FIGS. 4F and 4G illustrate rotation of a voice-controlled device according to embodiments of the present disclosure.

FIG. 4H illustrates camera fields-of-view according to embodiments of the present disclosure.

FIG. 6A illustrates a system for rotating beams in accordance with a sensed rotation according to embodiments of the present disclosure.

FIG. 6C illustrates a system for performing beamforming and/or beam selection based on a location of a user according to embodiments of the present disclosure.

FIG. 11 is a conceptual diagram of components of a system to detect if input audio data includes system directed speech, according to embodiments of the present disclosure.

FIG. 17 illustrates an example of a computer network for use with the overall system according to embodiments of the present disclosure.

DETAILED DESCRIPTION

Figure 3B:
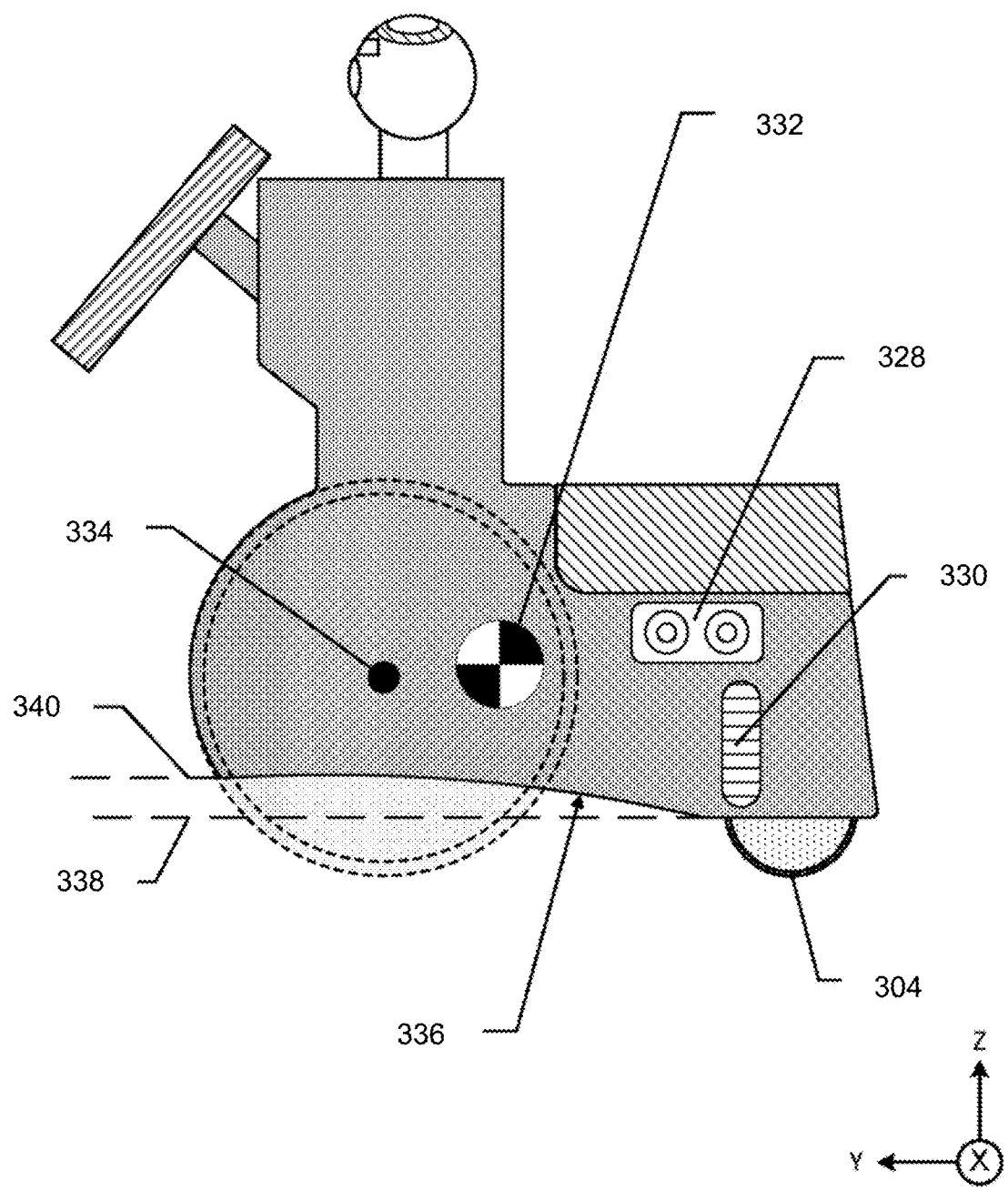

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

In audio systems, beamforming refers to techniques that are used to isolate audio from one or more particular directions. Beamforming may be particularly useful when filtering out noise from non-desired directions. Beamforming may be used for various tasks, including isolating voice commands to be executed by a speech-processing system.

Certain devices capable of capturing speech for speech processing may operate using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer unit employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may thus instead or in addition include an adaptive beamformer unit/noise canceller that may adaptively cancel noise from different directions depending on audio conditions.

Typically, beamforming is done by determining filter coefficient values (e.g., Finite Impulse Response (FTR) filter coefficient values) for each beam direction (e.g., look direction, direction of interest, etc.) based on a position of physical microphones in the microphone array 310. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

Certain traditional beamforming relies on audio data to determine what should be a target direction (sometimes called a look direction) for which a beam should be selected. For example, if a device is configured with a beamformer that may isolate audio corresponding to a number of different directions, a device may perform processing on beamformed (e.g., directional) audio data to determine a metric, such as an audio quality metric, to determine which beam to/direction to select. Such an audio quality metric may include, for example, signal-to-noise ratio (SNR), signal-to-interference-plus-noise ratio (SINR), or a number of other metrics. Thus a device may process beamformed audio data to select the "best" beam for purposes of downstream audio processing such as speech recognition, sending audio data over a voice call, or the like.

In cases where beam selection/beam steering decisions are made based on audio only, a device may mistake a noise source for a desired audio source, particularly if the audio sources sound the same. For example, if a device wishes to target a speaking user, it may accidentally select a beam in the direction of a television because the audio coming from that audio source sounds similar to a user speaking. Such issues may result in poor performance.

Offered are improved beam selection/beam steering techniques that take advantage of data available to a device in the form of multiple sensors which each may provide information as to the position of a target audio source. The device may use the position information from the sensors, along with confidence information related to that sensor data, to determine an estimated position that relies on multiple forms of sensor data beyond audio data alone. While such sensor data may include audio data it may also include other types of sensors such as image capture sensors (such as a camera that provides image data), a photodetector, a light detection and ranging (LIDAR) sensor, or the like. Such sensors may include, for example, sensors 1554 discussed below or other sensors whose data is available to a device. By using the estimated position data from such sensors, along with corresponding confidence data, the device may determine a more accurate estimated position of a user. Such a position may then be used for beamforming or other downstream processing purposes.

Further, a device may also use a single sensor/component for position estimation, particularly if the sensor/component has a high confidence of the user position. For example, a device may have a camera that captures image data. The device may also be equipped with components to perform computer-vision (CV) processing to identify a face in the image data. By identifying the face (and potentially if the face is speaking and/or matches a detected voice) the device may have a sufficiently high confidence that it may identify the user's position and use that position to perform beam steering. Such beam steering (such as that discussed herein) may be used in lieu of multi-directional beamforming, thus saving on computing resources to create beams that the device may not need. The device may thus use image data/CV processing to determine a position of a user with a sufficiently high confidence and may thus steer a beam in that direction, without performing beamforming for other directions. Thus the device may choose a correct spatial filter that can reject background noise and focus on target audio in a more efficient manner.

Other applications/variations of the system are described herein.

FIG. 1A illustrates a system that includes a device 110, which is described in greater detail below. The device 110 may include audio and image capture components, may include a variety of sensors, may be voice controlled and, in various embodiments, may be capable of autonomous movement/motion using one or motors powering one or more wheels, treads, robotic limbs, or similar actuators. The device 110 may, for example, follow a user 102 around a room to thereby allow the user 102 easier access to features of the device 110. The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance 104, from the user 102; the utterance may be, for example, a command or request. The device 110 may be used to output audio to the user 102, such as audio related to a command or audio related to a request. A nearby noise source 106 may output noise audio 108.

The device 110 may further include one or more sensors; these sensors may include, but are not limited to, an accelerometer, a gyroscope, a magnetic field sensor, an orientation sensor, a weight sensor, a temperature sensor, a location sensor (e.g., a global-positioning system (GPS) sensor or a Wi-Fi round-trip time sensor) and/or other sensor, such as those discussed herein. The device 110 may also include image capture components such as one or more camera(s), infrared sensor(s), LIDAR sensor(s), photodetector(s), proximity sensor(s), etc. The device 110 may further include a computer memory, a computer processor, and one or more network interfaces. The voice-controlled device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. For example, the device 110 may also include a tabletop device that has certain moving parts, such as a rotating screen such as that shown in device 110*d* as illustrated in FIG. 17. In other embodiments, the device 110 may be a smart speaker, smart phone, or other such device. The disclosure is not, however, limited to only these devices or components, and the voice-controlled device 110 may include additional components without departing from the disclosure.

In various embodiments, with reference to FIG. 1A, the device 110 receives (130) audio signals (e.g., 602 discussed below) from a microphone array, such as array 310 discussed below. The device 110 determines (132) a first estimated user position using the audio signals. This may include traditional audio-based user position estimation, such as determine a plurality of audio quality metrics based on post-beamforming audio data (e.g., data 606, 610, 622 discussed below) for different beam directions relative to the device 110, such as the directions discussed below, for example in reference to FIGS. 4C-4G. The device 110 may select a first estimated user position based on the processing of the audio data. The device 110 may also determine (134) a first confidence corresponding to that first estimated position. The first confidence may be based on variance data from multiple estimated positions, may be based on a score/confidence output by a machine learning model, or the like. The device 110 may also receive (136) sensor data. The sensor data may include data output from one or more sensors, such as sensors 1554 discussed below. The device 110 may determine (138) a second estimated user position using the sensor data.

The estimated user position (such as the first estimated user position, second estimated user position or other estimated user positions) may correspond to various position information such as an estimated azimuth angle/angle range of where a user 102 is relative to the device 110, an estimated elevation angle/angle range of where a user 102 is relative to the device 110, an estimated distance of a user 102 to the device 110, an xyz coordinate of the user 102 (for example relative to an environment), an xyz coordinate of the user 102 relative to the device 110, or the like.

The second estimated user position may be received from a sensor, from a component configured to operate on sensor data (e.g., a computer vision processing component such as image processing component 245 discussed herein), or other component. The device may also determine (140) a second confidence corresponding to the second estimated position. The second confidence may be based on variance data from multiple estimated positions, may be based on a score/confidence output by a machine learning model, or the like. The second confidence may be received along with sensor data, the second estimated user position, and/or other data, such as that received from a sensor, from a component configured to operate on sensor data, or other component. The device may 110 then determine (142) a third estimated position using the first estimated position, first confidence, second estimated position, and second confidence. For example, the device 110 may process the data using a component such as a sensor fusion component 642 discussed below in reference to FIGS. 6B and 7A-7B. The third estimated position may represent the device's 110 improved estimated position of the user as that estimated position accounts for the data captured by multiple components and their corresponding confidence information. The device 110 may then determine (144) output data corresponding to the third estimated position. This output data may include position/location information corresponding to the estimated position/location of user 102 (for example an indicated azimuth/azimuth range, elevation/elevation range, distance from the device 110, xyz position, or the like). The output data may also include a composite confidence corresponding to the third estimated position.

The output data may be sent to a downstream component that may then process information about the user's estimated position. For example, the output data may be sent to a user presence detection component to update presence information about the user 102. The output data may also be sent to a beamforming component, for example angle data 616 (discussed below) may be output to inform a rotation compensation component 618 and/or a beam steering component 650 (also discussed below) so that audio data may be isolated in the direction of the third estimated position for downstream purposes such as sending to a wakeword detection component (e.g., 220 discussed below), sending to a speech processing component (e.g., 240 discussed below), sent to a communication component for sending as part of a voice/video call, sending to a sentiment detection component (e.g., 275 discussed below) or the like. Other downstream components may also be sent the output position data, such as a system directed input detector (e.g., 285 discussed below) and/or other components.

In various embodiments, with reference to FIG. 1B, the device 110 may receive (130) audio signals (e.g., 602 discussed below) from a microphone array, such as array 310 discussed below. The device 110 receives (152) image data, such as image data captured by camera(s) 312/316 discussed below. The device 110 performs (154) CV processing on image data to determine a face is represented in the image data. For example, image data may be processed by image processing component 245/object detection component 930 to determine that image(s) captured by the device show a face. The device 110 may determine (156) a confidence value corresponding to a likelihood a face is in a first direction. For example, the device 110 may use information about camera position/field of view information (such as that discussed below in reference to FIG. 4H, and/or FIGS. 5A-5C) to determine an estimated position of the face and a corresponding confidence of the estimated position. The device 110 may determine (158) that the confidence satisfies a condition, for example the confidence value may be in a certain range, above a certain threshold, below a certain threshold, or the like. The condition may correspond to it being very likely that the user is at the estimated position, even without accounting for position information corresponding to data from other sensors, such as audio data, etc. The device may determine (160) filter coefficients corresponding to the first direction. This may be done by retrieving such filter coefficients from storage and/or by dynamically determining them based on information corresponding to the first position, similar to beam steering discussed below, for example in reference to rotation determination as discussed with regard to FIG. 6A. In response to the confidence value satisfying the condition, the device 110 may perform (162) beamforming using the filter coefficients (and/or other data related to the first position for beamforming purposes) to determine processed audio data corresponding to the first direction. This processed audio data (e.g., output audio data 630/211 as discussed herein) may correspond to a beam focused on the first direction relative to the device 110 as determined above. The device may then cause (164) speech processing to be performed using the processed audio data.

The different confidence values may depend upon environmental conditions experienced by the device. For example, in noisy conditions, confidence in position information based on audio data may be low. While in low light conditions, confidence in position information based on image data may be low. As can be appreciated, the device may operation in a variety of such conditions. By using sensor data and sensor confidence in the manner described herein, the device may adjust its performance to more appropriately match operating conditions to improve user position determination.

The device 110 may also determine output data corresponding to the first estimated position. This output data may include position/location information corresponding to the estimated position/location of user 102 (for example an indicated azimuth/azimuth range, elevation/elevation range, distance from the device 110, xyz position, or the like). The output data may also include a composite confidence corresponding to the first estimated position. As noted above, the output data may be sent a variety of different components.

For the operations of FIG. 1B, the device 110 may only perform beamforming to isolate a beam in the determine first direction and may forgo beamforming for other directions, as explained in further detail below in FIG. 6C. Thus, if the CV data (e.g., data 670 discussed below) indicates a first direction of a user with sufficient confidence, the system may save on computing resources that might otherwise have been spent performing beamforming for directions where the user may not even be located.

The 110 device may also use information about its own movements, such as its own rotation, for purposes of determining a user position/beam steering. In various embodiments, the device 110 determines an angle of rotation of the device 110. The device 110 determines first audio data corresponding to a first direction relative to the voice-controlled device and determines second audio data corresponding to a second direction relative to the voice-controlled device. The device generates first rotation-compensated audio data based at least in part on the angle and the first audio data and generates second rotation-compensated audio data based at least in part on the angle and the second audio data. The device 110 then outputs the first rotation-compensated audio data and the second rotation-compensated audio data (for, e.g., later automatic speech recognition (ASR), natural-language understanding (NLU), or other speech processing). The speech processing may be wholly or partially performed by the device 110 or by a remote device.

The overall system of the present disclosure may operate using various components as illustrated below. The various components may be located on same or different physical devices. Communication between various components may occur directly or across a network(s) 199.

As shown in FIG. 2, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa." While not illustrated in FIG. 2, in some examples the device 110 may detect wake gestures (e.g., hand motion, wave, etc.) using image data without departing from the disclosure.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120. In some embodiments, the device 110 may begin transmitting audio data 211 to system(s) 120 (or otherwise performing further processing on audio data) in response to an event occurring or an event being detected by the device 110.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 may perform speech processing to generate speech processing output data, which may be referred to as lexical data. In some examples, the lexical data may correspond to text data that includes text representing speech contained in the input audio data 211. However, the disclosure is not limited thereto and the lexical data may also correspond to token data that includes tokens that represent sounds, words, phrases, and/or the like corresponding to the speech. Thus, the lexical data may correspond to text data, token data, and/or other data known to one of skill in the art without departing from the disclosure. For ease of illustration, the disclosure may refer to the lexical data (e.g., speech processing output data) as text data, although the disclosure is not limited thereto.

To illustrate an example, the ASR component 250 may transcribe the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (e.g., lexical data, text data, etc.) and attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Mozart music," the NLU component 260 may determine an intent that the system(s) 120 output music and may identify "Mozart" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

The functionality described herein as a skill or skill component may be referred to using many different terms, such as an action, bot, app, application, speechlet or the like. A skill 290 may include hardware, software, firmware, or the like that may be dedicated to the particular skill 290 or shared among different skills 290. A skill 290 may be part of the system(s) 120 (as illustrated in FIG. 2) or may be located at whole (or in part) with one or more separate systems. Unless expressly stated otherwise, reference to a skill, skill device, or skill component may include a skill component operating within the system(s) 120 (for example as skill 290) and/or skill component operating within a system separate from the system(s) 120.

A skill 290 may be configured to perform one or more actions. A skill 290 may be enabled to execute specific functionality in order to provide data or produce some other output requested by a user. A particular skill component may be configured to execute more than one skill. For example, a weather skill may involve a weather skill component providing weather information to the system(s) 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, gaming skills, as well as custom skills that are not associated with any pre-configured type of skill.

In addition or alternatively to being implemented by the system(s) 120, a skill 290 may be implemented by a skill system(s) 225. Such may enable a skill system(s) 225 to execute specific functionality in order to provide data or perform some other action requested by a user.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110, the system(s) 120, and/or the skill system 225 may include profile storage 270 without departing from the disclosure. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like. The sentiment detection component 275 may be a separate component, as illustrated in FIG. 2, although the disclosure is not limited thereto and the sentiment detection component 275 may be included in other components without departing from the disclosure. The sentiment detection component 275 and other components are generally described as being operated by the device 110, as illustrated in FIG. 2. However, the system(s) 120 may also operate one or more of the components, including the sentiment detection component 275, without departing from the disclosure.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 13:
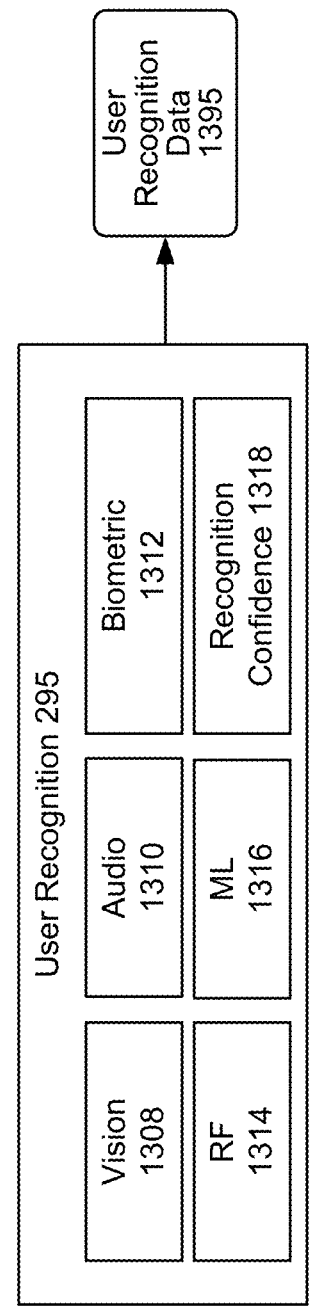
FIG. 13 is a schematic diagram of an illustrative architecture in which sensor data is combined to recognize one or more users according to embodiments of the present disclosure.

The device 110 may include a user recognition component 295 that recognizes one or more users using a variety of data, as described in greater detail below with regard to FIGS. 13-14. However, the disclosure is not limited thereto, and the system(s) 120 may include a user recognition component 295 instead of and/or in addition to the device 110 without departing from the disclosure.

While FIG. 2 illustrates the system(s) 120 including a speech processing component 240, the disclosure is not limited thereto and in some examples the device 110 may include a speech processing component 240 without departing from the disclosure. For example, the device 110 may perform basic speech processing locally, while the system(s) 120 may perform full speech processing remotely. However, the disclosure is not limited thereto and the device 110 may perform full speech processing locally without departing from the disclosure. As described above, the system(s) 120 may be located at a first location associated with the device 110 and/or a second location that is not associated with the device 110 without departing from the disclosure. For example, the system(s) 120 may be a home server or other device connected to the device 110 via a local area network (LAN) without departing from the disclosure. Thus, performing speech processing remotely refers to any speech processing that is not performed by the device 110, even if the speech processing is performed by a device/server in close proximity to the device 110.

Additionally or alternatively, one of skill in the art would understand that the speech processing component 240 may include a spoken language understanding (SLU) component, in addition to and/or instead of the ASR component 250 and/or the NLU component 260, without departing from the disclosure.

FIG. 3A illustrates a front view of the device 110 according to various embodiments of the present disclosure. In certain embodiments the device 110 may include a motile device capable of autonomous movement around an environment, or movement with limited instructions (e.g., "go to the living room," "come here," or the like) that require the device 110 to perform unsupervised operations to navigate an environment. The device 110 may include wheels 302 that are disposed on left and right sides of the device 110. The wheels 302 may be canted inwards toward an upper structure of the device 110. In other embodiments, however, the wheels 302 may be mounted vertically (e.g., not canted). A caster 304 (e.g., a smaller wheel) may disposed along a midline of the device 110. The front section of the device 110 may include a variety of external sensors. A first set of optical sensors 306, for example, may be disposed along the lower portion of the front of the device 110, and a second set of optical sensors 308 may be disposed along an upper portion of the front of the device 110. A microphone array 310 may be disposed on a top surface of the device 110; the microphone array 310 may, however, be disposed on any surface of the device 110.

One or more cameras 312 may be mounted to the front of the device 110; two cameras 312a/312b, for example, may be used to provide for stereo vision. The distance between the two cameras 312 may be, for example, 5-15 centimeters; in some embodiments, the distance is 10 centimeters. In some embodiments, the cameras 312 may exhibit a relatively wide horizontal field-of-view (HFOV). For example, the horizontal field-of-view (also discussed as 450 below in reference to FIGS. 4H and 5A-5C), may be between 90° and 110°. In other circumstances, the HFOV may be 360°, for example as a result of cameras 312 positioned around the device 110 to provide a HFOV of the entirety of the environment of the device. This may be accomplished with multiple cameras 312 having overlapping fields of view and/or with cameras 312 that are configurable to rotate to provide the 3600 HFOV. A relatively wide field-of-view may provide for easier detection of moving objects, such as users or pets, which may be in the path of the device 110. Also, the relatively wide field-of-view may provide for the device 110 to more easily detect objects when rotating or turning.

The cameras 312, which may be used for navigation, may be of different resolution from, or sensitive to different wavelengths than, other cameras used for other purposes, such as video communication. For example, the navigation cameras 312 may be sensitive to infrared light allowing the device 110 to operate in darkness or semi-darkness, while a camera 316 mounted above a display 314 may be sensitive to visible light and may be used to generate images suitable for viewing by a person. A navigation camera 312 may have a resolution of at least 300 kilopixels each, while the camera 316 mounted above the display 314 may have a resolution of at least 10 megapixels. In other implementations, navigation may utilize a single camera.

The cameras 312 may operate to provide stereo images of the environment, the user, or other objects. For example, an image from the camera 316 disposed above the display 314 may be accessed and used to generate stereo-image data corresponding to a face of a user. This stereo-image data may then be used for facial recognition, posture recognition, user identification, gesture recognition, gaze tracking, and other uses. In some implementations, a single camera 316 may be disposed above the display 314.

The display 314 may be mounted on a movable mount. The movable mount may allow the display to move along one or more degrees of freedom. For example, the display 314 may tilt, pan, change elevation, and/or rotate. In some embodiments, the display 314 may be approximately 20 centimeters as measured diagonally from one corner to another. An ultrasonic sensor 318 may be mounted on the front of the device 110 and may be used to provide sensor data that is indicative of objects in front of the device 110.

One or more loudspeakers 320 may be mounted on the device 110, and the loudspeakers 320 may have different audio properties. For example, low-range, mid-range, and/or high-range loudspeakers 320 may be mounted on the front of the device 110. The loudspeakers 320 may be used to provide audible output such as alerts, music, human speech such as during a communication session with another user, and so forth.

Other output devices 322, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors (FOMS) 324, 326 may be disposed on the underside of the device 110. The FOMS 324, 326 may provide indication indicative of motion of the device 110 relative to the floor or other surface underneath the device 110. In some embodiments, the floor optical-motion sensors 324, 326 comprise a light source, such as light-emitting diode (LED) and/or an array of photodiodes. In some implementations, the floor optical-motion sensors 324, 326 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 324, 326 may provide other information, such as data indicative of a pattern present on the floor, composition of the floor, color of the floor, and so forth. For example, the floor optical-motion sensors 324, 326 may utilize an optoelectronic sensor that may detect different colors or shades of gray, and this data may be used to generate floor characterization data.

FIG. 3B illustrates a side view of the device 110 according to various embodiments of the present disclosure. In this side view, the left side of the device 110 is illustrated. An ultrasonic sensor 328 and an optical sensor 330 may be disposed on either side of the device 110.

The disposition of components of the device 110 may be arranged such that a center of gravity (COG) 332 is located between a wheel axle 334 of the front wheels 302 and the caster 304. Such placement of the center of gravity 332 may result in improved stability of the device 110 and may also facilitate lifting by a carrying handle.

In this illustration, the caster 304 is shown in a trailing configuration, in which the caster 304 is located behind or aft of the wheel axle 334 and the center of gravity 332. In another implementation (not shown) the caster 304 may be in front of the axle of the wheels 302. For example, the caster 304 may be a leading caster 304 positioned forward of the center of gravity 332.

The device 110 may encounter a variety of different floor surfaces and transitions between different floor surfaces during the course of its operation. A contoured underbody 336 may transition from a first height 338 at the front of the device 110 to a second height 340 that is proximate to the caster 304. This curvature may provide a ramp effect such that, if the device 110 encounters an obstacle that is below the first height 338, the contoured underbody 336 helps direct the device 110 over the obstacle without lifting the driving wheels 302 from the floor.

Figure 3C:
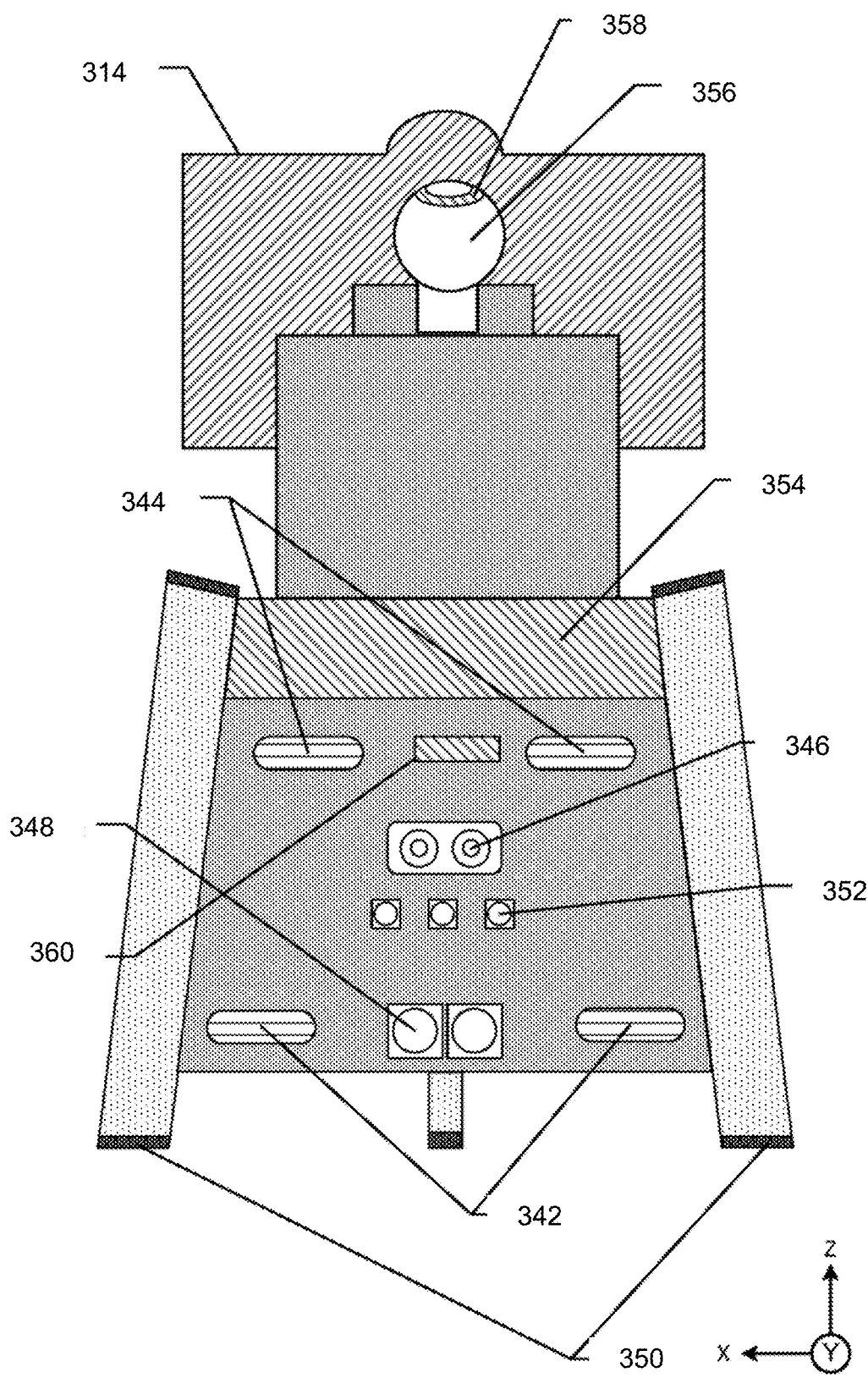

FIG. 3C illustrates a rear view of the device 110 according to various embodiments of the present disclosure. In this view, as with the front view, a first pair of optical sensors 342 may be located along the lower edge of the rear of the device 110, while a second pair of optical sensors 344 are located along an upper portion of the rear of the device 110. An ultrasonic sensor 346 may provide proximity detection for objects that are behind the device 110.

Charging contacts 348 may be provided on the rear of the device 110. The charging contacts 348 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 302 may include an electrically conductive portion 350 and provide an electrical conductive pathway between the device 110 and a charging source disposed on the floor. One or more data contacts 352 may be arranged along the back of the device 110. The data contacts 352 may be configured to establish contact with corresponding base data contacts within the docking station. The data contacts 352 may provide optical, electrical, or other connections suitable for the transfer of data.

Other output devices 360, such as one or more lights, may be disposed on an exterior of the back of the device 110. For example, a brake light may be arranged on the back surface of the device 110 to provide users an indication that the device 110 is slowing or stopping.

The device 110 may include a modular payload bay 354. In some embodiments, the modular payload bay 354 is located within the lower structure. The modular payload bay 354 may provide mechanical and/or electrical connectivity with the device 110. For example, the modular payload bay 354 may include one or more engagement features such as slots, cams, ridges, magnets, bolts, and so forth that are used to mechanically secure an accessory within the modular payload bay 354. In some embodiments, the modular payload bay 354 includes walls within which the accessory may sit. In other embodiments, the modular payload bay 354 may include other mechanical engagement features such as slots into which the accessory may be slid and engage. The device 110 may further include a mast 356, which may include a light 358.

FIG. 3D illustrates a view of a motile device in an environment according to embodiments of the present disclosure. As shown in FIG. 3D, the motile device 110 may move in the environment 390. The motion of the motile device 110 may be described as a trajectory 380, as shown in FIG. 3D. In some implementations, the trajectory 380 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the motile device 110 to move from one location in the environment 390 to another. For example, a motor may be used to drive a wheel attached to a chassis of the motile device 110, which causes the motile device 110 to move. The motile device 110 may turn, move forward, move backward, and so forth. In another example, actuators may move legs allowing the motile device 110 to walk.

The motile device 110 may include one or more sensors. For example, the sensors may include a first camera 312a, a second camera 312b, an inertial measurement unit (IMU), microphones, time-of-flight (TOF) sensors, and so forth. The first camera 312a and the second camera 312b may be mounted to a common rigid structure that maintains a relative distance between the cameras 312a, 312b. An IMU may be attached to this common rigid structure, or one of the cameras affixed thereto. The first camera 312a and the second camera 312b may be arranged such that a sensor field-of-view 385 of the first camera 312a overlaps at least in part a sensor field-of-view of the second camera 312b.

The sensors may generate sensor data (which may be stored in storage). The sensor data may include audio data acquired by one or more microphones and/or image data acquired by the first camera 312a and/or the second camera 312b. As illustrated in FIG. 3E, a pair of images 382 may comprise image data from the first camera 312a and the second camera 312b that are acquired at the same time. For example, a first pair of images 382a may be acquired at time t_1 and a second pair of images 382b may be acquired at time t_2. Some or all of the image data and/or audio data may be sent to the user device 110 for output thereon, although the disclosure is not limited thereto.

During operation the device 110 may determine input data. The input data may include or be based at least in part on sensor data from the sensors onboard the device 110. In one implementation, a speech processing component (which may include speech-processing component(s) illustrated in FIG. 2) may process raw audio data obtained by a microphone on the device 110 and produce input data. For example, the user may say "Astro, come here" which may produce input data "come here". In another implementation, the input data may comprise information such as a command provided by another computing device, such as a smartphone or tablet computer.

A mapping component may determine a representation of the environment 390 that includes the obstacles 383 and their location in the environment 390. During operation the mapping component uses the sensor data from various sensors to determine information such as where the motile device 110 is, how far the motile device 110 has moved, the presence of obstacles 383, where those obstacles 383 are (in conjunction with image processing component 245), where a user is located (in conjunction with user recognition component 295), and so forth.

Figure 3F:
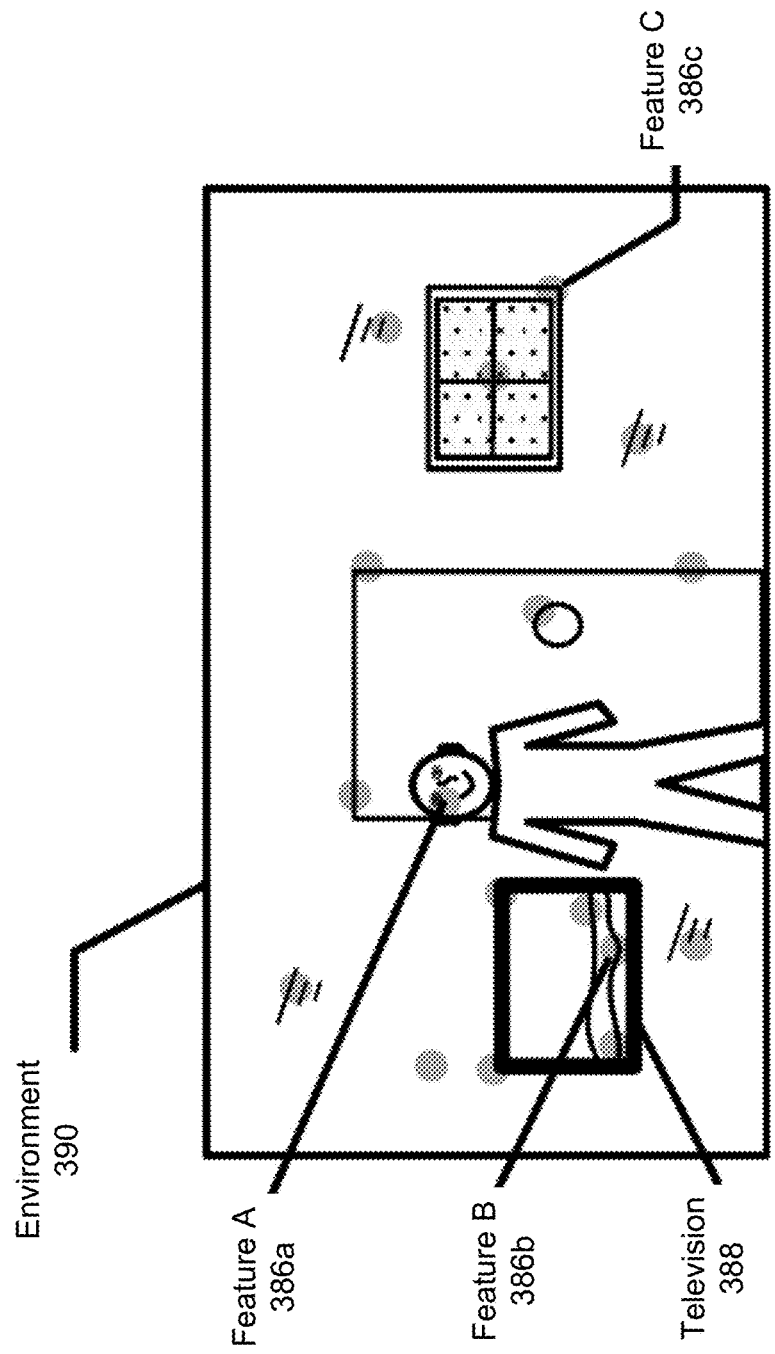

A feature module (for example, as part of image processing component 245) processes at least a portion of the image data to determine first feature data. The first feature data is indicative of one or more features 386 that are depicted in the image data. For example, as shown in FIG. 3F, the features 386 may be edges of doors, shadows on the wall, texture on the walls, portions of artwork in the environment 390, and so forth. The environment 390 may include display devices that are capable of changing the images they portray. For example, a television 388 may be presented in the environment 390. The picture presented by the television 388 may also have features 386.

Various techniques may be used by the image processing component 245 to determine the presence of features 386 in image data. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 386 in the image data. A feature 386 that has been detected may have an associated descriptor that characterizes that feature 386. The descriptor may comprise a vector value in some implementations. For example, the descriptor may comprise data indicative of the feature with respect to 256 different dimensions.

The first feature data may comprise information such the descriptor for the feature 386, the images that the feature 386 was detected in, location in the image data of the feature 386, and so forth. For example, the first feature data may indicate that in a first image the feature 386 is centered at row 994, column 312 in the first image. These data and operations, along with those discussed below, may be used by the device 110, and/or other devices, to perform the operations described herein.

Figure 4A:
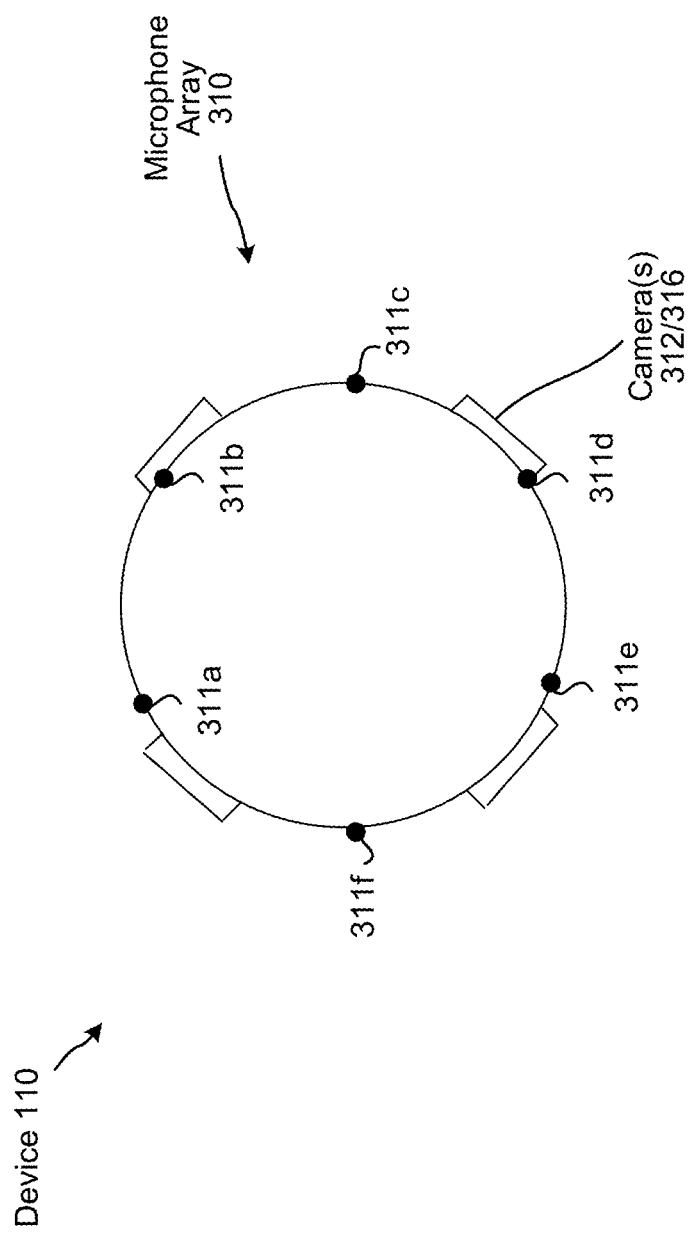
FIG. 4A illustrates a microphone array and camera configuration according to embodiments of the present disclosure.

FIG. 4A illustrates further details of the microphone array 310. In some embodiments, the microphone array 310 includes six microphones 311a, 311b, 311c, 311d, 311e, and 311f arranged in a circular pattern. The present disclosure is not, however limited to any particular number or arrangement of microphones.

The microphone array 310 may include a number of different individual microphones. The individual microphones may capture sound and pass the resulting audio signal created by the sound to a downstream component, as discussed below. Each individual piece of audio data captured by a microphone may be in the time domain. To isolate audio from a particular direction, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

The device 110 may also include camera(s) 312/316 arranged in a manner to capture different fields-of-view relative to the device 110. In certain embodiments image data captured by the camera(s) 312/316 (and/or data 1547 from other sensors 1554) may be used to assist with determining a desired direction for audio isolation/beamforming purposes. For example, in certain embodiments, techniques such as facial detection (e.g., determining that a face is detected in image data), facial recognition (determining the identity of a person whose face is detected), speaker recognition (determining the identity of a person who is speaking), etc. may be used to determine direction information that will assist in beamforming/beam steering to isolate audio from a direction in which a target user (e.g., a speaking user) is located.

As shown in FIG. 4A, microphones 311 may be laterally spaced from each other so that they can be used by audio beamforming components (such as those discussed herein) to produce directional audio signals. The microphones 311 may, in some instances, be dispersed around a perimeter of the device 110 in order to apply beampatterns to audio signals based on sound captured by the microphone(s) 311. In the illustrated embodiment, the microphones 311 are positioned at spaced intervals along a microphone array 310 of device 110, although the present disclosure is not limited thereto. In some examples, the microphone(s) 311 may be spaced between camera(s) 312/316 on a substantially vertical surface of a portion of the device 110, e.g., the top of an extensible mast or other component, or otherwise arranged on device 110. Each of the microphones 311 may be omnidirectional in the described embodiment, and beamforming technology is used to produce directional audio signals based on signals form the microphones 311. In other embodiments, the microphones may have directional audio reception, which may remove the need for subsequent beamforming.

In various embodiments, the microphone array 310 may include greater or less than the number of microphones shown. For example, an additional microphone may be located in the center of a surface and used in conjunction with peripheral microphones for producing directionally focused audio signals.

Using the microphone array 310 and the plurality of microphones 311 the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 110 may include an audio processing module that may include one or more audio beamformers or beamforming components that are configured to generate an audio signal that is focused in a direction from which user speech has been detected. More specifically, the beamforming components may be responsive to spatially separated microphone elements of the microphone array 310 to produce directional audio signals that emphasize sounds originating from different directions relative to the device 110, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 4B:
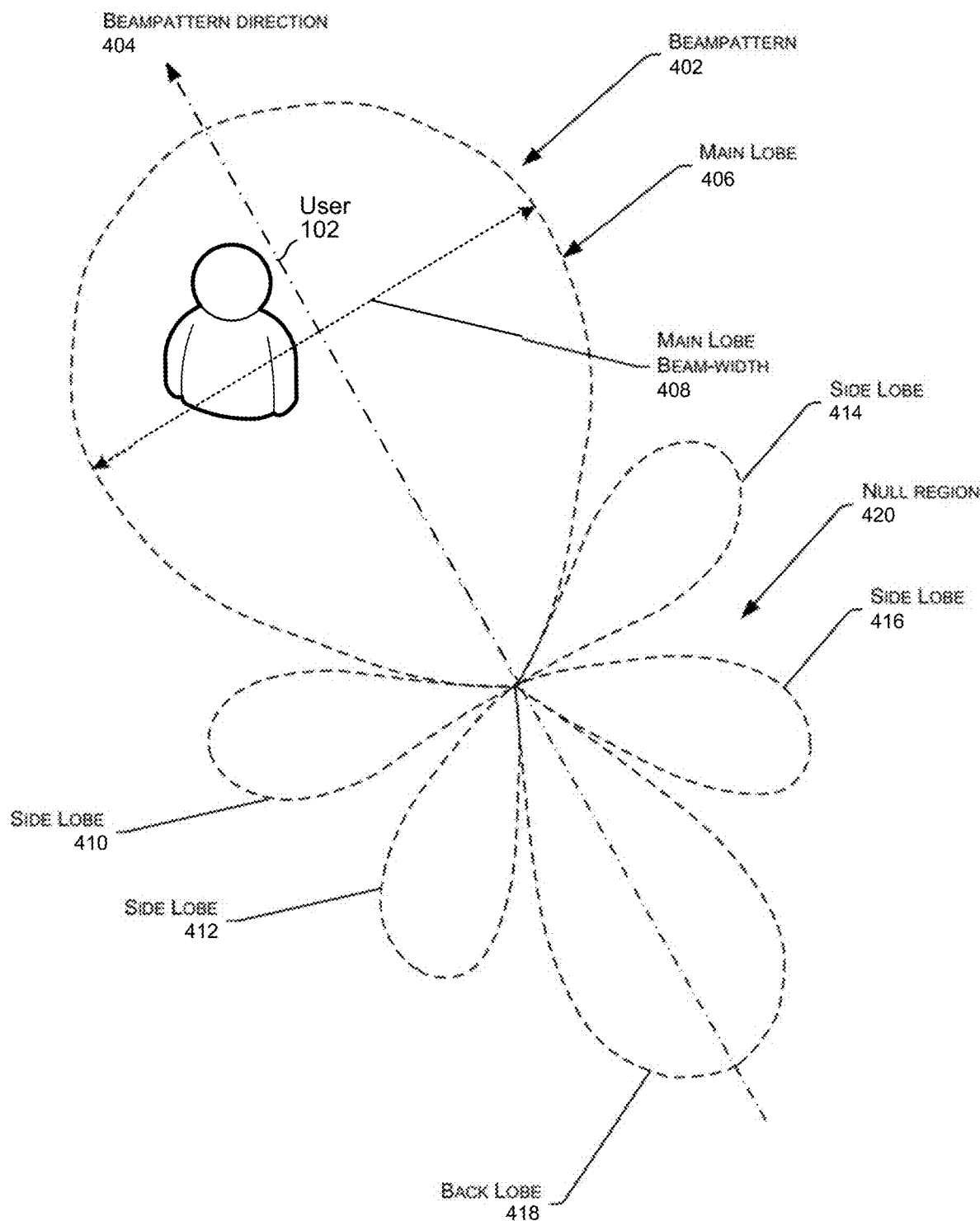
FIG. 4B is an illustration of beamforming according to embodiments of the present disclosure.

FIG. 4B is an illustration of beamforming according to embodiments of the present disclosure. FIG. 4B illustrates a schematic of a beampattern 402 formed by applying beamforming coefficients to signal data acquired from a microphone array of the device 110. As mentioned above, the beampattern 402 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 402 may exhibit a plurality of lobes, or regions of gain, with gain predominating in a particular direction designated the beampattern direction 404. A main lobe 406 is shown here extending along the beampattern direction 404. A main lobe beam-width 408 is shown, indicating a maximum width of the main lobe 406. In this example, the beampattern 402 also includes side lobes 410, 412, 414, and 416. Opposite the main lobe 406 along the beampattern direction 404 is the back lobe 418. Disposed around the beampattern 402 are null regions 420. These null regions are areas of attenuation to signals. In the example, the user 10 resides within the main lobe 406 and benefits from the gain provided by the beampattern 402 and exhibits an improved SNR ratio compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 110 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results. If the device moves, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the device 110 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

FIGS. 4C-4G illustrate various aspects of beamforming using the device 110 and the microphone array 310. Such beamforming may be performed, for example, by fixed beamformers (FBF) 608 discussed below in reference to FIGS. 6A-6B. As discussed above, the device 110 may perform beamforming (e.g., perform a beamforming operation to generate beamformed audio data corresponding to different directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficient values associated with specific directions. For example, the device 110 may perform a first directional calculation by applying first filter coefficient values to the input audio signals to generate the first beamformed audio data and may perform a second directional calculation by applying second filter coefficient values to the input audio signals to generate the second beamformed audio data.

The filter coefficient values used to perform the beamforming operation may be calculated offline (e.g., preconfigured ahead of time) and stored in the device 110. For example, the device 110 may store filter coefficient values associated with hundreds of different directional calculations (e.g., hundreds of specific directions) and may select the desired filter coefficient values for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficient values) being referred to as a "first beam" corresponding to the first direction, the second directional calculation (e.g., second filter coefficient values) being referred to as a "second beam" corresponding to the second direction, and so on. Thus, the device 110 stores hundreds of "beams" (e.g., directional calculations and associated filter coefficient values) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficient values used to generate the first beam.

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal quality values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

In some examples, some or all of the above steps may be performed in the time domain. For example, the device 110 may apply filter coefficient values g(t) in the time domain to the input audio data to generate the beamforming data and may perform acoustic echo cancellation in the time domain. The present disclosure is not, however limited thereto. Instead or in addition, the device 110 may receive first input audio data in the time domain and may perform a transform, such as a Fast Fourier Transform (FFT), on the first input audio data to generate second input audio data in the frequency domain. The device 110 may then apply filter coefficient values g(ω) in the frequency domain to the second input audio data to generate the LCB audio data and may perform acoustic echo cancellation in the frequency domain to generate first modified input audio data. The device 110 may perform an inverse transform, such as an Inverse Fast Fourier Transform (IFFT), on the first modified input audio data to generate second modified input audio data in the time domain. Thus, the device 110 performs beamforming and/or acoustic echo cancellation in the time domain and/or the frequency domain without departing from the disclosure. Additionally or alternatively, the device 110 may perform acoustic echo cancellation in a subband domain without departing from the disclosure. For example, the device 110 may separate different frequency ranges (e.g., subbands) and may perform acoustic echo cancellation differently for each frequency range without departing from the disclosure.

The device 110 may beamform the input audio data into a plurality of beams (e.g., perform a beamforming operation to generate one or more items of processed audio data corresponding to one or more directions). As used herein, the term beam may refer to particular audio data corresponding to the modified input audio data that was captured by the microphone array, where the particular audio data of a beam corresponds to a particular direction. Thus, each beam may include audio data corresponding to a particular direction relative to the device 110. A beamforming unit or component of the device 110 (such as an adaptive beamformer) may divide the modified input audio data into different beams of audio data, each corresponding to a direction.

In various embodiments, beamforming is performed using a minimum-variance distortionless-response (MVDR) beamformer. A MVDR beamformer may apply filter coefficients, or "weights" w to the frequency-domain signal in accordance with the following equation:

$$w = \frac{Q^{-1}d}{d^H Q^{-1}d} \quad (1)$$

In Equation (1), Q is the covariance matrix and may correspond to the cross-power spectral density (CPSD) of a noise field surrounding the device 110, and d is a steering vector that corresponds to a transfer function between the device 110 and a target source of sound located at a distance (e.g., two meters) from the device 110. The covariance matrix may define the spatial relationships between the microphones; this covariance matrix may include a number of covariance values corresponding to each pair of microphones. The covariance matrix is a matrix whose covariance value in the i, j position represents the covariance between the $i^{th}$ and $j^{th}$ elements of the microphone arrays. If the greater values of one variable mainly vary with the greater values of the other variable, and the same holds for the lesser values, (i.e., the variables tend to show similar behavior), the covariance is positive. In the opposite case, when the greater values of one variable mainly vary to the lesser values of the other, (i.e., the variables tend to show opposite behavior), the covariance is negative. In some embodiments, the covariance matrix is a spatial covariance matrix (SCM).

For example, a covariance value corresponding to the second row and third column of the matrix corresponds to the relationship between second and third microphones. In various embodiments, the values of the diagonal of the covariance matrix differ for the first and second microphone arrays; the covariance values of the diagonal corresponding to the first microphone may, for example, be greater than the covariance values of the diagonal corresponding to the second microphone. When input audio is processed with the covariance matrix, an utterance from an azimuth direction and/or elevation is more clearly distinguished and better able to be processed with, for example, ASR or speech-to-text processing. As noted herein, azimuth may correspond to a horizontal angle relative to the device 110 (e.g., 0 to 360 degrees around the device), while elevation may refer to a vertical angle relative to the device 110 (e.g., 0 degrees pointed toward a floor up to 180 degrees pointed to a ceiling/sky).

In various embodiments, a different covariance matrix is determined for each of multiple frequency sub-bands. For example, a first covariance matrix is determined for frequencies between 20 Hz and 5 kHz; a second covariance matrix is determined for frequencies between 5 kHz and 10 kHz; a third covariance matrix is determined for frequencies between 10 kHz and 15 kHz; and a fourth covariance matrix is determined for frequencies between 15 kHz and 20 kHz. Any number of covariance matrices for any number or breakdown of frequency sub-bands is, however, within the scope of the present disclosure.

Figure 4C:
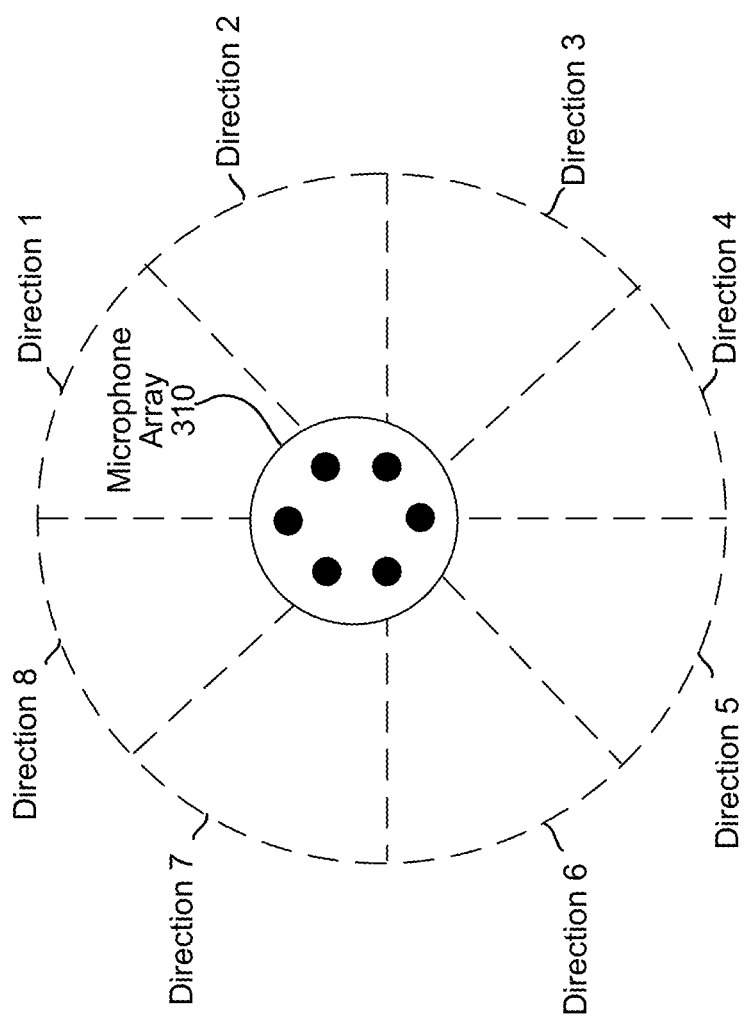
FIG. 4C illustrates associating directions with microphones of a microphone array according to embodiments of the present disclosure.

Using such direction isolation techniques, the device 110 may isolate directionality of audio sources. As shown in FIG. 4C, a number of different directions 1-8 may be isolated. Each direction may be associated with a particular microphone of the microphone array 310, where the azimuth angles for the plane of the microphone array may be divided into bins (e.g., 0-45 degrees, 46-90 degrees, and so forth) where each bin direction is associated with a microphone in the microphone array. For example, direction 1 may be associated with microphone 311*a*, direction 2 may be associated with microphone 311*b*, and so on. Alternatively, particular directions and/or beams may not necessarily be associated with a specific microphone. Thus, the present disclosure is not limited to any particular number of microphones or directions, and the number of microphones and directions may differ. As can be appreciated, different directions/beams may be associated with a particular azimuth range (e.g., direction 1 may correspond to azimuth angles 0-45, direction 2 may correspond to azimuth angles 46-90 degrees, and so forth). The device 110 may thus use azimuth ranges for purposes of beamforming operations. In addition and/or in the alternative the device 110 may use a specific azimuth angle (e.g., 73 degrees or some other example) for purposes of beamforming operations to isolate audio associated with the desired position/direction/azimuth angle (e.g., 73 degrees) relative to the device and associated with a target audio source such as a speaking user or other target.

To isolate audio from a particular direction the device 110 may apply a variety of audio filters to the output of the microphones 311*a-f* where certain audio is boosted while other audio is dampened, to thereby create isolated audio corresponding to a particular direction 1-8, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit and/or a fixed beamformer (FBF) unit processing pipeline for each beam.

The device 110 may use various techniques to determine the beam corresponding to the look direction. If audio is detected first by a particular microphone the device 110 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

Figure 4D:
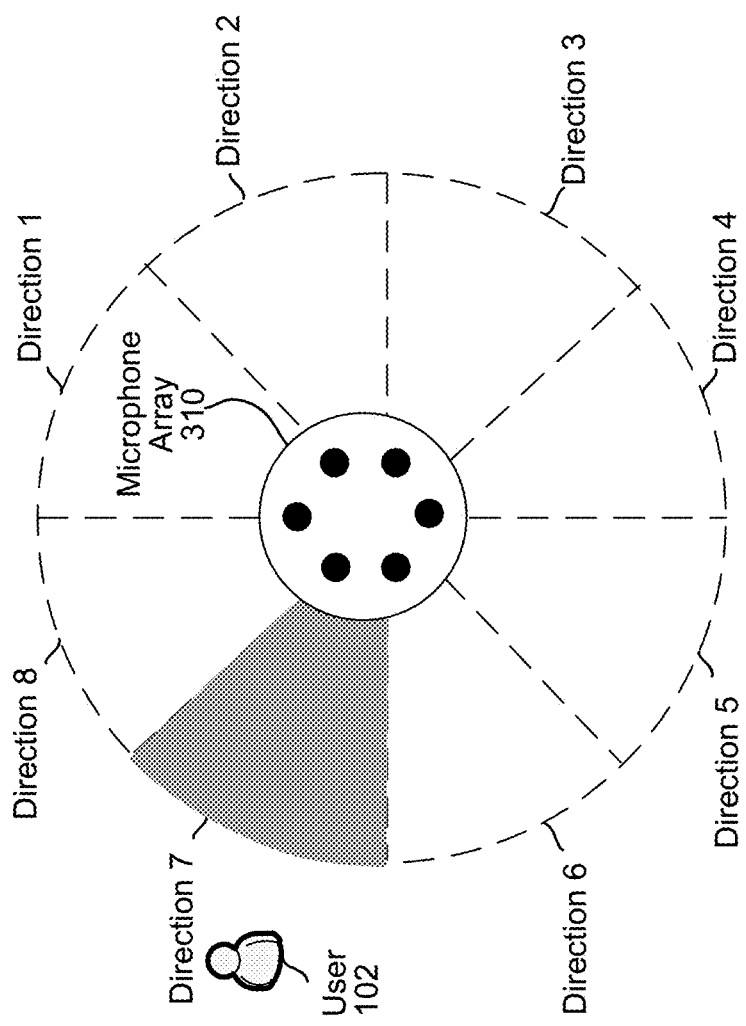
FIGS. 4D and 4E illustrate isolating audio from a direction to focus on a desired audio source according to embodiments of the present disclosure.

For example, the device may determine that the user is located in a location in direction 7. Using a fixed beamformer unit or other such component, the device may isolate audio coming from direction 7 using techniques known to the art and/or explained herein. Thus, as shown in FIG. 4D, the device 110 may boost audio coming from direction 7, thus increasing the amplitude of audio data corresponding to speech from user 102 relative to other audio captured from other directions. In this manner, noise from diffuse sources that is coming from all the other directions will be dampened relative to the desired audio (e.g., speech from user 102) coming from direction 7.

Figure 4E:
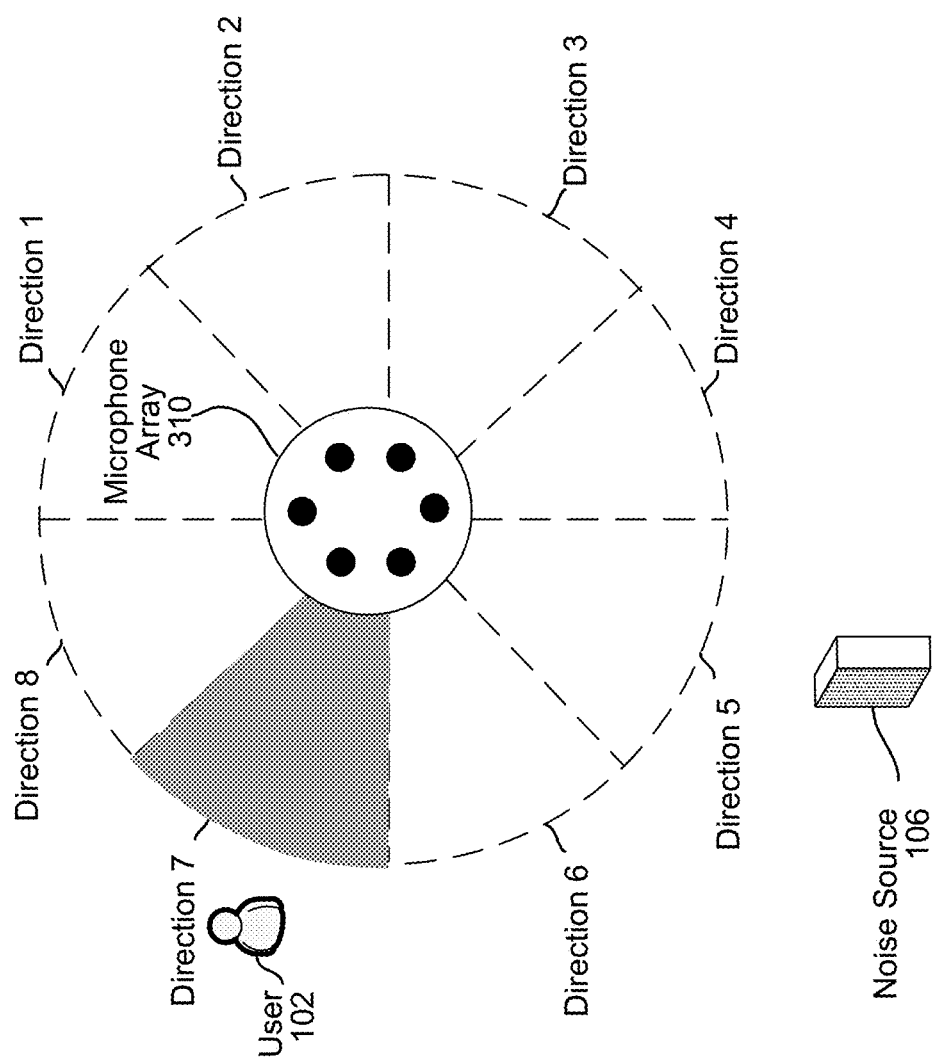
Figure 4F:
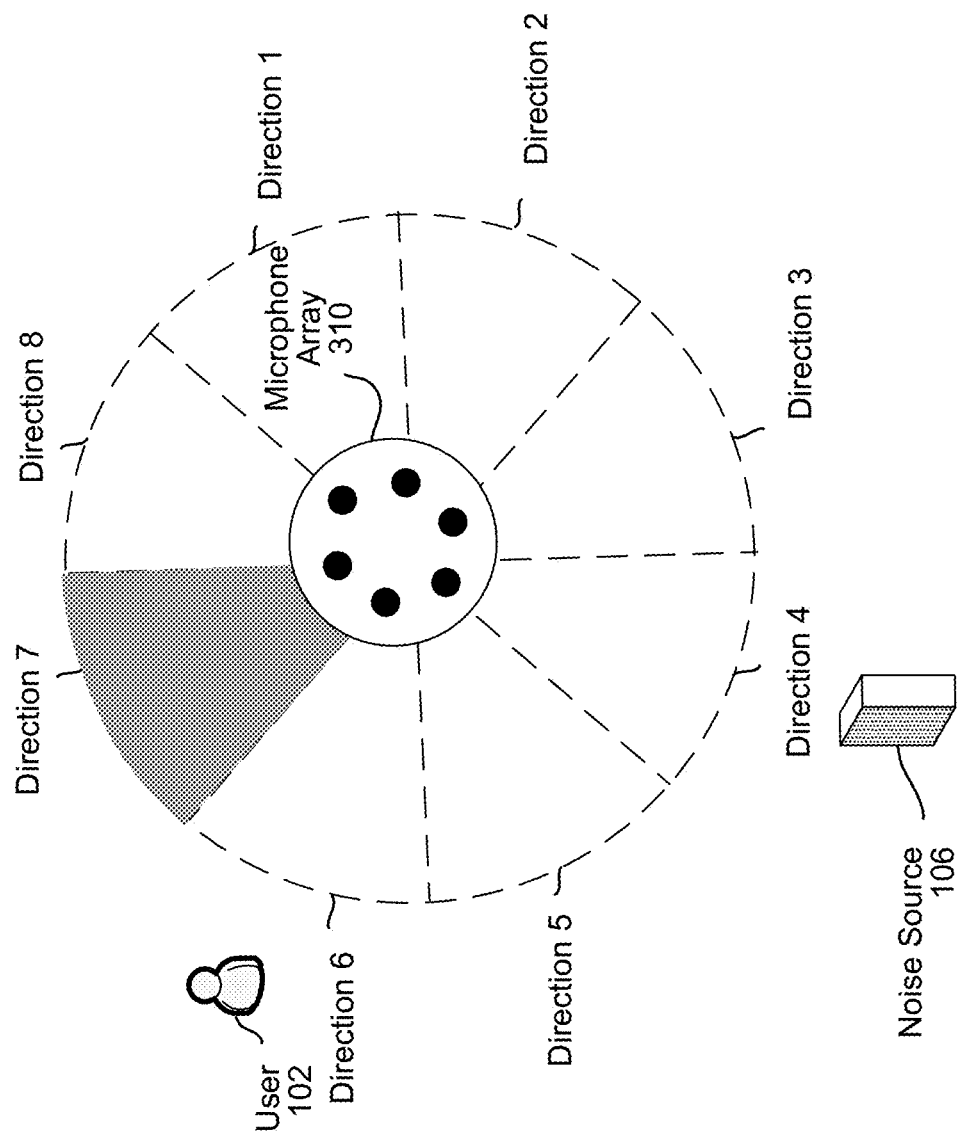

In various embodiments, with reference to FIG. 4E, the device 110 may be disposed proximate the user 102 in a direction 7 and a noise source 106 (or other source of audio)

in another direction 5. In order to reduce noise originating from the noise source 106, as explained herein, the device 110 may determine that sound output by the user 102 is below a volume threshold and then determine that the noise source 106 is disposed at direction 5 using the beamforming techniques described herein. FIG. 4F illustrates the effects of rotation of the device 110: after a rotation, the user 102 is disposed in direction 6, while the noise source is disposed in direction 4. In FIG. 4G, the device 110 rotates its target beam to direction 6 to account for the rotation in accordance with the present disclosure. Although illustrated as rotation in one plane, rotation may also occur in multiple planes and the device 110 may also change its distance to the user 102. The teachings herein apply for many different rotation/movement examples or configurations.

As shown in FIG. 4H, the camera(s) 312/316 of the device 110 may allow the device to have a particular field-of-view 450, which may be a composite of the individual fields-of-view 450a-d of the camera(s) 312a/316a-312d/316d. Such fields-of-view quadrants/sections may be separate or at least partially overlapping. As can be appreciated the different fields-of-view may correspond to different directions such as those discussed above in reference to FIGS. 4C-4G. For example, each field-of-view may correspond to a particular azimuth range and/or elevation range. Using computer vision processing (for example using image processing component 245 or otherwise), the device 110 may use image data from the camera(s) 312/316 to determine at what direction/position/azimuth angle (or azimuth range)/elevation angle (or elevation range) a particular object is with respect to the device 110. The device 110 may also associate the object's position with a particular direction for purposes of audio processing.

For example, if device 110 processes image data from the camera(s) 312/316 to determine that a user 102 is at a particular azimuth position corresponding to direction 7, it may perform beamforming to isolate audio from direction 7 for purposes of downstream operations such as speech processing, send audio over a voice-over-IP (VOIP) call, etc.

The device 110 may also be able to differentiate between different users detected in an environment and may be configured to match a face and speech to a particular user. The device 110 may also then perform beamforming to isolate speech for a desired user (from among the users in an environment) depending on which speech is desired. The device 110 may perform such operations in series (for example to focus a beam on one user at a time) or may perform such operations at least partially in parallel (for example, to create two different beams to isolate speech audio from two different users who may be speaking at the same time).

Figure 5A:
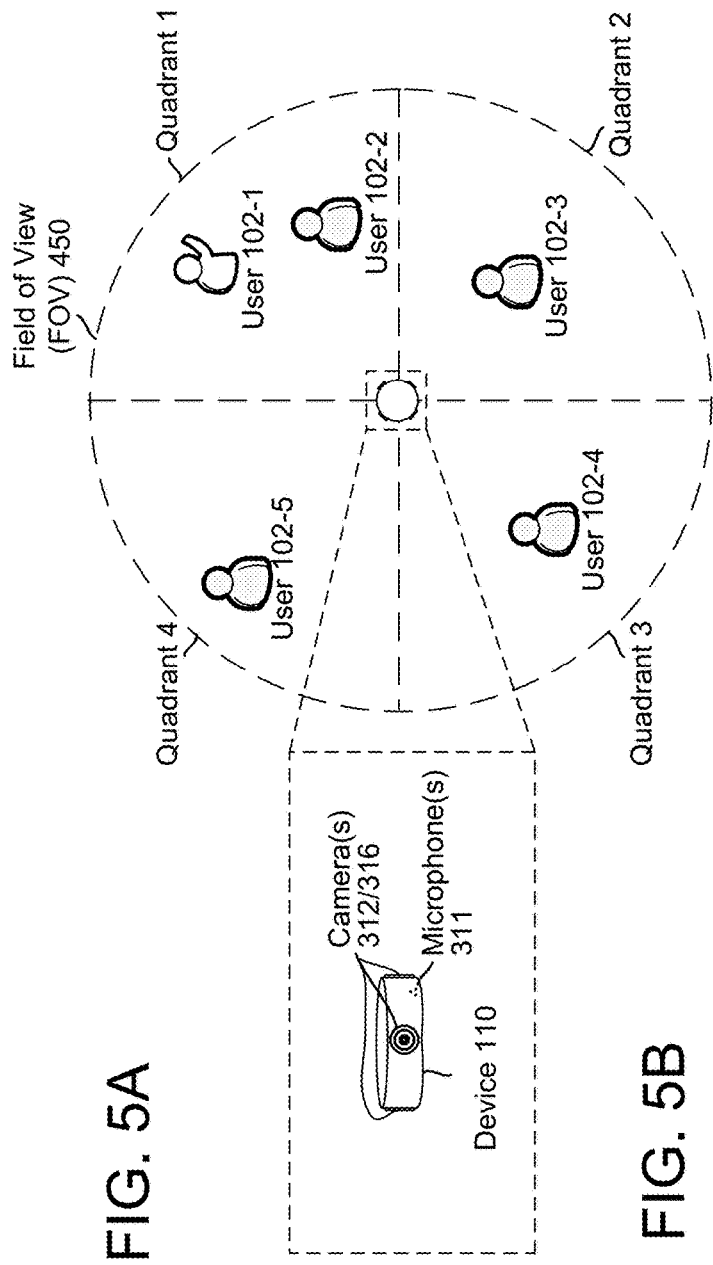
FIGS. 5A-5C illustrate examples of determining directions of faces and speech according to embodiments of the present disclosure.
Figure 5C:
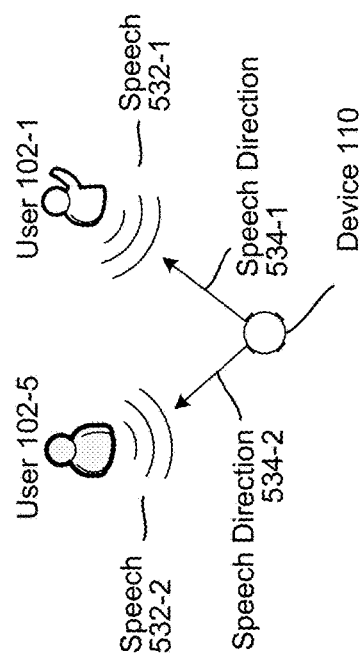
Figure 5B:
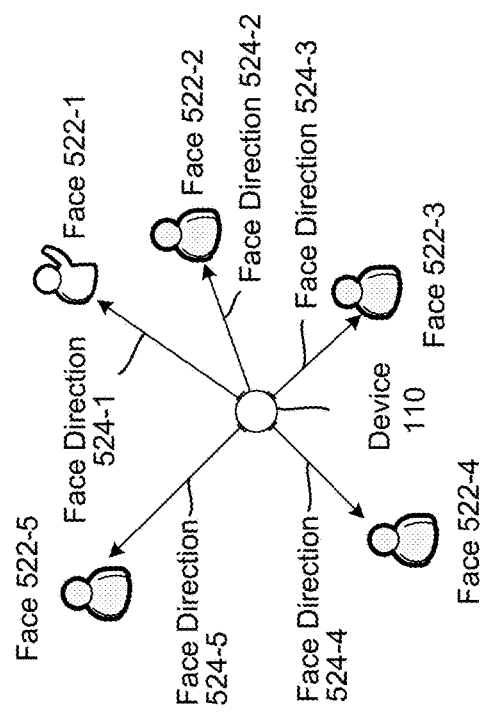

FIGS. 5A-5C illustrate examples of determining directions of faces and speech according to embodiments of the present disclosure. As illustrated in FIG. 5A, the device 110 may capture image data 221 in 360 degrees around the device 110 using camera(s) 312/316, such that the field of view (FOV) 450 includes Quadrant 1, Quadrant 2, Quadrant 3 and Quadrant 4. However, the present disclosure is not limited thereto and the device 110 may capture image data 221 in a wide FOV around the device 110 (e.g., from 180 degrees to 360 degrees) without departing from the present disclosure. In addition, the device 110 may capture audio data 211 in 360 degrees around the device 110 using the microphone(s) 311. Therefore, the device 110 may capture image data 221 and audio data 211 including a first user 102-1, a second user 102-2, a third user 102-3, a fourth user 102-4 and a fifth user 102-5.

As illustrated in FIG. 5B, the device 110 may detect a first face 522-1 (associated with the first user 102-1), a second face 522-2 (associated with the second user 102-2), a third face 522-3 (associated with the third user 102-3), a fourth face 522-4 (associated with the fourth user 102-4) and a fifth face 522-5 (associated with the fifth user 102-5). The device 110 may determine a first face direction 524-1 to the first face 522-1, a second face direction 524-2 to the second face 522-2, a third face direction 524-3 to the third face 522-3, a fourth face direction 524-4 to the fourth face 522-4 and a fifth face direction 524-5 to the fifth face 522-5, the directions 524 relative to the device 110.

As illustrated in FIG. 5C, the device 110 may detect first speech 532-1 (associated with the first user 102-1) and second speech 532-2 (associated with the fifth user 102-5). In this example, the second user 102-2, third user 102-3 and fourth user 102-4 may be silent during a period of time and therefore may not be included in the audio data 211. Using various techniques, such as those discussed herein, the device 110 may determine a first speech direction 534-1 to the first speech 532-1 and a second speech direction 534-2 to the second speech 532-2, the directions 534 relative to the device 110.

In some examples, the device 110 may identify the first user 102-1 and associate the first user 102-1 with the first face 522-1 and the first speech 532-1 based on the first face direction 524-1 and the first speech direction 534-1. In some embodiments the device 110 may use facial recognition/voice recognition techniques/other techniques (for example using user recognition component 295) to identify a user associated with a face/voice, etc. In other embodiments the device 110 may match a face to a voice despite the first user 102-1 not being included in the speaker recognition database. For example, the device 110 may identify the first user 102-1 from the first face 522-1 using facial recognition, may identify that the first face 522-1 is talking during the first speech 532-1 (for example by determining that lip movements of the first face 522-1 of the first user 102-1 match the timing/words of the first speech 532-1), may determine that the first face direction 524-1 matches the first speech direction 534-1 and may therefore associate the first user 102-1 with the first face 522-1 and the first speech 532-1.

In other examples, the device 110 may identify the fifth user 102-5 and associate the fifth user 102-5 with the fifth face 522-5 and the second speech 532-2 based on the fifth face direction 524-5 and the second speech direction 534-2, despite the fifth user 102-5 not being included in the facial recognition database. For example, the device 110 may identify the fifth user 102-5 from the second speech 532-2 using speaker recognition, may identify that the fifth face 522-5 is talking during the second speech 532-2, may determine that the fifth face direction 524-5 matches the second speech direction 534-2 and may therefore associate the fifth user 102-5 with the fifth face 522-5 and the second speech 532-2.

FIG. 6A illustrates a system for beamforming that includes rotating beams in response to a detected rotation of the device 110. In various embodiments, the microphone array 310 creates microphone audio data 602 corresponding to input audio, such as an utterance by the user 102. The microphone audio data 602 may correspond may include an audio signal for each microphone 311 of the microphone array 310. For example, if there are 6 microphones, the microphone audio data 602 may include six audio signals. The microphone audio data 602 may be received by an analysis filterbank 604, which may include one or more analysis filterbank (AF) components 604a, 604b, etc. The analysis filterbank 604 may convert the time-domain audio data 602 into frequency-domain audio data 606 using, for example, a Fourier transform (such as a Fast Fourier Transform (FFT)). Each AF component 604 may convert a different frequency range or "bin" corresponding to the time-domain audio data 602. In some embodiments, 128 AF components 604 create 128 different frequency bins for the AF output 606. The number of AF output(s) 606 may correspond to the number of microphones 311 of the microphone array 310.

The AF output data 606 is received by a filter 608 having one or more filter units 608a, 608b, etc. In some embodiments, the filter 608 is a fixed beamformer (FBF) and the filter units 608a, 608b, etc. are fixed beamforming units. The filter 608 may isolate audio from a desired direction by boosting audio received from the desired direction while dampening audio received from a non-desired direction. For example, each of the filter units 608 may include a filter-and-sum structure to boost an audio signal that originates from the desired direction (e.g., look-direction) while largely attenuating audio signals that originate from other directions.

The number of filter units included in the filter 608 may correspond to a desired number of beams/direction ranges relative to the device 110. For example, to generate twelve beams (each corresponding to one of twelve directional segments relative to device 110), the device 110 may include twelve separate filter units, with each filter unit processing the microphone outputs AF output data 606 to generate an individual beam (e.g., directional output, directional audio signal, beamformed audio data, or the like) corresponding to a particular direction. The filter 608 may generate fixed beamformer outputs 610, whose number corresponds to the desired number of beams. Each of the fixed beams may correspond to a particular pre-set azimuth and/or elevation angle range relative to the device 110. Thus each fixed beamformer output 610 may similarly correspond to a particular directional segment (such as the directions discussed above in reference to FIG. 4C) of an environment relative to the device 110.

Each particular FBF unit may be tuned with filter coefficient values to boost audio from one of the particular beams. For example, filter unit 608a may be tuned to boost audio from beam 1, filter unit 608b may be tuned to boost audio from beam 2, and so forth. The filtered audio signals will then be summed together to create the output audio signal. Thus, the FBF unit may phase-align microphone audio data toward a given direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficient values may be represented as $H_{BF,m}(r)$ where $r=0, \ldots, R$, where R denotes the number of beamformer filter coefficient values in the subband domain. Thus, the output Y of the filter and sum unit may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n-r) \qquad (2)$$

The number of microphone outputs 602 and the number of fixed beamformer outputs 610 may not be the same. The number of audio channels included in the microphone outputs 602 and/or the number of beams are typically factors of two (e.g., 2, 4, 6, 8, 12, etc.), although the disclosure is not limited thereto. For example, the microphone array 310 may include eight microphones whereas the device 110 may generate twelve beams. Additionally or alternatively, the number of audio channels included in the microphone outputs 602 and the number of beams may be the same without departing from the disclosure.

An angle determination component 640 may include one or more components to determine which angle represents the estimated position of the user for purposes of performing beamforming to isolate audio coming from the desired direction. For example, the angle determination component may include a rotation determination component 612 that may determine a rotation and/or change in rotation of the device 110 based on received position/orientation data 614, which may be generated by one or more of the sensors described above. For example, the rotation determination component 612 may receive data from the accelerometer and gyroscope and, based on the data, determine angle data 616 corresponding to an amount of a change in an angle rotation of the device 110. The rotation determination component 612 may, for example, determine that a certain change in data from the gyroscope corresponds to a certain angle of rotation based on a predetermined relationship between the gyroscope data and the rotation. In various embodiments, the position/orientation data 614 changes to include new position/orientation information approximately 20 times per second, and the rotation determination component 612 determines new corresponding angle data 616 approximately 20 times per second. Thus, if a device 110 rotates with respect to a location of a user 102, the rotation may be considered when determining if a new beam should be selected (and which beam should be selected) for purposes of isolating audio in the new direction of the user 102 relative to the device 110.

A rotation compensation component 618 receives the FBF output 610 and angle data 616 and based thereon, as explained in greater detail below, applies one or more rotation-compensation functions to the FBF output 610 to create one or more rotation compensation (RC) outputs 622. The RC outputs 622 represent an interpolation between two or more beams represented in the FBF output 610 to thereby rotate a beam corresponding to a source of target audio. In various embodiments, the rotation compensation component 618 updates the RC output data 622 every 50 milliseconds in accordance with the angle data 616 changing approximately 20 times per second. In other embodiments, however, the rotation compensation component 618 updates the RC output data 622 every 10-20 milliseconds.

A beam selector 624 receives the RC outputs 622 and, in accordance with the various techniques described herein, such as selecting a loudest beam, selects data corresponding to a selected beam 626. The beam selector 624 may select one or more of the beams as output beams. For example, the beam selector 624 may determine one or more signal quality values (e.g., loudness, SNR, power value, signal-to-noise plus interference ratio (SINR), and/or other signal quality metrics known to one of skill in the art) associated with each of the fixed beamformer outputs 610 and may select the fixed beamformer output 610 having the highest signal quality metric as the output beam(s). In various embodiments, the beam selector 624 is capable of selecting a new beam every 100-200 milliseconds; the rotation compensation component 618 is thus capable of responding to a rotation and rotating beams to target a source of audio faster than the beam selector 624.

A synthesis filterbank 628 may be used to convert the frequency-domain data back to time-domain output audio data 630 using, for example, an inverse Fourier transform (such as an Inverse Fast Fourier Transform (IFFT). The output audio data 630 may be the audio data 211 which is sent for one or more downstream operations, such as speech processing or the like. Isolating audio in the new direction of rotation (e.g., performing beam rotation/beam steering) may be performed as described below in reference to FIG. 8.

Figure 6B:
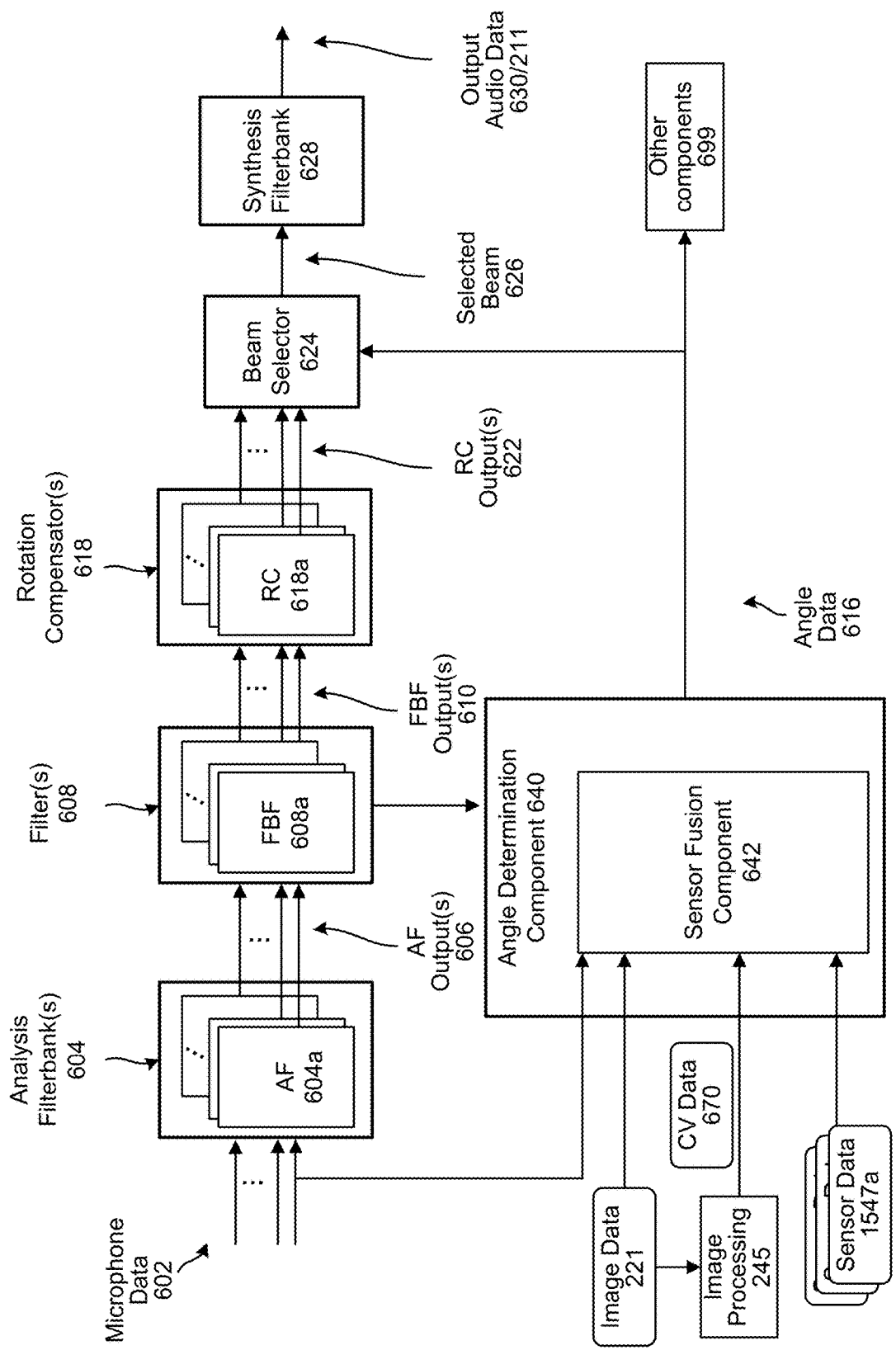
FIG. 6B illustrates a system for performing beamforming and/or beam selection using image data and/or sensor data according to embodiments of the present disclosure.

The angle determination component 640 may also perform operations for selecting the estimated position/direction of a user 102 for operations described above in reference to FIGS. 1A-1B. For example, as shown in FIG. 6B, the angle determination component 640 may include a sensor fusion component 642 that can process data (including direction/position data and confidence data) from multiple sensor sources to determine angle data 616 corresponding to an estimated position of a user, as described above in reference to FIG. 1A and below in reference to FIGS. 7A and 7B. The sensor fusion component 642 may include one or more machine learning models to perform operations discussed herein. As shown in FIG. 6C, the angle determination component 640 may include a CV selection component 644 that can process CV data 670 (which may include direction/position data and confidence data) received from an image processing component 245 and/or another component. The CV selection component 644 may include one or more machine learning models to perform operations discussed herein. The CV data 670 may be processed (for example by the CV selection component 644) to determine if an associated confidence satisfies a condition. If it does, the angle determination component 640 may output angle data 616 corresponding to the position corresponding to the CV data 670, for example as described above in reference to FIG. 1B. In certain embodiments, the angle data 616 may be determined by the angle determination component 640 prior to beamforming operations, thus resulting in conservation of computing resources as described herein. The angle data 616 may include not only position data (e.g., the estimated angle corresponding to the position of the user) but also confidence data corresponding to a system confidence that the user is at the respective position.

To protect user privacy CV operations (and other operations), such as those performed by image processing component 245 may be performed by device 110 without sending the image data to another device, such as a cloud device. CV and/or image processing operations may also be performed on image feature data rather than raw image data which also improves privacy protections.

Returning to FIG. 6B, as noted above it may be desirable to consider a variety of input data sources when determining an estimated position of the user. Such input data sources may include sources such as sensors 1554 that provide data such as sensor data 1547, discussed herein. Examples of sensor data 1547 may also include audio data (e.g., microphone data 602) and image data 221. Such data may be sent to a sensor fusion component 642. While the sensor fusion component 642 may input raw sensor data from a variety of sensors (e.g., sensor data 1547a . . . 1547n), it may also input processed data, for example CV data 670. The respective input components to the sensor fusion component 642 may include position data and corresponding confidence data corresponding to the respective position data. It may also include the FBF output(s) 610. Thus, different sensors/components may perform their own operations to estimate a user position and may send their respective estimated user position data (which may include, for example, azimuth data, distance data, elevation data and/or other data) along with their respective confidence data indicating the respective component's confidence in its respective position data. The sensor fusion component 642 may then weight the respective position data by the corresponding confidence data to determine a composite estimated position (and corresponding confidence) for purposes of determining output angle data 616. In this manner the angle determination component 640 may more heavily weight position data that the device 110 is more confident in to determine a more accurate estimation of the user's position relative to the device 110. This operation can be agnostic with regard to the type of input data received by the sensor fusion component 642, but may involve some normalization of confidence data so that the sensor fusion component 642 may appropriately perform its fusing operations.

The sensor fusion component 642 may receive as input position data and confidence data determined based on audio data. For example, the device 110 may perform beamforming (e.g., using FBFs 608) using a plurality of audio signals (e.g., microphone data 602 and/or AF output(s) 606) to determine audio data (e.g., FBF outputs 610) corresponding to directions relative to the device. For example, the audio data determined by the beamforming may include first audio data 610a corresponding to a first direction relative to the device and second audio data 610b corresponding to a second direction relative to the device, where the second direction is different from the first direction. The device 110 may then process the audio data to determine first signal quality data (e.g., SNR, SINR, etc.) corresponding to the first audio data and second signal quality data corresponding to the second audio data. Based at least in part on the first signal quality data and the second signal quality data the device 110 may determine a first confidence value representing a likelihood a user is positioned in the first direction relative to the device. That is, if the first signal quality data indicates a higher signal quality that the second signal quality data, the device 110 may estimate that the audio data indicates the user is located in the first direction with some first confidence value. Position data corresponding to the first direction along with the first confidence value may be sent to the sensor fusion component 642.

The device 110 may use a number of techniques to map audio/speech features to confidence of a user position. Such techniques may include using a neural network/machine learning model to map signal quality data to position likelihood data. The device 110 may also estimate a distribution for each direction/beam, such as a with a probability density function, and then may merge such information to determine a uniform distribution that can be used to estimate user position. As noted herein, the device 110 may also process audio data to determine multiple speaking users and may process the audio data to determine multiple parallel tracks, one for each speaker, that can be used for source separation/position identification.

The device 110 may also receive image data from at least one image capture component (e.g., camera 312/316) and process the image data (for example using CV processing using image processing component 245) to determine that a face is positioned in a first direction relative to the device. The device 110 may also determine a corresponding first confidence value corresponding to a likelihood the face is positioned in a first direction relative to the device. The device 110 may send position data corresponding to the first direction and the corresponding first confidence value to the sensor fusion component 642 and/or CV selection component 644. Such data may be in the form of CV data 670, sensor data 1547, or the like.

The sensor fusion component 642 may also receive position and confidence data from a variety of sensors in the form of sensor data 1547.

Figure 7A:
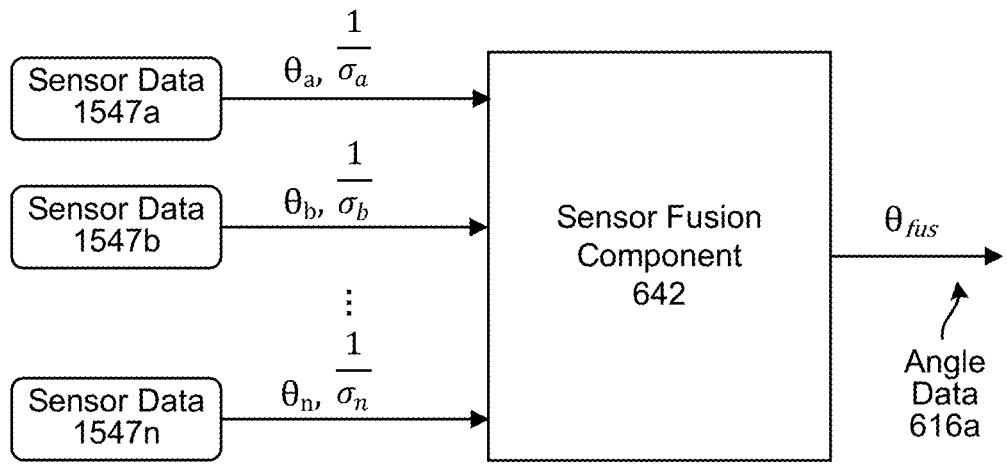
FIGS. 7A-7B illustrate using data from various sensors to determine a user's position relative to a device according to embodiments of the present disclosure.

To "fuse" the various sensor data 1547, and determine an estimated position/direction of the user 102, the sensor fusion component 642 may perform the various operations discussed below and in relation to FIGS. 7A and 7B. As shown in FIG. 7A, various sensor data 1547 may be received by sensor fusion component 642. Such sensor data is labeled 1547a, 1547b . . . 1547n representing data received corresponding to sensors a through n. Each set of sensor data 1547 may include an estimated angle θ corresponding to that sensor's estimated position of the user. Angle θ may represent an azimuth of the estimated position of the desired user 102 relative to device 110. Although the examples discussed herein focus on θ representing an estimated azimuth, the operations may also be performed where θ represents an estimated elevation. Each set of sensor data 1547 may also receive confidence data corresponding to the estimated angle/position. The confidence data is represented as 1/σ where σ is the variance corresponding to the estimated position. For example, if various estimated angle calculations are made based on data from a particular sensor, the value of θ may represent the mean of the those angle calculations and σ may represent the variance (e.g., square root of the standard deviation $\sigma^2$) of those angle measurements. Other determinations of confidence data and/or variance data are also possible depending on system configuration. Thus, as illustrated, the sensor fusion component 642 may receive sensor data 1547a (including estimated position/angle data $\theta_a$ and confidence data $$\frac{1}{\sigma_a}\bigg),$$

sensor data 1547b (including estimated position/angle data $\theta_b$ and confidence data $$\frac{1}{\sigma_b}\bigg), \ldots$$

through sensor data 1547n (including estimated position/angle data $\theta_n$ and confidence data $$\frac{1}{\sigma_n}\bigg).$$

The different sensor data 1547s may correspond to different sensors.

For example, sensor data 1547a may correspond to audio data 602 (which sensor data may be based on signal quality metric processing as described above), 1547b may correspond to image data 221 and/or CV data 670), 1547c may correspond to data from a LIDAR sensor 1561, and so forth. Each sensor/component determining the estimated position and/or confidence may perform its own operations for purposes of estimating the position of the user and determining data to be sent to the sensor fusion component 642/angle determination component 640. For example, an audio data processing component may evaluate the signal quality of different beams and estimate a user position with a certain confidence. The image processing component 245 may perform CV operations to identify a face in image data and determine where the face is relative to the device 110 with a certain confidence. Other sensors/components may perform their own operations to determine their respective sensor data 1547.

The estimated angle of the user determined from all the sensor data, which may be referred to as the fusion angle or $\theta_{fus}$/angle data 616a as shown in FIG. 7A, may be determined by processing the various angle data and confidence data from the sensor data 1547. To process such data the sensor fusion component 642 may use Gaussian modeling/a Kalman filter approach that uses a von Mises-Fisher distribution (or other technique) to estimate the user's azimuth position along the range from 0 to 360 degrees (e.g., 0 to 2π radians).

For each set of sensor data of index i (where, as illustrated in FIG. 7A, i may go from a to n (where n can be any number of sensors) the estimated position $\theta_i$ may be processed in a number of ways and the results weighted by the respective confidence $$\frac{1}{\sigma_i}$$

(e.g., inverted variance) for purposes of determining a fused angle. As shown in Equation (3) the sensor fusion component 642 may determine a weighted cosine representation for each angle $$\frac{1}{\sigma_i}\cos(\theta_i)$$

and then may sum them to determine a fusion cosine representation $C_{fus}$.

$$C_{fus} = \sum_i \frac{1}{\sigma_i}\cos(\theta_i) \qquad (3)$$

A similar operation may be performed for a weighted sine operation:

$$S_{fus} = \sum_i \frac{1}{\sigma_i}\sin(\theta_i) \qquad (4)$$

The sensor fusion component 642 may then determine a fused (e.g., overall estimated) angle as shown in equation 5:

$$\theta_{fus} = \tan^{-1}\frac{C_{fus}}{S_{fus}} \qquad (5)$$

With equation 6 representing the overall confidence of the estimate may be represented by the Kalman gain:

$$\kappa_{fus} = \sum_i \frac{1}{\sigma_i} \qquad (6)$$

As can be appreciated, if a particular sensor has a low variance it may have a high confidence that it's estimation of the user's position is correct. This may result in that particular sensor's estimated position having a greater impact on the resulting estimated position $\theta_{fus}$.

Figure 7B:
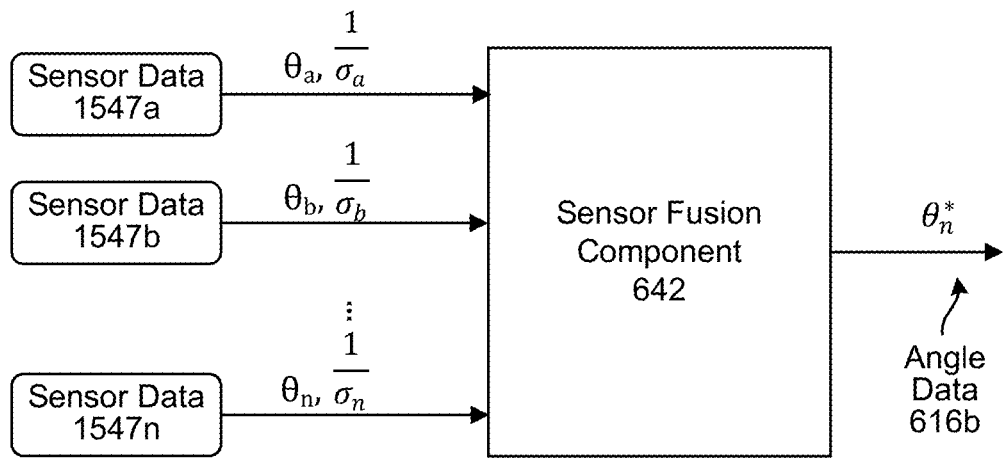

To track the estimated position across time (e.g., from time index n−1 to time index n), the sensor fusion component may predict the new position (shown as $\theta_n{}^*$) using a random walk model as illustrated in FIG. 7B. As shown, the variance M at time index n is equal to the variance of the previous time index plus the noise variance of the model $\sigma_{mod}$. This noise variance, which represents the model noise/process noise of a Kalman filter, corresponds to the variance of the random walk approach and corresponds to a likelihood that a new position is within a certain range of a previous position.

$$M_n = M_{n-1} + \sigma_{mod} \quad (7)$$

The updated Kalman gain/weighting function $\kappa_n$ may be expressed as:

$$\kappa_n = \frac{M_n}{M_{n-1} + \sigma_{obs}} \quad (8)$$

Where $\sigma_{obs}$ represents the observation noise/potential measurement error. The sensor fusion component 642 may then determine an updated cosine function $C_n$ and an updated sine function $S_n$ for time index n as shown:

$$C_n = \frac{1}{M_n}\cos\theta_n + \frac{1}{\sigma_{obs}}\cos\theta_{fus} \quad (9)$$

$$S_n = \frac{1}{M_n}\sin\theta_n + \frac{1}{\sigma_{obs}}\sin\theta_{fus} \quad (10)$$

Using these updated functions the sensor fusion component 642 may then determine an updated prediction $\theta_n{}^*$ for the user position:

$$\theta_n^* = \tan^{-1}\frac{C_n}{S_n},\ M_n^* = (1 - \kappa_n)M_n \quad (11)$$

Depending on the time resolution (e.g., the amount of time between time n−1 to time n certain assumptions may be made about a range that a user is likely to travel during that time period. For example, if the time difference is not high, the system may assume the user is unlikely to change positions by more than a certain number of degrees/radians relative to the device 110. Further, if the overall Kalman gain indicates a large observed variance for an estimated position, the sensor fusion component 642 may disregard that particular estimated location as it may not be as accurate as an estimated location having a lower variance (e.g., higher confidence).

The above operations may be performed to determine the user's estimated position relative to the device 110. For example, θ may be estimated for the user's azimuth and/or the user's elevation. Other estimated position values may also be determined. The estimated position data θ may be output as angle data 616. The angle data 616 may also include confidence information such as a score, etc. corresponding to the position data θ. For example, the angle data 616 may include $\kappa_{fus}$, $\kappa_n$, and/or confidence data. As shown in FIGS. 6A-6C, that angle data 616 may be sent to beamforming components such as rotation compensator(s) 618, beam selector 624, beam steering component 650, and/or other components 699. Beamforming components may use the angle data 616 to select a particular prepared beam or to perform beam steering to create a beam to be used for further processing (such as wakeword detection, speech processing, sending audio for a call, etc.).

In certain situations a particular sensor may determine an estimated user position with a particular confidence that cause the device 110 to potentially skip the fusion operations discussed above and simply select that particular sensor's position as the estimated user position. For example, if a sensor satisfies a certain condition, such as has a sufficiently high confidence score, a confidence score within a particular range, a confidence score above a threshold, or the like, the system may simply use that sensor's estimated position data as the overall estimated position of the user. This may be particularly useful under certain operational conditions of the device 110. For example, if the device 110 is operating in noisy conditions, or other conditions that indicate that audio data may not be reliable for determining a user position, the device 110 may rely exclusively on image data/CV data for the user's position, particularly if the confidence for that CV-based image determination satisfies a condition. In certain configurations, such a high confidence determination of user position that is based on non-audio sensor data (or more specifically, non-beamformed audio data) may allow the device 110 to save computing resources on fixed beamforming and may allow the device to steer a beam in the direction indicated. In this manner the device 110 may only steer a beam in the desired direction.

An example of components configured to perform such operations is shown in FIG. 6C. As shown, image data 221 may be processed by image processing component 245 which will perform CV operations to identify a position of a user 102 in the environment of the device 110. This may include performing CV processing on the image data 221 to determine that a face is represented in the image data and a confidence value that the face is positioned in a first direction relative to the device. The position data/confidence may be represented in the CV data 670. A CV selection component 644 may process the CV data 670 to determine if the confidence value satisfies a condition. The CV selection component 644 may also analyze other data (not shown) to determine if operating conditions indicate that the CV data 670 should be more heavily weighted/the primary factor in determining the user's position. For example, audio data may indicate a noisy environment or the like, which may cause the device 110 to use CV data for determining the estimated position of the user 102. In another example, the device 110 may determine that the environment exhibits good lighting conditions (e.g., the image data satisfies a quality metric), and thus may cause the device 110 to use CV data for determining the estimated position of the user 102. Other examples are possible. If the CV selection component 644 determines to use the CV-based position data, that position data will be output from the angle determination component 640 as angle data 616. Such angle data 616 may be sent to a beam selector 624 such as that shown in FIGS. 6A and 6B, so the device 110 may select a pre-formed beam corresponding to the CV position. The angle data 616 may also be sent to a beam steering component 650 which may then use the angle data 616 to determine filter coefficients and/or other data for purposes of creating a specific beam in the direction indicated by the angle data 616. Such beam steering may be performed using techniques such as those described herein in reference to FIG. 8 and/or using other techniques. As can be appreciated, the various configurations of the device 110, such as those illustrated in FIGS. 6A-6C can co-exist on the device 110 and the device 110 may combine their operations and/or switch between them depending on operating conditions/device 110 configuration.

Although discussed above in reference to CV data, the operations/configurations of FIG. 6C may also rely on other sensor data such as LIDAR data, or data from other sensors 1554 depending on system configuration.

The device 110/angle determination component 640 may also use other information in determining what weight should be given to the various data available for determining a user's estimated position. For example, a system directed input detector 285 may determine if a particular input is directed at device 110 or directed at another source (such as another user, or the like). For example, if the device 110 detects an utterance, it may perform processing to determine if that utterance is directed at the device 110 and should be processed. If so, the device 110 may attempt to determine a beam in the direction of the utterance as disclosed herein. If the utterance is not directed at the device 110, the device 110 may not determine a beam in that direction. The confidence that an utterance is (or is not) directed at the device 110 may be used as a confidence value for sensor fusion purposes discussed herein, for example with regard to FIGS. 7A and 7B. If the device 110 determines that one user is speaking to the device 110 and another is not, for example as discussed above in reference to FIGS. 5A-5C, the device 110 may attempt to determine a beam in the direction of the user that is actually speaking to the device. To make such determinations, the device may use the system directed input detector 285, the user recognition component 295, the image processing component 245, etc. For example, the device 110 may determine if the voice of the device-directed utterance matches a user shown in image data 221 and then steer a beam/select a beam in the direction of that shown user. The confidence that a speaking voice of an utterance does (or does not) match a detected face may be used as a confidence value for sensor fusion purposes discussed herein, for example with regard to FIGS. 7A and 7B. The device 110 may also determine if certain lip movements match the desired utterance and if so, steer a beam/select a beam in the direction of the face with the certain lip movements. The device 110 may also refrain from performing beamforming in a direction of a face that does not match the voice/lip movements. The confidence that lip movements match (or do not match) an utterance may be used as a confidence value for sensor fusion purposes discussed herein, for example with regard to FIGS. 7A and 7B. For example, if a particular face corresponds to a user profile that does not match a voice, the device 110 may not perform beamforming in the direction of that particular face.

The device 110 may also use sentiment detection component 275 and/or image processing component 245 to determine if a sentiment corresponding to a detected utterance matches a detected face. If so, the device may determine a beam corresponding to the direction of the face. The confidence that a sentiment of an utterance does (or does not) match the sentiment of a detected face may be used as a confidence value for sensor fusion purposes discussed herein, for example with regard to FIGS. 7A and 7B.

The device 110 may also determine that an utterance corresponds to a particular face and may track that face as it moves in the environment and continue to determine a beam (e.g., steer a beam/select a beam) in the direction of the desired user 102 as the user moves from a first direction to a second direction in the environment.

In another example, device 110 may be capable of isolating multiple beams substantially in parallel to capture audio corresponding to multiple users at approximately the same time. For example, as shown in FIG. 5C, if user 102-1 and user 102-5 are both speaking audio that is directed at device 110 (for example as determined by the system directed input detector 285, the user recognition component 295, the image processing component 245, etc.), the device 110 may determine a beam corresponding to each user as described herein for purposes of downstream processing.

As discussed herein, the determined angle data 616 may be used for a variety of purposes. It may be used to determine a beam (e.g., steer a beam/select a beam) in the direction of a desired user 102. The audio for such a beam may be sent to a number of downstream operations such as processing by a wakeword detection component 220, processing by a speech processing component 240/1537, sending over a communications link (such as one involved in a communication session between device 110 and one or more other devices like a VOIP call or the like which may be coordinated using communication component 1540), or other operations. The angle data 616 may also be sent to other components such as system directed input detector 285, a user presence processing component (not shown), a user profile component 270, safety component 1529, task component 1541, etc. Such angle data 616 may thus be used to determine where a user is located for various purposes such as improving audio output by other components (e.g., a home theater system that focuses its output on an estimated user position), device arbitration (e.g., selecting a device closest to a user for input/output purposes), or various other operations.

As noted herein, the device 110 may determine a beam in a number of different ways. In certain examples, the device may perform beamforming corresponding to a number of different pre-established directions, and then select one of those beams for purposes of downstream processing. In another example, the device may perform beamforming corresponding to a number of different pre-established directions and may adjust those beams to compensate for various factors, such as rotation/movement of the device. In another example, the device may determine a desired position and determine filter coefficients/perform processing to create a beam that is focused on that desired position. This may occur instead of beamforming for multiple pre-established directions.

Figure 8:
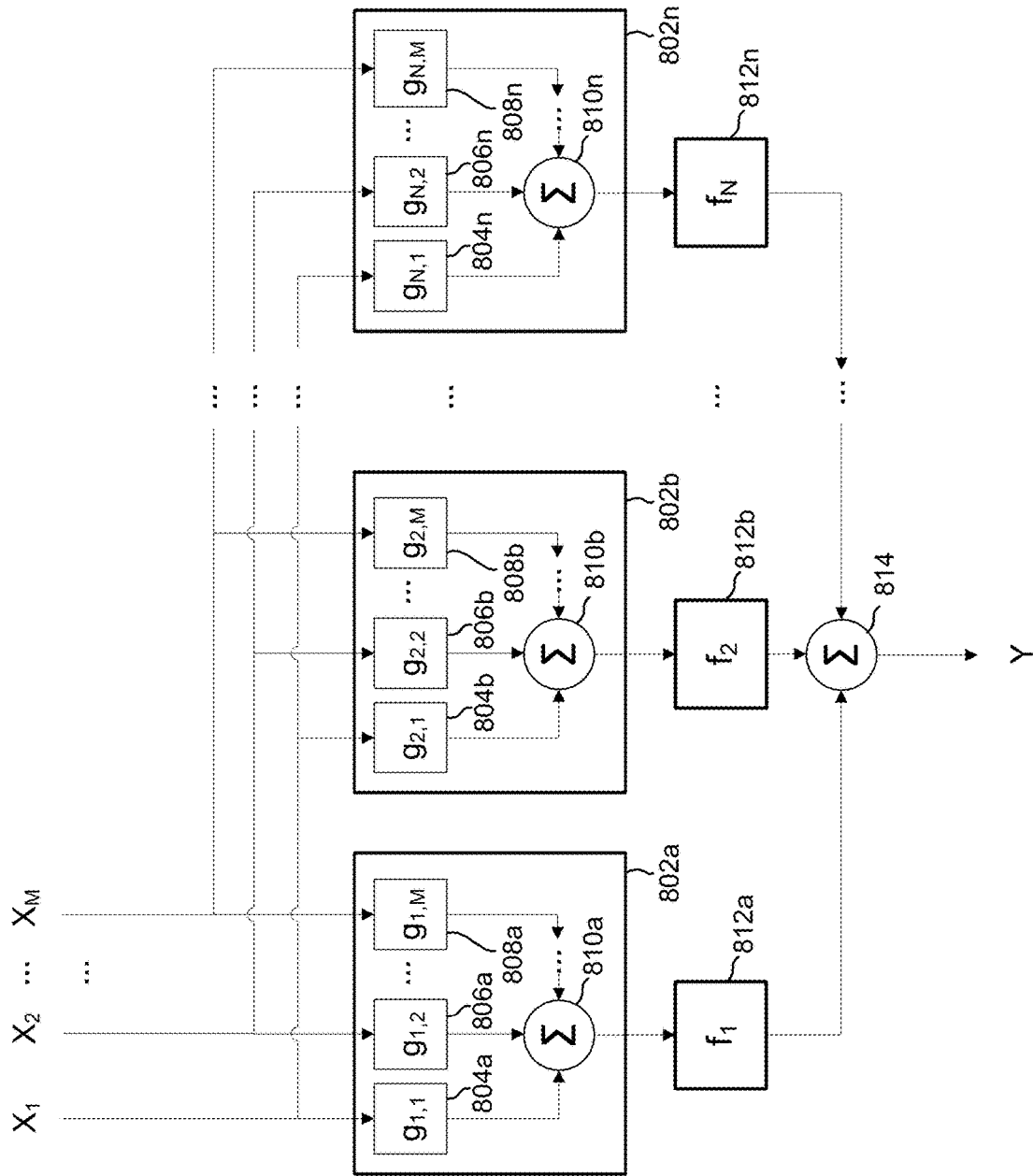
FIG. 8 illustrates determining beam-steered data in accordance with functions according to embodiments of the present disclosure.

FIG. 8 is a block diagram illustrating a system for performing beam steering/beam rotation in accordance with embodiments of the present disclosure. The rotation compensator may be implemented using the rotation compensation component 618 described with reference to FIG. 6A; in some embodiments, the beam rotation system is implemented partly in the filter 608 and in the rotation compensation component 618. The present disclosure is not, however, limited to any particular implementation.

In various embodiments, the device 110 receives a plurality of audio signals $X_1, X_2, \ldots X_M$ corresponding to a plurality of M microphones in the microphone array 310. The signals $X_0, X_1, \ldots X_M$ are processed using a corresponding plurality of N beamforming components 802a, 802b, ... 802n corresponding to N beams, in accordance with the systems and methods described above, to create audio data corresponding to various directions. For example, the first signal $X_1$ is processed using a first beamforming filter $g_{1,1}$ 804a of the first beamforming component 802a, a first beamforming filter $g_{2,1}$ 804*b* of the second beamforming component 802*b*, and a first beamforming filter $g_{N,1}$ 804*n* of the nth beamforming component 802*n*. The second signal $X_2$ is processed using a second beamforming filter $g_{1,2}$ 806*a* of the first beamforming component 802*a*, a second beamforming filter $g_{2,2}$ 806*b* of the second beamforming component 802*b*, and a second beamforming filter $g_{N,2}$ 806*n* of the nth beamforming component 802*n*. The mth signal $X_M$ is processed using an mth beamforming filter $g_{1,M}$ 808*a* of the first beamforming component 802*a*, an mth beamforming filter $g_{2,M}$ 808*a* of the second beamforming component 802*b*, and an mth beamforming filter $g_{N,M}$ 808*n* of the nth beamforming component 802*n*. The outputs of the M beamforming filters 804, 806, . . . 808 of each beamforming component 802*a* may be combined (e.g., added) using one of M summation components 810*a*, 810*b*, . . . 810*n* corresponding to each of the N beamforming components 802*a*, 802*b*, . . . 802*n*, which may then output the combined result.

The N outputs of the N beamforming components 802*a*, 802*b*, . . . 802*n*—i.e., audio data corresponding to N directions—are received by N rotation compensation filters 812*a*, 812*b*, . . . 812*n* that each modify the N outputs of the N beamforming components 802*a*, 802*b*, . . . 802*n* in accordance with N rotation-compensation functions $f_1, f_2, \ldots f_N$ to create rotation-compensated audio data. The rotation-compensated audio data output by the N rotation compensation filters 812*a*, 812*b*, . . . 812*n* may then be combined using a summation component 814 to produce an output signal Y. The output signal Y may be represented by the below rotation-compensation function (12).

$$Y = g_1(\omega)f_1(\theta) + g_2(\omega)f_2(\theta) + \ldots + g_N(\omega)f_N(\theta) \quad (12)$$

In equation (12), $\theta$ represents the angle of rotation; $\omega$ represents the frequency of the input signals $X_0, X_1, \ldots X_M$; $f_1, f_2, \ldots f_N$ represent the N rotation-compensation functions; and $g_1, g_2, \ldots g_N$ represent the outputs of the N beamforming components 802. For example, the below function (13) represents the output of the first beamforming component 802*a*.

$$g_1 = g_{1,1}(\omega)X_1(\omega) + g_{1,2}(\omega)X_2(\omega) + \ldots + g_{1,M}(\omega)X_M(\omega) \quad (13)$$

The N rotation-compensation functions $f_1, f_2, \ldots f_N$ may be quantization functions, polynomial functions, truncated sync functions, Gaussian interpolation functions, complex kernel functions, or any other functions. In operation, the N rotation-compensation functions $f_1, f_2, \ldots f_N$ may interpolate two or more beams determined by the fixed beamformer 608 to create one or more new beams in accordance with a determined rotation. As described above, the rotation-compensation functions may be used to output the output signal Y by interpolating between the outputs of the beamforming components 802. In other embodiments, the rotation-compensation functions may be used to interpolate between filter coefficients associated with filters of the N beamforming components 802 to create rotation-compensated filter coefficients, which may be used to update the filters.

In some embodiments, the rotation compensator 800 is used to create data Y corresponding to a rotated beam. In other embodiments, the rotation-compensated audio data output by the N rotation-compensation functions $f_1, f_2, \ldots f_N$ are also or instead sent to the beam selector 624, which may select one of the outputs as the selected beam. Further, a number of different rotation compensators 800 may be used for each of a number of different frequency bins.

In some embodiments, the N rotation-compensation functions $f_1, f_2, \ldots f_N$ that output the rotation-compensated audio data are quantization functions that the rotation compensator 618 uses to select one of the beams 610 output by the filter 608 in response to the angle data 616. The rotation compensator 618 may determine that an angle $\theta_1$ corresponding to a rotation matches an angle $\theta_2$ associated with a separation between a first beam and a second beam. The beam selector 624 selects the first beam prior to the rotation, the rotation compensator 618 selects, based on the angle $\theta_1$, the second beam after the rotation. For example, with reference also to FIG. 4E, the beam selector 624 selects direction 7 prior to the rotation. Because, in this example, there are 8 beams of equal size, the angle $\theta_2$ associated with a separation between adjacent beams is 45°. If the rotation determination component 612 determines that the angle $\theta_1$ corresponding to the rotation is also 45° or approximately 45°, the rotation compensation component 618 selects the beam corresponding to direction 6. In this example, the rotation-compensation functions $f_1, f_2, f_3, f_4, f_5, f_6, f_7, f_8$ may be unitary functions and may be set to (0,0,0,0,0,0,1,0) before the rotation (e.g., selecting the 7$^{th}$ beam) and to (0,0,0,0,0,1,0,0) after the rotation (e.g., selecting the 6$^{th}$ beam).

In some embodiments, the N rotation-compensation functions $f_1, f_2, \ldots f_N$ are polynomial functions of the form of the below rotation-compensation function (14).

$$Y = g_1(\omega) + g_2(\omega)\theta + g_3(\omega)\theta_2 + \ldots + g_N(\omega)\theta^{N-1} \quad (14)$$

In equation (5), $\theta$ represents the angle of rotation; $\omega$ represents the frequency of the input signals $X_0, X_1, \ldots X_M$; and $g_1, g_2, \ldots g_N$ represent the outputs of the N beamforming components 802. As mentioned above, however, the present disclosure is not limited to only quantization or polynomial functions, and one of skill of the art will understand that the N rotation-compensation functions $f_1, f_2, \ldots f_N$ may be other types of functions, such as truncated sync functions, Gaussian sync functions, or complex kernel functions. The function type and coefficients related thereto may be determined based on the geometry of the microphone array 310, by simulation of the microphone array 310, and/or by training a model of the microphone array 310.

In some embodiments, the angle data 616 determined by the rotation determination component 612 contains an error; the angle of rotation $\theta$ determined by the rotation determination component 612 differs from an actual angle of rotation of the device 110. The beam selector 624 may detect this error by determining that a quality metric associated with a selected beam prior to rotation decreases after rotation. For example, the beam selector 624 may determine a signal-to-noise ratio (SNR) of a selected beam and determine that the SNR fell after the rotation compensator 618 rotated the beam. In these embodiments, the beam selector 624 may send data to the rotation compensator 618 indicative of the decreased metric. Upon receipt of this data, the rotation compensator 618 may attempt to fix the error by sweeping the rotated beam in one or both directions. For example, the rotation compensator 618 may shift the rotated beam by 1° increments in a clockwise direction and then in a counter-clockwise direction. The rotation compensator 618 may stop sweeping the beam when the beam selector 624 indicates that the quality metric has returned to or is near its previous level. The rotation compensator 618 may store a history of such errors and eventual solutions to the errors, if any—e.g., what type of motion led to the error and how far the selected beam needed to be rotated, and in which direction, to correct the errors. Once a threshold number of errors and solutions is reached, the rotation compensator 618 may update some or all of the equations and/or coefficients described above to reduce or eliminate future errors.

Other parts of the present disclosure are directed to rotation in a single plane, such as a horizontal or x,y plane (with reference to FIG. 3A); this rotation may be caused by the device 110 turning or spinning on its wheels 302 and may be referred to as a "pan." One of skill in the art will understand, however, that this rotation may be in a vertical or y,z plane; this rotation may be caused by the device 110 tilting the microphone array 310 up or down and may be referred to as a "tilt." The systems and methods discussed herein may be used to compensate for rotation—panning or tilting—in either the horizontal plane or vertical plane or in multiple planes/along multiple axes at once.

One of skill in the art will further understand that the present disclosure may be extended to address rotation in multiple planes (i.e., simultaneous horizontal and vertical rotation). Thus, if θ represents an amount of horizontal rotation ("panning") and φ represents an amount of vertical rotation ("tilting"), the below rotation-compensation function (15) may be used to represent the output signal Y.

$$Y = g_1(\omega)l_1(\theta,\varphi) + g_2(\omega)l_2(\theta,\varphi) + \ldots + g_N(\omega)l_N(\theta,\varphi) \quad (15)$$

In equation (15) the functions l are vertical analogs of the functions f described above and may be determined similarly.

Similarly, the output signal Y may be determined by detecting an amount of horizontal and/or vertical movement—i.e., linear motion—of the device 110. For example, with reference to FIG. 4C, if the user 102 is in direction 7, but the device 110 moves in direction 8, the relative position of the user may move to direction 6. The device 110 may determine a distance from the device 110 to the user 102 in any of a number of ways, such as by analyzing images taken by one or more cameras 312/316. The device may thereafter determine an amount of movement, such as linear motion in the horizontal or x,y plane, based on data from one or more sensors, such as an accelerometer or positioning system. Based on the distance and the amount of movement, the device 110 may determine an amount to rotate the beams. The corresponding output signal Y may be thus represented by the below rotation-compensation function (16).

$$Y = g_1(\omega)i_1(x,y) + g_2(\omega)i_2(x,y) + \ldots + g_N(\omega)i_N(x,y) \quad (16)$$

One of skill in the art will understand that equation 7 may be modified to include terms from equation 3 or equation 6 to create an output signal Y that includes beam rotation compensation for movement and rotation in one or two dimensions.

In some embodiments, the systems and methods described herein may be used to increase a number of beams output by a fixed beamformer, such as the filter 608. For example, the filter 608 may output only eight beams, but operation of the device 110 may be improved by using a greater number of beams, such as sixteen beams. Changing the filter 608 to create the greater number of beams may be difficult or impossible, however, because its hardware or firmware cannot be changed, because an associated processor may not be fast enough to compute sixteen beams, or for any other reason. The rotation compensator 618 may thus be used to create additional beams by interpolating between existing beams. For example, the rotation compensator 618 may create a ninth beam corresponding to a ninth direction by interpolating between a first beam corresponding to direction one and a second beam corresponding to direction eight.

In certain embodiments, operations similar to those described with regard to FIG. 8 may be used for beam steering, for example using beam steering component 650.

The beam steering component 650 may receive a plurality of audio signals such as raw microphone data 602 from the microphone array and/or AF output(s) 606. The device 110 may determine filter coefficients corresponding to a desired direction, for example using angle data 616. Such filter coefficients may be stored in a lookup table corresponding to particular angular ranges (which may correspond to fixed directions with respect to the device as shown in FIG. 4C or may correspond to smaller angular ranges (for example, at a resolution of 5-10 degrees or some other range). The device 110 may also calculate such filter coefficients as needed. The beam steering component 650 may then process the audio signals using the filter coefficients (for example using operations such as those discussed in FIG. 8) to determine an output beam 627 corresponding to audio from the direction indicated by angle data 616.

As noted, the system may use computer vision (CV) techniques operating on image data (for example in a multi-user scenario) to determine whether a human is detected in image data, whether a particular input (for example speech or a gesture) is device directed, and/or to make other determinations. The system may thus use image data to determine when a user is speaking to the system. Such a visual indication may include, for example, raising a hand, turning to look from another user to look at a device 110, or the like. To make such determinations the system may use image processing techniques to determine if a human is represented in image data. This may include face detection techniques to detect a human face represented in image data (for example using object detection component 930 as discussed below). It may also include body detection, for example identifying one or more human body parts in image data, for example a head (whether the face is visible or not), a torso, an arm, a leg, a hand, etc. The system may use a classifier or other model configured to identify/track a face and/or determine whether a human is looking at a device 110 (for example using object tracking component 960 as discussed below). The system may also be configured to track a face in image data to understand which faces in the video are belonging to the same person and where they may be located in image data and/or relative to a device 110 (for example using user recognition component 295 and/or object tracking component 960 as discussed below) for various purposes, including beam selection/beam steering as discussed herein. The system may also be configured to perform gait detection/tracking to identify particular movement by a detected human and potentially match that movement to a particular user/user profile for purpose of user identification. The system may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement). The system may use components such as user recognition component 295, object tracking component 960, and/or other components to perform such operations. To determine whether speech or another input is system directed, the system may use the above information as well as techniques described below in reference to system directed input detector 285 and FIG. 11.

Beamforming and/or other audio processing techniques may also be used to determine a voice's direction/distance relative to the device 110. Such audio processing techniques, in combination with image processing techniques may be used (along with user identification techniques or operations such as those discussed below) may be used to match a voice to a face and track a user's voice/face in an environment of the device 110 whether a user appears in image data (e.g., in the field of view of a camera 312/316 of a device 110) or whether a user moves out of image data but is still detectable by the system 100 through audio data of the user's voice (or other data).

The system(s) 120 may include image processing component 245. The image processing component 245 may located across different physical and/or virtual machines. The image processing component 245 may receive and analyze image data (which may include single images or a plurality of images such as in a video feed). The image processing component 245 may work with other components of the system 120 to perform various operations. For example the image processing component 245 may work with user recognition component 295 to assist with user recognition using image data. The image processing component 245 may also include or otherwise be associated with image data storage 970 which may store aspects of image data used by image processing component 245. The image data may be of different formats such as JPEG, GIF, BMP, MPEG, video formats, and the like.

Image matching algorithms, such as those used by image processing component 245, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 970, profile storage 270, or other storage component.

Figure 9:
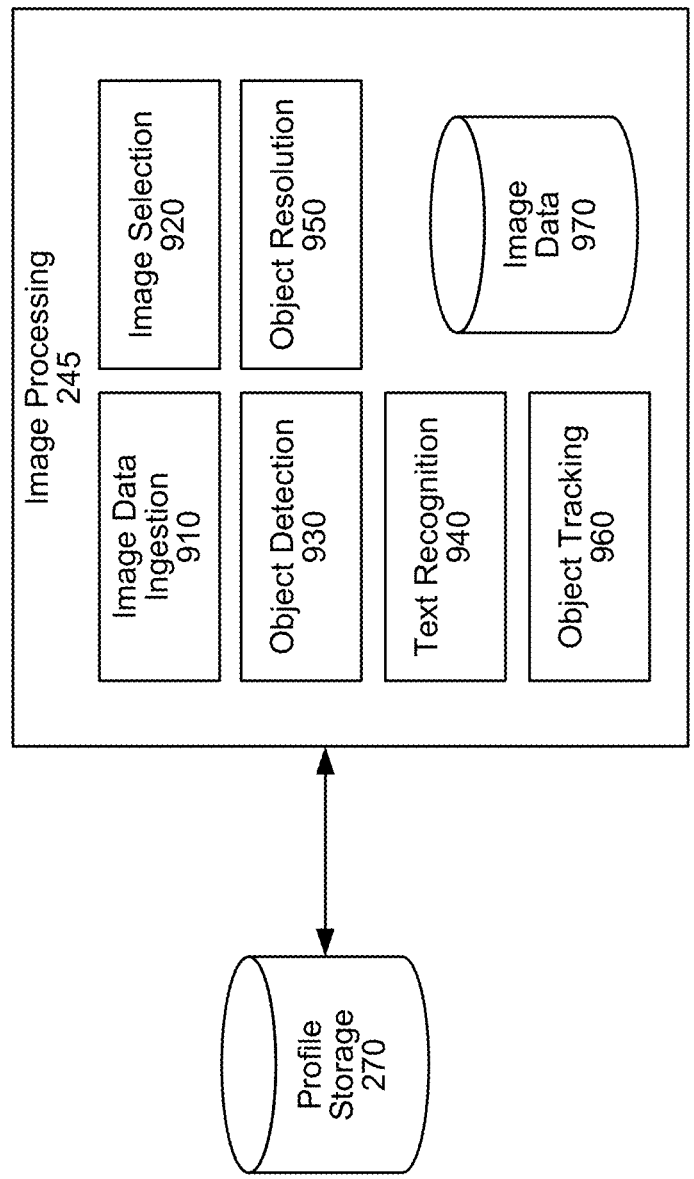
FIG. 9 is a conceptual diagram of components of an image processing component, according to embodiments of the present disclosure.

Image selection component 920 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 245 may be configured to select or discard an image quickly so that the system can, in turn, quickly process the selected image and deliver results to a user. The image selection component 920 may select an image for object recognition by computing a metric/feature for each frame in the video feed and selecting an image for processing if the metric exceeds a certain threshold. While FIG. 9 illustrates image selection component 920 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 920 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 920 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$ candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$ (candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 920 for sending to another component (e.g., from device to system 120) and/or for further processing, such as text recognition, object detection/resolution, etc.

The feature data calculated by image selection component 920 may be sent to other components such as text recognition component 940, objection detection component 930, object resolution component 950, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 930 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 930 may process at least a portion of the image data to determine feature data. The feature data is indicative of one or more features that are depicted in the image data. For example, the features may be face data, or other objects, for example as represented by stored data in profile storage 270. Other examples of features may include shapes of body parts or other such features that identify the presence of a human. Other examples of features may include edges of doors, shadows on the wall, texture on the walls, portions of artwork in the environment, and so forth to identify a space. The object detection component 930 may compare detected features to stored data (e.g., in profile storage 270, image data 970, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 930 the system may determine which object is actually seen using object resolution component 950. Thus one component, such as object detection component 930, may detect if an object is represented in an image while another component, object resolution component 950 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 930 may determine that a type of object is represented in image data and object resolution component 950 may then determine which specific object is represented. The object resolution component 950 may also make available specific data about a recognized object to further components so that further operations may be performed with regard to the resolved object.

Object detection component 930 may be configured to process image data to detect a representation of an approximately two-dimensional (2D) object (such as a piece of paper) or a three-dimensional (3D) object (such as a face). Such recognition may be based on available stored data (e.g., 270, 970, etc.) which in turn may have been provided through an image data ingestion process managed by image data ingestion component 910. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component 930 may be configured to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HIMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

Figure 10A:
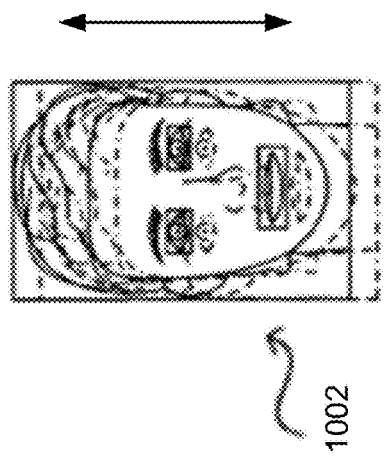
FIGS. 10A-10F illustrate examples of tracking a user's face in image data in accordance various embodiments.

After at least a portion of a user has been detected in image data captured by a computing device, approaches in accordance with various embodiments track the detected portion of the user, for example using object tracking component 960. The object tracking component 960, or other component(s), may use user recognition data 1395 or other information related to the user recognition component to identify and/or track a user using image data. FIGS. 10A-F illustrate certain approaches that can be utilized for detecting a face in image data (for example for purposes of determining a position of a face relative to a device 110 for beamforming purposes). FIGS. 10A-F also illustrate tracking a user in accordance with various embodiments. FIG. 10A illustrates an example wherein the approximate position and orientation of the face 1002 of a user has been determined and a virtual "box" 1020 is placed around the user's face using one or more of the various user detection processes discussed herein. A similar or different approach can also be used to determine an approximate location and area 1022 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 10B:
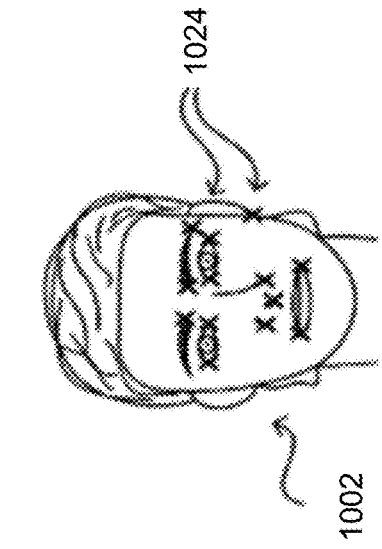

Various other approaches can also be used to track the user. For example, FIG. 10B illustrates an example wherein various features on a user's face are identified and assigned a point 1024 in the image. The system thus can detect various aspects of user facial features and can determine changes such as movement or change in shape or expression. Such an approach can provide advantages over the general approach of FIG. 10A in certain situations, as various points along a facial feature can be determined, such as the end points and at least one center point of a user's mouth. Accordingly, expressions such as a smile or frown can be captured even though the overall position of the user's mouth or face did not move.

Figure 10C:
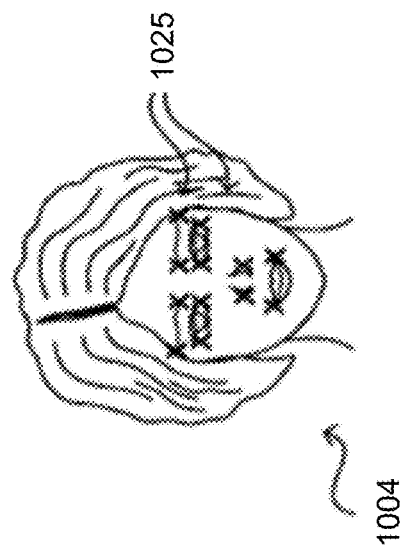
Figure 10D:
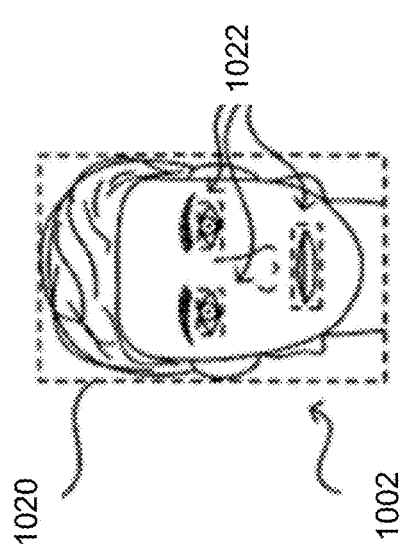
Figure 10E:
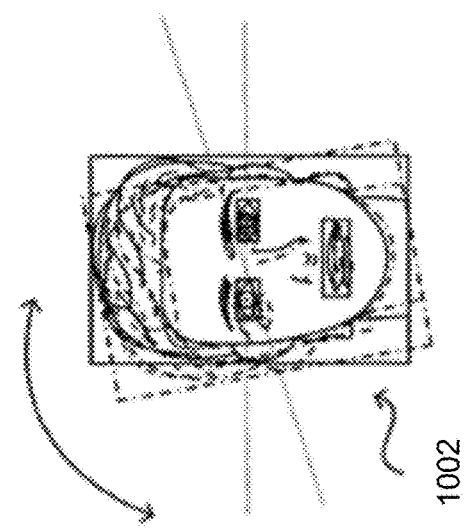

Once the facial features of a user are detected, relative motion or changes in facial expression can be tracked and utilized as input in accordance with various embodiments. For example, FIG. 10C illustrates an example where the user's head 1002 is moving up and down with respect to the viewable area of the imaging element. As discussed, this could be the result of the user shaking his or her head, or the user moving the device up and down, etc. FIG. 10D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 10E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 10F:
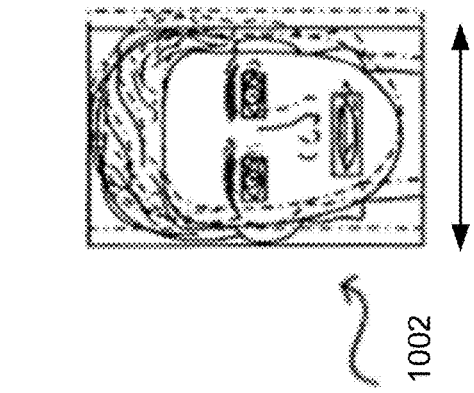

FIG. 10F illustrates another advantage of using an approach such as that described with respect to FIG. 10B to determine the position of various features on a user's face. In this example, it can be seen that the features of a head of a second user 1004 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Object tracking component 960 may also track other objects represented in image data. An object identified in image data (for example by object detection component 930) may appear in different position(s) in image data captured by a camera of device 110. Object tracking component 960 may track the object across image data and may (along with other component(s) of the system) attempt to determine a relative position of the object to the device 110 (or other reference point) over time using various techniques.

The device 110 and/or the system(s) 120 may include a user recognition component 295 that recognizes one or more users using a variety of data. As illustrated in FIG. 13, the user recognition component 295 may include one or more subcomponents including a vision component 1308, an audio component 1310, a biometric component 1312, a radio frequency (RF) component 1314, a machine learning (ML) component 1316, and a recognition confidence component 1318. In some instances, the user recognition component 295 may monitor data and determinations from one or more subcomponents to determine an identity of one or more users associated with data input to the device 110 and/or the system(s) 120. The user recognition component 295 may output user recognition data 1395, which may include a user identifier associated with a user the user recognition component 295 determines originated data input to the device 110 and/or the system(s) 120. The user recognition data 1395 may be used to inform processes performed by various components of the device 110 and/or the system(s) 120.

The vision component 1308 may receive data from one or more sensors capable of providing images (e.g., cameras) or sensors indicating motion (e.g., motion sensors). The vision component 1308 can perform facial recognition or image analysis to determine an identity of a user and to associate that identity with a user profile associated with the user. In some instances, when a user is facing a camera, the vision component 1308 may perform facial recognition and identify the user with a high degree of confidence. In other instances, the vision component 1308 may have a low degree of confidence of an identity of a user, and the user recognition component 295 may utilize determinations from additional components to determine an identity of a user. The vision component 1308 can be used in conjunction with other components to determine an identity of a user. For example, the user recognition component 295 may use data from the vision component 1308 with data from the audio component 1310 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1312. For example, the biometric component 1312 may receive data corresponding to fingerprints, iris or retina scans, thermal scans, weights of users, a size of a user, pressure (e.g., within floor sensors), etc., and may determine a biometric profile corresponding to a user. The biometric component 1312 may distinguish between a user and sound from a television, for example. Thus, the biometric component 1312 may incorporate biometric information into a confidence level for determining an identity of a user. Biometric information output by the biometric component 1312 can be associated with specific user profile data such that the biometric information uniquely identifies a user profile of a user.

The radio frequency (RF) component 1314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1314 the strength of the signal (e.g., as a received signal strength indication (RSSI)). The RF component 1314 may use the RSSI to determine an identity of a user (with an associated confidence level). In some instances, the RF component 1314 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1316 may track the behavior of various users as a factor in determining a confidence level of the identity of the user. By way of example, a user may adhere to a regular schedule such that the user is at a first location during the day (e.g., at work or at school). In this example, the ML component 1316 would factor in past behavior and/or trends in determining the identity of the user that provided input to the device 110 and/or the system(s) 120. Thus, the ML component 1316 may use historical data and/or usage patterns over time to increase or decrease a confidence level of an identity of a user.

In at least some instances, the recognition confidence component 1318 receives determinations from the various components 1308, 1310, 1312, 1314, and 1316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1395.

The audio component 1310 may receive data from one or more sensors capable of providing an audio signal (e.g., one or more microphones) to facilitate recognition of a user. The audio component 1310 may perform audio recognition on an audio signal to determine an identity of the user and associated user identifier. In some instances, aspects of device 110 and/or the system(s) 120 may be configured at a computing device (e.g., a local server). Thus, in some instances, the audio component 1310 operating on a computing device may analyze all sound to facilitate recognition of a user. In some instances, the audio component 1310 may perform voice recognition (e.g., matching data from audio data 211 to stored information) to determine an identity of a user.

The audio component 1310 may also perform user identification based on audio data 211 input into the device 110 and/or the system(s) 120 for speech processing. The audio component 1310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1310 may perform user recognition by comparing speech characteristics represented in the audio data 211 to stored speech characteristics of users (e.g., stored voice profiles associated with the device 110 that captured the spoken user input).

Configuration and operation of the system directed input detector 285 is illustrated in FIG. 11. As shown in FIG. 11, the system directed input detector 285 may include a number of different components. First, the system directed input detector 285 may include a voice activity detector (VAD) 1120. The VAD 1120 may operate to detect whether the incoming audio data 211 includes speech or not. The VAD output 1121 may be a binary indicator. Thus, if the incoming audio data 211 includes speech, the VAD 1120 may output an indicator 1121 that the audio data 211 does includes speech (e.g., a 1) and if the incoming audio data 211 does not includes speech, the VAD 1120 may output an indicator 1121 that the audio data 211 does not includes speech (e.g., a 0). The VAD output 1121 may also be a score (e.g., a number between 0 and 1) corresponding to a likelihood that the audio data 211 includes speech. The VAD 1120 may also perform start-point detection as well as end-point detection where the VAD 1120 determines when speech starts in the audio data 211 and when it ends in the audio data 211. Thus the VAD output 1121 may also include indicators of a speech start point and/or a speech endpoint for use by other components of the system. (For example, the start-point and end-points may demarcate the audio data 211 that is sent to the speech processing component 240.) The VAD output 1121 may be associated with a same unique ID as the audio data 211 for purposes of tracking system processing across various components.

The VAD 1120 may operate using a variety of VAD techniques, including those described above with regard to VAD operations performed by device 110. The VAD may be configured to be robust to background noise so as to accurately detect when audio data actually includes speech or not. The VAD 1120 may operate on raw audio data 211/602 such as that sent by device 110 or may operate on feature vectors or other data representing the audio data 211. For example, the VAD 1120 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 1120 may also operate on other data 1181 that may be useful in detecting voice activity in the audio data 211/602. For example, the other data 1181 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 1120 that speech was detected. If not, that may be an indicator to the VAD 1120 that speech was not detected. (For example, a representation may be taken of voice data in the first input audio data which may then be compared to the second input audio data to see if the voices match. If they do (or do not) that information may be considered by the VAD 1120.) The VAD 1120 may also consider other data when determining if speech was detected. The VAD 1120 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 1120 may also consider data regarding a previous utterance which may indicate whether the further audio data received by the system is likely to include speech. Other VAD techniques may also be used.

If the VAD output 1121 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 1121 indicates that speech was detected, the system may make a determination as to whether the speech was or was not directed to the speech-processing system. Such a determination may be made by the system directed audio detector 1140. The system directed audio detector 1140 may include a trained model, such as a DNN, that operates on a feature vector which represent certain data that may be useful in determining whether or not speech was directed to the system. To create the feature vector operable by the system directed audio detector 1140, a feature extractor 1130 may be used. The feature extractor 1130 may input ASR results 1110 which include results from the processing of the audio data 211 by the speech recognition component 250. For privacy protection purposes, in certain configurations the ASR results 1110 may be obtained from a speech processing component 240/ASR component 250 located on device 110 or on a home remote component as opposed to a speech processing component 240/ASR component 250 located on a cloud or other remote system 120 so that audio data 211 is not sent remote from the user's home unless the system directed input detector component 285 has determined that the input is system directed. Though this may be adjusted depending on user preferences/system configuration.

The ASR results 1110 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1110 may include a trellis, which may include a raw search graph as scored during ASR decoding. The ASR results 1110 may also include a lattice, which may be a trellis as scored that has been pruned to remove certain hypotheses that do not exceed a score threshold or number of hypotheses threshold. The ASR results 1110 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1110 may also include corresponding respective scores (such as for a trellis, lattice, confusion network, individual hypothesis, N-best list, etc.)

The ASR results 1110 (or other data 1191) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250 being less confident about its best hypothesis, which in turn may correlate to detected speech not being device directed. The entropy may be a feature included in other data 1191 to be considered by the system directed audio detector 1140.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 250 is less confident about the top hypothesis, which may correlate to detected speech not being device directed. Other such features or data from the ASR results 1110 may also be used as other data 1191.

The ASR results 1110 may be represented in a system directed detector (SDD) feature vector 1131 that can be used to determine whether speech was system-directed. The feature vector 1131 may represent the ASR results 1110 but may also represent audio data 211 (which may be input to feature extractor 1130) or other information. Such ASR results may be helpful in determining if speech was system-directed. For example, if ASR results include a high scoring single hypothesis, that may indicate that the speech represented in the audio data 211 was directed at, and intended for, the device 110. If, however, ASR results do not include a single high scoring hypothesis, but rather many lower scoring hypotheses, that may indicate some confusion on the part of the speech recognition component 250 and may also indicate that the speech represented in the audio data 211 was not directed at, nor intended for, the device 110.

The ASR results 1110 may include complete ASR results, for example ASR results corresponding to all speech between a startpoint and endpoint (such as a complete lattice, etc.). In this configuration the system may wait until all ASR processing for a certain input audio has been completed before operating the feature extractor 1130 and system directed audio detector 1140. Thus the system directed audio detector 1140 may receive a feature vector 1131 that includes all the representations of the audio data 211 created by the feature extractor 1130. The system directed audio detector 1140 may then operate a trained model (such as a DNN) on the feature vector 1131 to determine a score corresponding to a likelihood that the audio data 211 includes a representation of system-directed speech. If the score is above a threshold, the system directed audio detector 1140 may determine that the audio data 211 does include a representation of system-directed speech. The SDD result 1142 may include an indicator of whether the audio data includes system-directed speech, a score, and/or some other data.

The ASR results 1110 may also include incomplete ASR results, for example ASR results corresponding to only some speech between a between a startpoint and endpoint (such as an incomplete lattice, etc.). In this configuration the feature extractor 1130/system directed audio detector 1140 may be configured to operate on incomplete ASR results 1110 and thus the system directed audio detector 1140 may be configured to output an SSD result 1142 that provides an indication as to whether the portion of audio data processed (that corresponds to the incomplete ASR results) corresponds to system directed speech. The system may thus be configured to perform ASR at least partially in parallel with the system directed audio detector 1140 to process ASR result data as it is ready and thus continually update an SDD result 1142. Once the system directed input detector 285 has processed enough ASR results and/or the SDD result 1142 exceeds a threshold, the system may determine that the audio data 211 includes system-directed speech. Similarly, once the system directed input detector 285 has processed enough ASR results and/or the SDD result 1142 drops below another threshold, the system may determine that the audio data 211 does not include system-directed speech.

The SDD result 1142 may be associated with a same unique ID as the audio data 211 and VAD output 1121 for purposes of tracking system processing across various components.

The feature extractor 1130 may also incorporate in a feature vector 1131 representations of other data 1191. Other data 1191 may include, for example, word embeddings from words output by the speech recognition component 250 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1130 processing and representing a word embedding in a feature vector 1131 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1191 may also include, for example, NLU output from the natural language 260 component may be considered. Thus, if natural language output data indicates a high correlation between the audio data 211 and an out-of-domain indication, this may indicate that the audio data 211 does not include system-directed speech. Other data 1191 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech. The other data 1191 may also include an indication that a voice represented in audio data 211 is the same (or different) as the voice detected in previous input audio data corresponding to a previous utterance. The other data 1191 may also include directionality data, for example using beamforming or other audio processing techniques to determine a direction/location of a source of detected speech and whether that source direction/location matches a speaking user. The other data 1191 may also include data indicating that a direction of a user's speech is toward a device 110 or away from a device 110, which may indicate whether the speech was system directed or not.

Other data 1191 may also include image data 221. For example, if image data is detected from one or more devices that are nearby to the device 110 (which may include the device 110 itself) that captured the audio data being processed using the system directed input detector (285), the image data may be processed to determine whether a user is facing an audio capture device for purposes of determining whether speech is system-directed as further explained below.

Other data 1191 may also dialog history data. For example, the other data 1191 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 1191 may also include an indicator as to whether the audio data 211 was received as a result of a wake command or whether the audio data 211 was sent without the device 110 detecting a wake command (e.g., the device 110 being instructed by remote system 120 and/or determining to send the audio data without first detecting a wake command).

Other data 1191 may also include information from the user profile 270.

Other data 1191 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 1191 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 1191 may also include an indicator that indicates whether the audio data 211 includes a wakeword. For example, if a device 110 detects a wakeword prior to sending the audio data 211 to the remote system 120, the device 110 may send along an indicator that the device 110 detected a wakeword in the audio data 211. In another example, the remote system 120 may include another component that processes incoming audio data 211 to determine if it includes a wakeword. If it does, the component may create an indicator indicating that the audio data 211 includes a wakeword. The indicator may then be included in other data 1191 to be incorporated in the feature vector 1131 and/or otherwise considered by the system directed audio detector 1140.

Other data 1191 may also include device history data such as information about previous operations related to the device 110 that sent the audio data 211. For example, the other data 1191 may include information about a previous utterance that was just executed, where the utterance originated with the same device 110 as a current utterance and the previous utterance was within a certain time window of the current utterance. Device history data may be stored in a manner associated with the device identifier (which may also be included in other data 1191), which may also be used to track other information about the device, such as device hardware, capability, location, etc.

The other data 1181 used by the VAD 1120 may include similar data and/or different data from the other data 1191 used by the feature extractor 1130. The other data 1181/1191 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1140 and/or the VAD 1120) may be based on the data from the previous utterance. For example, a score threshold (for the system directed audio detector 1140 and/or the VAD 1120) may be based on acoustic data from a previous utterance.

The feature extractor 1130 may output a single feature vector 1131 for one utterance/instance of input audio data 211. The feature vector 1131 may consistently be a fixed length, or may be a variable length vector depending on the relevant data available for particular audio data 211. Thus, the system directed audio detector 1140 may output a single SDD result 1142 per utterance/instance of input audio data 211. The SDD result 1142 may be a binary indicator. Thus, if the incoming audio data 211 includes system-directed speech, the system directed audio detector 1140 may output an indicator 1142 that the audio data 211 does includes system-directed speech (e.g., a 1) and if the incoming audio data 211 does not includes system-directed speech, the system directed audio detector 1140 may output an indicator 1142 that the audio data 211 does not system-directed includes speech (e.g., a 0). The SDD result 1142 may also be a score (e.g., a number between 0 and 1) corresponding to a likelihood that the audio data 211 includes system-directed speech. Although not illustrated in FIG. 11, the flow of data to and from the system directed input detector 285 may be managed by the orchestrator 230 or by one or more other components.

The trained model(s) of the system directed audio detector 1140 may be trained on many different examples of SDD feature vectors that include both positive and negative training samples (e.g., samples that both represent system-directed speech and non-system directed speech) so that the DNN and/or other trained model of the system directed audio detector 1140 may be capable of robustly detecting when speech is system-directed versus when speech is not system-directed.

A further input to the system directed input detector 285 may include output data from TTS component 280 to avoid synthesized speech output by the system being confused as system-directed speech spoken by a user. The output from the TTS component 280 may allow the system to ignore synthesized speech in its considerations of whether speech was system directed. The output from the TTS component 280 may also allow the system to determine whether a user captured utterance is responsive to the TTS output, thus improving system operation.

The system directed input detector 285 may also use echo return loss enhancement (ERLE) and/or acoustic echo cancellation (AEC) data to avoid processing of audio data generated by the system.

As shown in FIG. 11, the system directed input detector 285 may simply user audio data to determine whether an input is system directed (for example, system directed audio detector 1140 may output an SDD result 1142). This may be true particularly when no image data is available (for example for a device without a camera). If image data 221 is available, however, the system may also be configured to use image data 221 to determine if an input is system directed. The image data 221 may include image data captured by device 110 and/or image data captured by other device(s) in the environment of device 110. The audio data 211, image data 221 and other data 1181 may be time-stamped or otherwise correlated so that the system directed input detector 285 may determine that the data being analyzed all relates to a same time window so as to ensure alignment of data considered with regard to whether a particular input is system directed. For example, the system directed input detector 285 may determine system directedness scores for every frame of audio data/every image of a video stream and may align and/or window them to determine a single overall score for a particular input that corresponds to a group of audio frames/images.

Image data 221 along with other data 1181 may be received by feature extractor 1135. The feature extractor may create one or more feature vectors 1136 which may represent the image data 221/other data 1181. In certain examples, other data 1181 may include data from image processing component 245 which may include information about faces, gesture, etc. detected in the image data 221. For privacy protection purposes, in certain configurations any image processing/results thereof may be obtained from an image processing component 245 located on device 110 or on a home remote component as opposed to a image processing component 245 located on a cloud or other remote system 120 so that image data 221 is not sent remote from the user's home unless the system directed input detector component 285 has determined that the input is system directed. Though this may be adjusted depending on user preferences/system configuration.

The feature vector 1136 may be passed to the user detector 1125. The user detector 1125 (which may use various components/operations of image processing component 245, user recognition component 295, etc.) may be configured to process image data 221 and/or feature vector 1136 to determine information about the user's behavior which in turn may be used to determine if an input is system directed. For example, the user detector 1125 may be configured to determine the user's position/behavior with respect to device 110/system 100. The user detector 1125 may also be configured to determine whether a user's mouth is opening/closing in a manner that suggests the user is speaking. The user detector 1125 may also be configured to determine whether a user is nodding or shaking his/her head. The user detector 1125 may also be configured to determine whether a user's gaze is directed to the device 110, to another user, or to another object. The user detector 1125 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 1125 may also be configured to determine a user's position/orientation such as facing another user, facing the device 110, whether their back is turned, etc. The user detector 1125 may also be configured to determine relative positions of multiple users that appear in image data (and/or are speaking in audio data 211 which may also be considered by the user detector 1125 along with feature vector 1131), for example which users are closer to a device 110 and which are farther away. The user detector 1125 (and/or other component) may also be configured to identify other objects represented in image data and determine whether objects are relevant to a dialog or system interaction (for example determining if a user is referring to an object through a movement or speech).

The user detector 1125 may operate one or more models (e.g., one or more classifiers) to determine if certain situations are represented in the image data 221. For example the user detector 1125 may employ a visual directedness classifier that may determine, for each face detected in the image data 221 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3d angle of the face and predict a directness score based on the 3d angle.

The user detector 1125 (or other component(s) such as those in image processing 245) may be configured to track a face in image data to determine which faces represented may belong to a same person. The system may user IOU based tracker, a mean-shift based tracker, a particle filter based tracker or other technique.

The user detector 1125 (or other component(s) such as those in user recognition component 295) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

Figure 12:
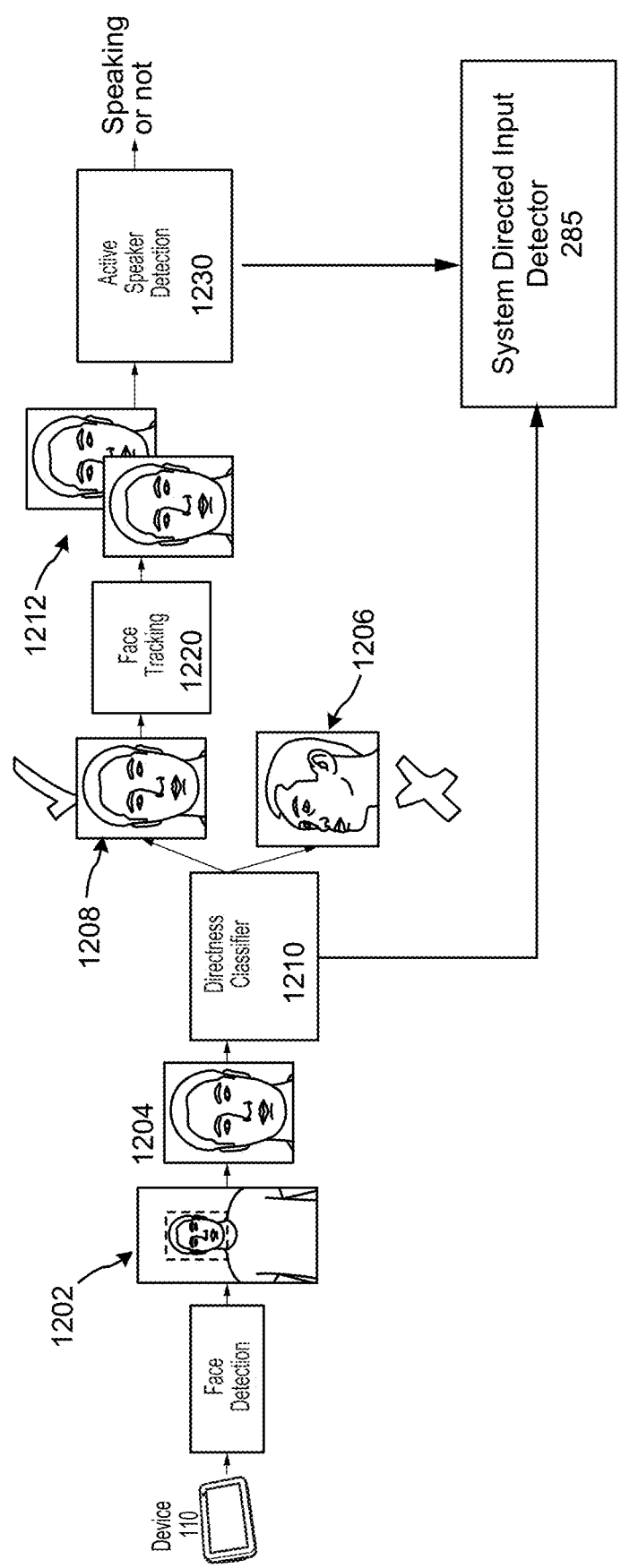
FIG. 12 illustrates techniques for identifying a face in image data and determining if the face is speaking, according to embodiments of the present disclosure.

For example, as shown in FIG. 12, device 110 may receive image data 211 from one or more camera(s) 312/316 and may use a face detection algorithm (executed, for example, by object detection component 930) to identify a face in image data, as shown by bounded face 1202. The device 110 may then isolate the image data 1204 of the face and process that image data using a directness classifier 1210 (for example as executed by object tracking component 960 and/or user detector 1125) to determine if the user's gaze is directed to the device or elsewhere. If the user is not looking at the device (e.g., as shown in image 1206) then the system may determine that user's gaze is directed elsewhere and the appropriate component may output data accordingly. If the user is looking at the device (e.g., as shown in image 1208) then the system may determine that user's gaze is directed at the device and may commence tracking the user's face using a face tracking component 1220 (for example as part of object tracking component 960). The system may then refer to a series of images 1212 of the same face and process related image data by an active speaker detection component 1230 (for example as part of user detector 1125) to determine if the face represented in image data 211/1204/1208 is speaking. Data output by the directness classifier 1210 and active speaker detection component 1230 may be sent to the system directed image detector 1150 and/or system directed detector 1170 to determine if an input is system directed.

The user detector 1125 may thus output one or more scores or other data indicating user behavior or other data determined from the image data and pass that data to system directed image detector 1150. For example, the user detector 11 may pass a variety of score representing the image data. For example:

<Face 1: Gazing at Device [1:Yes]>
<Face 2: Gazing at Device [0:No]>
<Face 3: Gazing at Device [1:Yes]>
<Face 1: Speaking [1:Yes]>
<Face 2: Speaking [0:No]>
<Face 3: Speaking [0:No]>
<Face 1: User pointing at device [0.875]>

And/or the like. The scores may each be associated with time data (such as a timestamp, frame number, etc.) so the data from the user detector 1125/system directed image detector 1150 may be aligned with the data from the feature extractor 1130/system directed audio detector 1140.

The system directed image detector 1150 may then determine, based on information from the user detector 1125 as based on the image data whether an input relating to the image data is system directed. That determination may result in a score indicating whether the input is system directed based on the image data. If no audio data is available, the indication may be output as SDD result 1142. If audio data is available, the indication may be sent to system directed detector 1170 which may consider information from both system directed audio detector 1140 and system directed image detector 1150. The system directed detector 1170 may then process the data from both system directed audio detector 1140 and system directed image detector 1150 to come up with an overall determination as to whether an input was system directed, which may be output as SDD result 1142. The system directed detector 1170 may consider not only data output from system directed audio detector 1140 and system directed image detector 1150 but also other data/metadata corresponding to the input. The system directed detector 1170 may include one or more models which may analyze the various input data to make a determination regarding SDD result 1142.

In one example the determination of the system directed detector 1170 may be based on "AND" logic, for example determining an input is system directed only if affirmative data is received from both system directed audio detector 1140 and system directed image detector 1150. In another example the determination of the system directed detector 1170 may be based on "OR" logic, for example determining an input is system directed if affirmative data is received from either system directed audio detector 1140 or system directed image detector 1150. In another example the data received from system directed audio detector 1140 and system directed image detector 1150 are weighted individually based on other information available to system directed detector 1170 to determine to what extend audio and/or image data should impact the decision of whether an input is system directed.

The system directed input detector 285 may also receive information from a wakeword component 220. For example, an indication that a wakeword was detected (e.g., WW data 1144) may be considered by the system directed input detector 285 (e.g., by system directed audio detector 1140, system directed detector 1170, etc.) as part of the overall consideration of whether a system input was device directed.

Detection of a wakeword may be considered a strong signal that a particular input was device directed.

If an input is determined to be system directed, the data related to the input may be sent to downstream components for further processing (e.g., to speech processing 240). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 211 or image data 221) sent to a remote system 120 that is outside a user's home or other direct control.

The various components of FIG. 11 may take a nuanced analysis and may determine whether an input is system directed based on a combination of scores from different components and weighting those scores to ultimately make a determination of whether an input is system directed. For example, system directed image detector 1150 may output data including a score to the system directed detector 1170. Similarly, the system directed audio detector 1140 may output data including a score to the system directed detector 1170. The system directed detector 1170 may process the score(s) using a model or other component to determine whether an input satisfies a threshold or other condition to determine that an input is system directed, and thereby indicate the results in SDD result 1142.

In addition to the WW component 220 informing decision-making processing of the system directed input detector 285, the system directed input detector 285 may also inform decision-making processing of the WW component 220. For example, the device 110 may be configured to "wake" after it is determined that the user is looking at the device (or a particular location on the device) for a certain threshold of time. In this scenario a gaze detector, for example operated by the user detector 1125 and/or image processing component 245, may determine the user is looking at the device and may trigger the WW component 220 or other component to wake the device 110 for further processing of input data.

Figure 14:
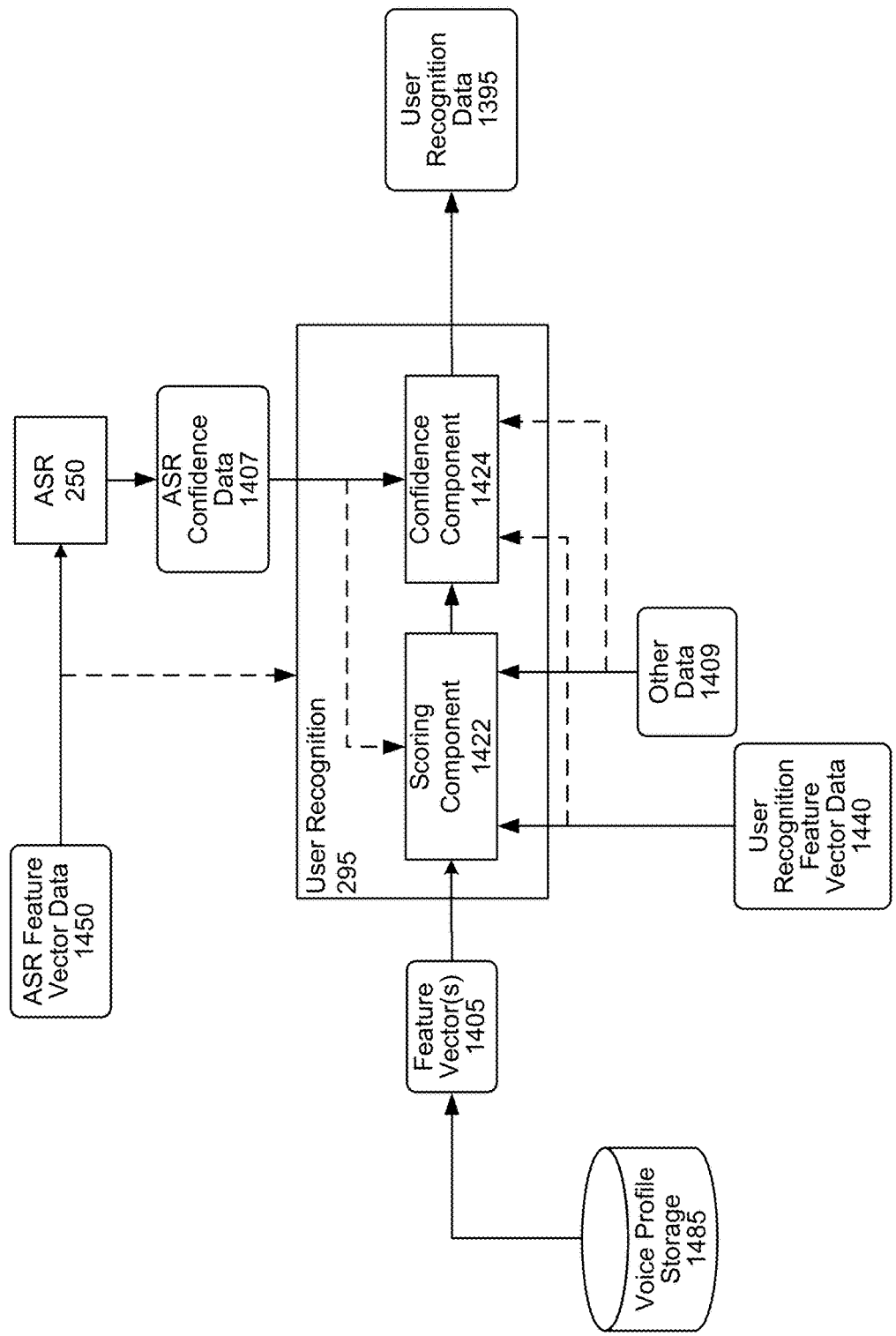
FIG. 14 is a system flow diagram illustrating user recognition according to embodiments of the present disclosure.

FIG. 14 illustrates user recognition processing as may be performed by the user recognition component 295. The ASR component 250 performs ASR processing on ASR feature vector data 1450. ASR confidence data 1407 may be passed to the user recognition component 295.

The user recognition component 295 performs user recognition using various data including the user recognition feature vector data 1440, feature vectors 1405 representing voice profiles of users of the system 100, the ASR confidence data 1407, and other data 1409. The user recognition component 295 may output the user recognition data 1395, which reflects a certain confidence that the user input was spoken by one or more particular users. The user recognition data 1395 may include one or more user identifiers (e.g., corresponding to one or more voice profiles). Each user identifier in the user recognition data 1395 may be associated with a respective confidence value, representing a likelihood that the user input corresponds to the user identifier. A confidence value may be a numeric or binned value.

The feature vector(s) 1405 input to the user recognition component 295 may correspond to one or more voice profiles. The user recognition component 295 may use the feature vector(s) 1405 to compare against the user recognition feature vector 1440, representing the present user input, to determine whether the user recognition feature vector 1440 corresponds to one or more of the feature vectors 1405 of the voice profiles. Each feature vector 1405 may be the same size as the user recognition feature vector 1440.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1440 produced from the audio data 211. The user recognition component 295 may send a signal to voice profile storage 1485, with the signal requesting only audio data and/or feature vectors 1405 (depending on whether audio data and/or corresponding feature vectors are stored) associated with the device identifier, the group profile identifier, and/or the user identifiers represented in the metadata. This limits the universe of possible feature vectors 1405 the user recognition component 295 considers at runtime and thus decreases the amount of time to perform user recognition processing by decreasing the amount of feature vectors 1405 needed to be processed. Alternatively, the user recognition component 295 may access all (or some other subset of) the audio data and/or feature vectors 1405 available to the user recognition component 295. However, accessing all audio data and/or feature vectors 1405 will likely increase the amount of time needed to perform user recognition processing based on the magnitude of audio data and/or feature vectors 1405 to be processed.

If the user recognition component 295 receives audio data from the voice profile storage 1485, the user recognition component 295 may generate one or more feature vectors 1405 corresponding to the received audio data.

The user recognition component 295 may attempt to identify the user that spoke the speech represented in the audio data 211 by comparing the user recognition feature vector 1440 to the feature vector(s) 1405. The user recognition component 295 may include a scoring component 1422 that determines respective scores indicating whether the user input (represented by the user recognition feature vector 1440) was spoken by one or more particular users (represented by the feature vector(s) 1405). The user recognition component 295 may also include a confidence component 1424 that determines an overall accuracy of user recognition processing (such as those of the scoring component 1422) and/or an individual confidence value with respect to each user potentially identified by the scoring component 1422. The output from the scoring component 1422 may include a different confidence value for each received feature vector 1405. For example, the output may include a first confidence value for a first feature vector 1405a (representing a first voice profile), a second confidence value for a second feature vector 1405b (representing a second voice profile), etc. Although illustrated as two separate components, the scoring component 1422 and the confidence component 1424 may be combined into a single component or may be separated into more than two components.

The scoring component 1422 and the confidence component 1424 may implement one or more trained machine learning models (such as neural networks, classifiers, etc.) as known in the art. For example, the scoring component 1422 may use probabilistic linear discriminant analysis (PLDA) techniques. PLDA scoring determines how likely it is that the user recognition feature vector 1440 corresponds to a particular feature vector 1405. The PLDA scoring may generate a confidence value for each feature vector 1405 considered and may output a list of confidence values associated with respective user identifiers. The scoring component 1422 may also use other techniques, such as GMMs, generative Bayesian models, or the like, to determine confidence values.

The confidence component 1424 may input various data including information about the ASR confidence 1407, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 1424 may also consider the confidence values and associated identifiers output by the scoring component 1422. For example, the confidence component 1424 may determine that a lower ASR confidence 1407, or poor audio quality, or other factors, may result in a lower confidence of the user recognition component 295. Whereas a higher ASR confidence 1407, or better audio quality, or other factors, may result in a higher confidence of the user recognition component 295. Precise determination of the confidence may depend on configuration and training of the confidence component 1424 and the model(s) implemented thereby. The confidence component 1424 may operate using a number of different machine learning models/techniques such as GMM, neural networks, etc. For example, the confidence component 1424 may be a classifier configured to map a score output by the scoring component 1422 to a confidence value.

The user recognition component 295 may output user recognition data 1395 specific to a one or more user identifiers. For example, the user recognition component 295 may output user recognition data 1395 with respect to each received feature vector 1405. The user recognition data 1395 may include numeric confidence values (e.g., 0.0-1.0, 0-1000, or whatever scale the system is configured to operate). Thus, the user recognition data 1395 may output an n-best list of potential users with numeric confidence values (e.g., user identifier 123—0.2, user identifier 234—0.8). Alternatively or in addition, the user recognition data 1395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1395 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 1424 may determine the overall confidence value.

The confidence component 1424 may determine differences between individual confidence values when determining the user recognition data 1395. For example, if a difference between a first confidence value and a second confidence value is large, and the first confidence value is above a threshold confidence value, then the user recognition component 295 is able to recognize a first user (associated with the feature vector 1405 associated with the first confidence value) as the user that spoke the user input with a higher confidence than if the difference between the confidence values were smaller.

The user recognition component 295 may perform thresholding to avoid incorrect user recognition data 1395 being output. For example, the user recognition component 295 may compare a confidence value output by the confidence component 1424 to a threshold confidence value. If the confidence value does not satisfy (e.g., does not meet or exceed) the threshold confidence value, the user recognition component 295 may not output user recognition data 1395, or may only include in that data 1395 an indicator that a user that spoke the user input could not be recognized. Further, the user recognition component 295 may not output user recognition data 1395 until enough user recognition feature vector data 1440 is accumulated and processed to verify a user above a threshold confidence value. Thus, the user recognition component 295 may wait until a sufficient threshold quantity of audio data of the user input has been processed before outputting user recognition data 1395. The quantity of received audio data may also be considered by the confidence component 1424.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1405, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 1409 to inform user recognition processing. A trained model(s) or other component of the user recognition component 295 may be trained to take other data 1409 as an input feature when performing user recognition processing. Other data 1409 may include a variety of data types depending on system configuration and may be made available from other sensors, devices, or storage. The other data 1409 may include a time of day at which the audio data 211 was generated by the device 110 or received from the device 110, a day of a week in which the audio data audio data 211 was generated by the device 110 or received from the device 110, etc.

The other data 1409 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 1440 and one or more feature vectors 1405 to perform more accurate user recognition processing.

The other data 1409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1409 may include data representing activity of a particular user that may be useful in performing user recognition processing. For example, a user may have recently entered a code to disable a home security alarm. A device 110, represented in a group profile associated with the home, may have generated the audio data 211. The other data 1409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 1409 and considered by the user recognition component 295.

Depending on system configuration, the other data 1409 may be configured to be included in the user recognition feature vector data 1440 so that all the data relating to the user input to be processed by the scoring component 1422 may be included in a single feature vector. Alternatively, the other data 1409 may be reflected in one or more different data structures to be processed by the scoring component 1422.

FIG. 15A-15D are block diagrams conceptually illustrating a device 110 that may be used with the system. FIG. 16 is a block diagram conceptually illustrating example components of a remote device, such as the system(s) 120, which may assist with creating a map of an environment 390, ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations.

A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/225) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1502/1602).

Computer instructions for operating each device (110/120/225) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/225) includes input/output device interfaces (1502/1602). A variety of components may be connected through the input/output device interfaces (1502/1602), as will be discussed further below. Additionally, each device (110/120/225) may include an address/data bus (1524/1624) for conveying data among components of the respective device. Each component within a device (110/120/225) may also be directly connected to other components in addition to (or instead of) being connected to other components across the bus (1524/1624).

Figure 15A:
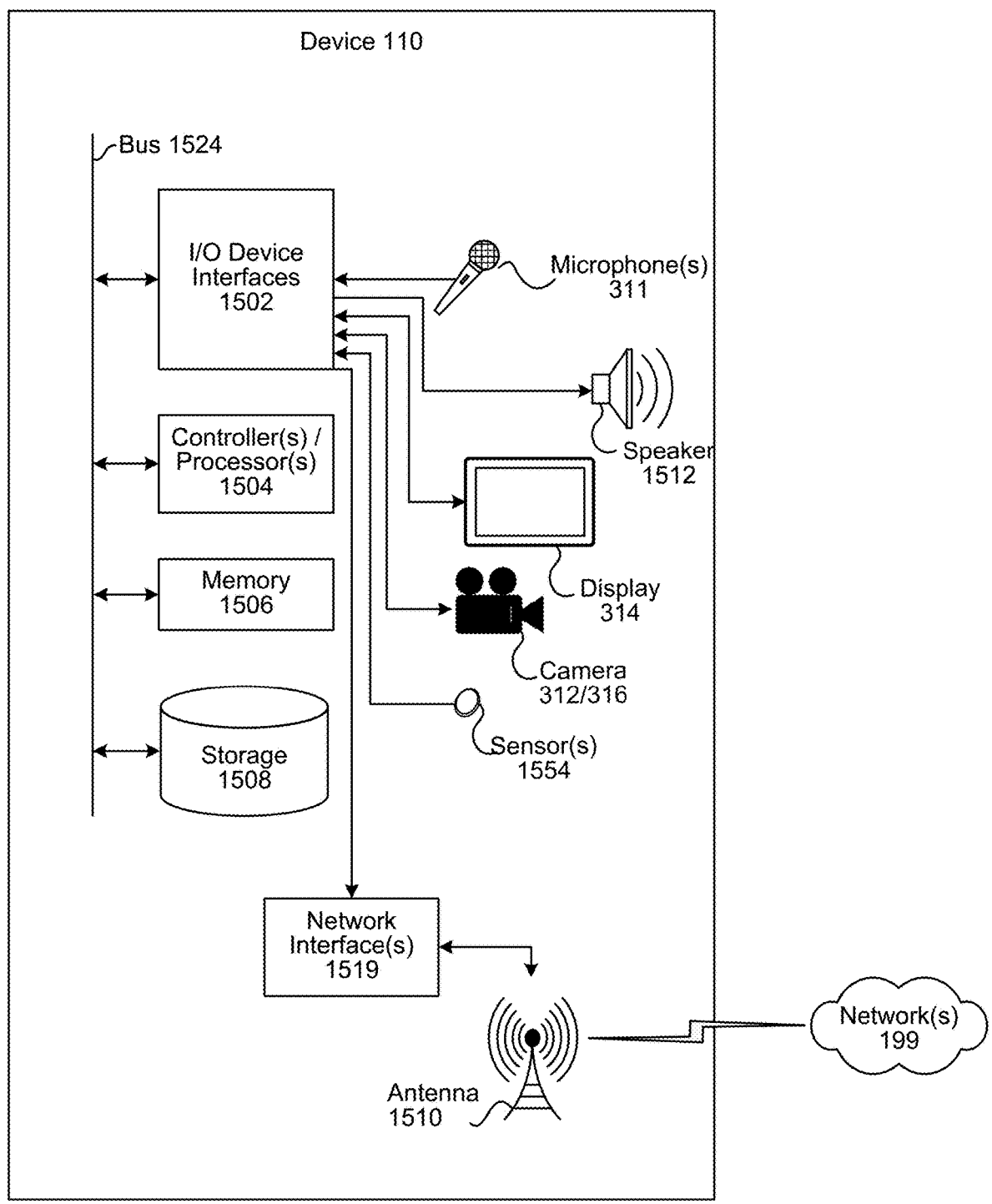
FIG. 15A is a block diagram conceptually illustrating example components of a device according to embodiments of the present disclosure.
Figure 16:
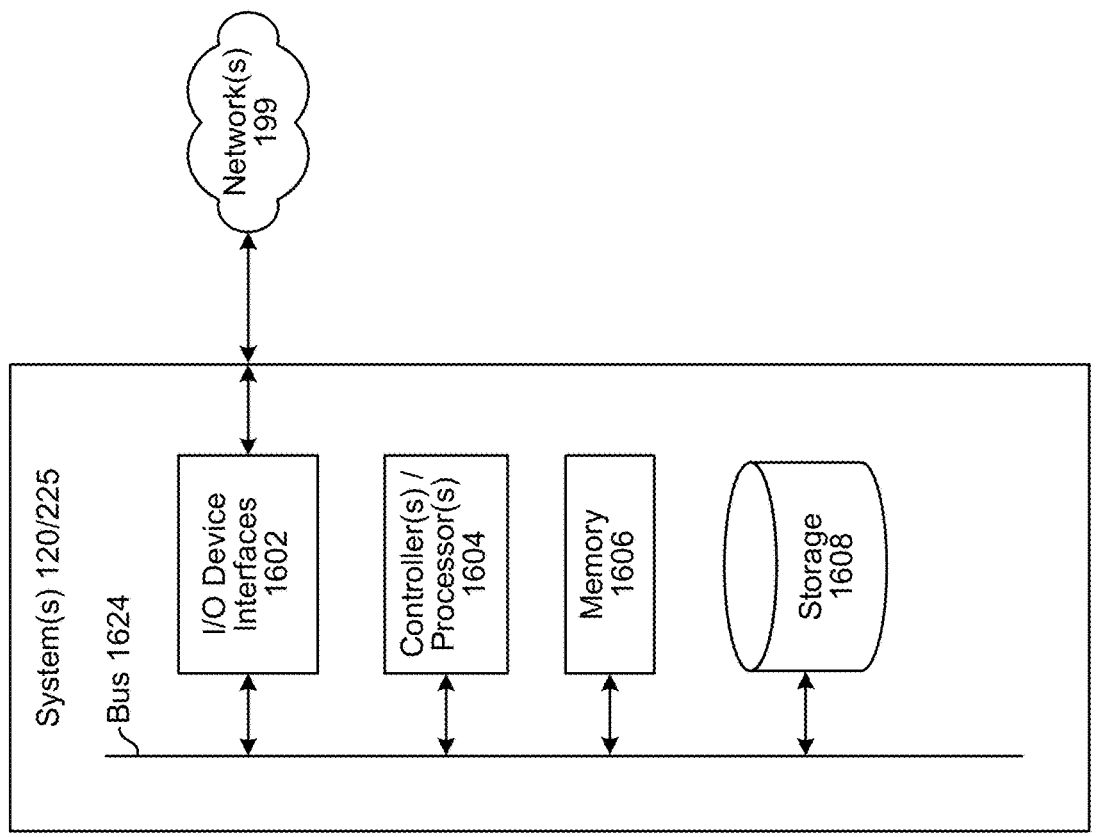
FIG. 16 is a block diagram conceptually illustrating example components of a server according to embodiments of the present disclosure.

FIG. 15A is a block diagram of some components of the device 110 such as network interfaces 1519, sensors 1554, and output devices, according to some implementations. The components illustrated here are provided by way of illustration and not necessarily as a limitation. For example, the device 110 may utilize a subset of the particular network interfaces 1519, output devices, or sensors 1554 depicted here, or may utilize components not pictured. One or more of the sensors 1554, output devices, or a combination thereof may be included on a moveable component that may be panned, tilted, rotated, or any combination thereof with respect to a chassis of the device 110.

The device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 311 or array of microphones, a wired headset or a wireless headset, etc. If an array of microphones is included, approximate distance to a sound's point of origin may be determined by acoustic localization based on time and amplitude differences between sounds captured by different microphones of the array. The device 110 may additionally include a display 314 for displaying content. The device 110 may further include a camera 312, light, button, actuator, and/or sensor 1554.

The network interfaces 1519 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the device 110 and other devices in the event that communication fails using one or more of the WLAN interface or the PAN interface. For example, in the event the device 110 travels to an area within the environment 390 that does not have Wi-Fi coverage, the device 110 may use the secondary RF link interface to communicate with another device such as a specialized access point, docking station, or other device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1502/1602) may also include and/or communicate with communication components (such as network interface(s) 1519) that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1502/1602), processor(s) (1504/1604), memory (1506/1606), and/or storage (1508/1608) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 15B:
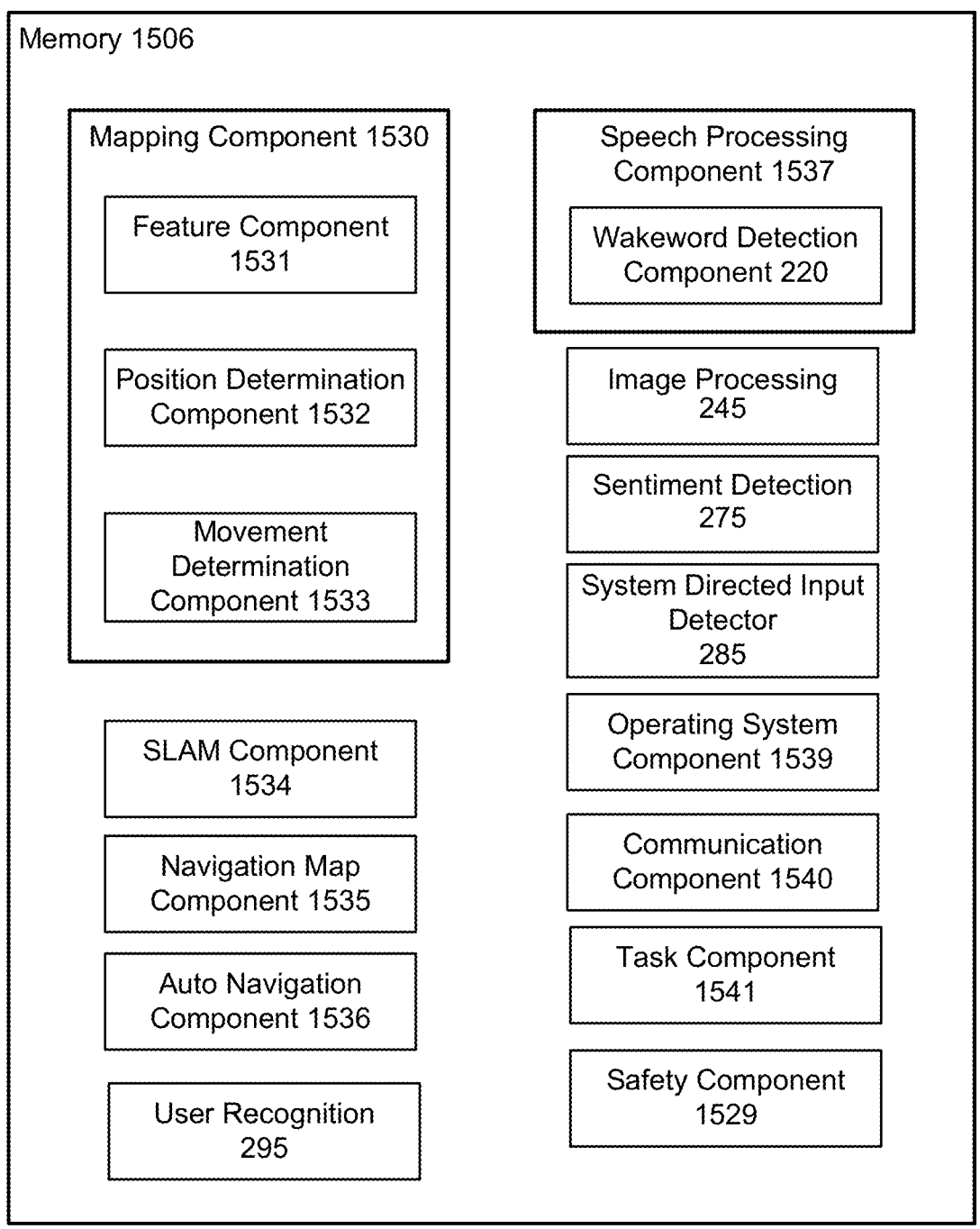
FIG. 15B illustrates components that may be stored in a memory of a device according to embodiments of the present disclosure.
Figure 15C:
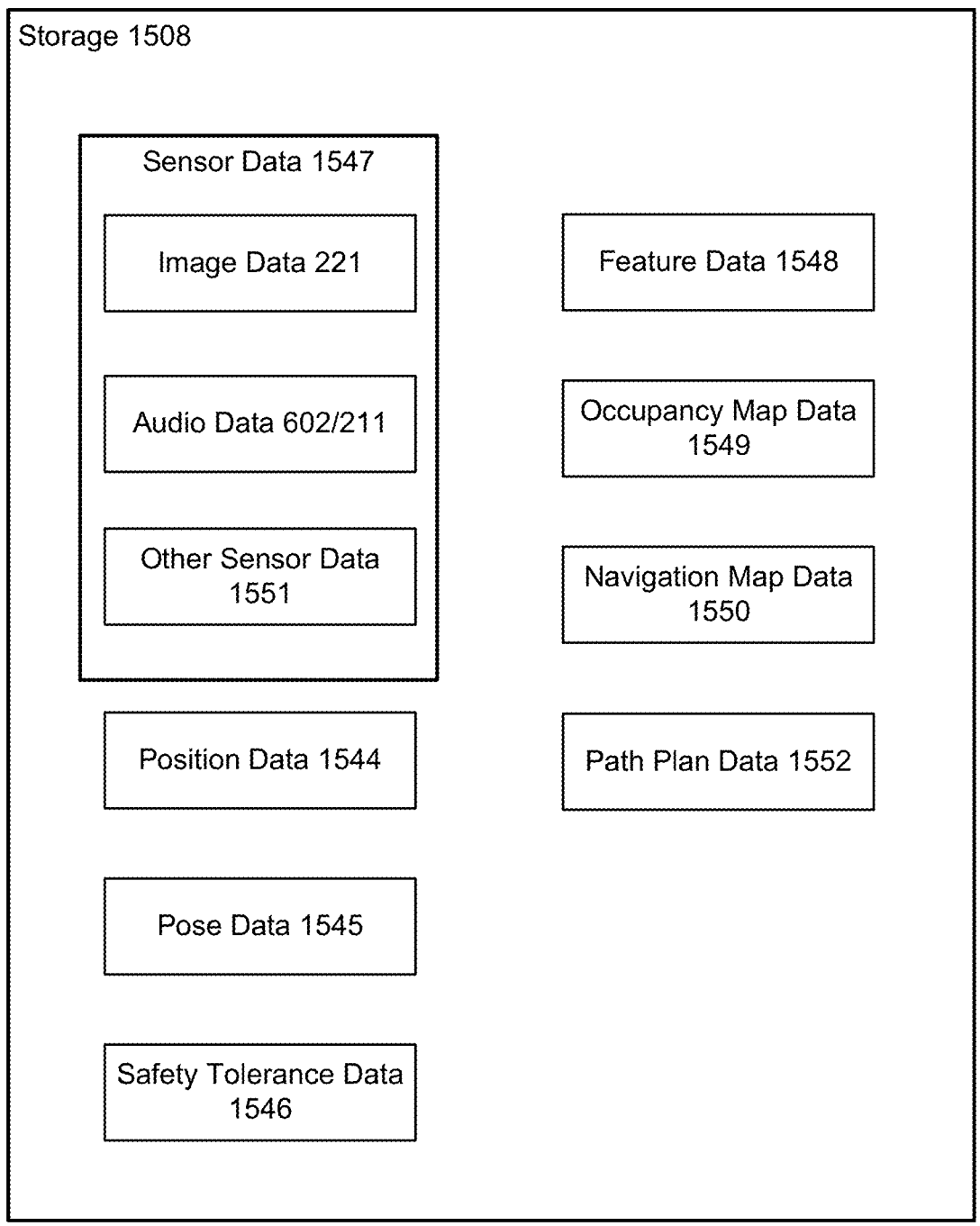
FIG. 15C illustrates data that may be stored in a storage of an autonomously motile device according to embodiments of the present disclosure.
Figure 15D:
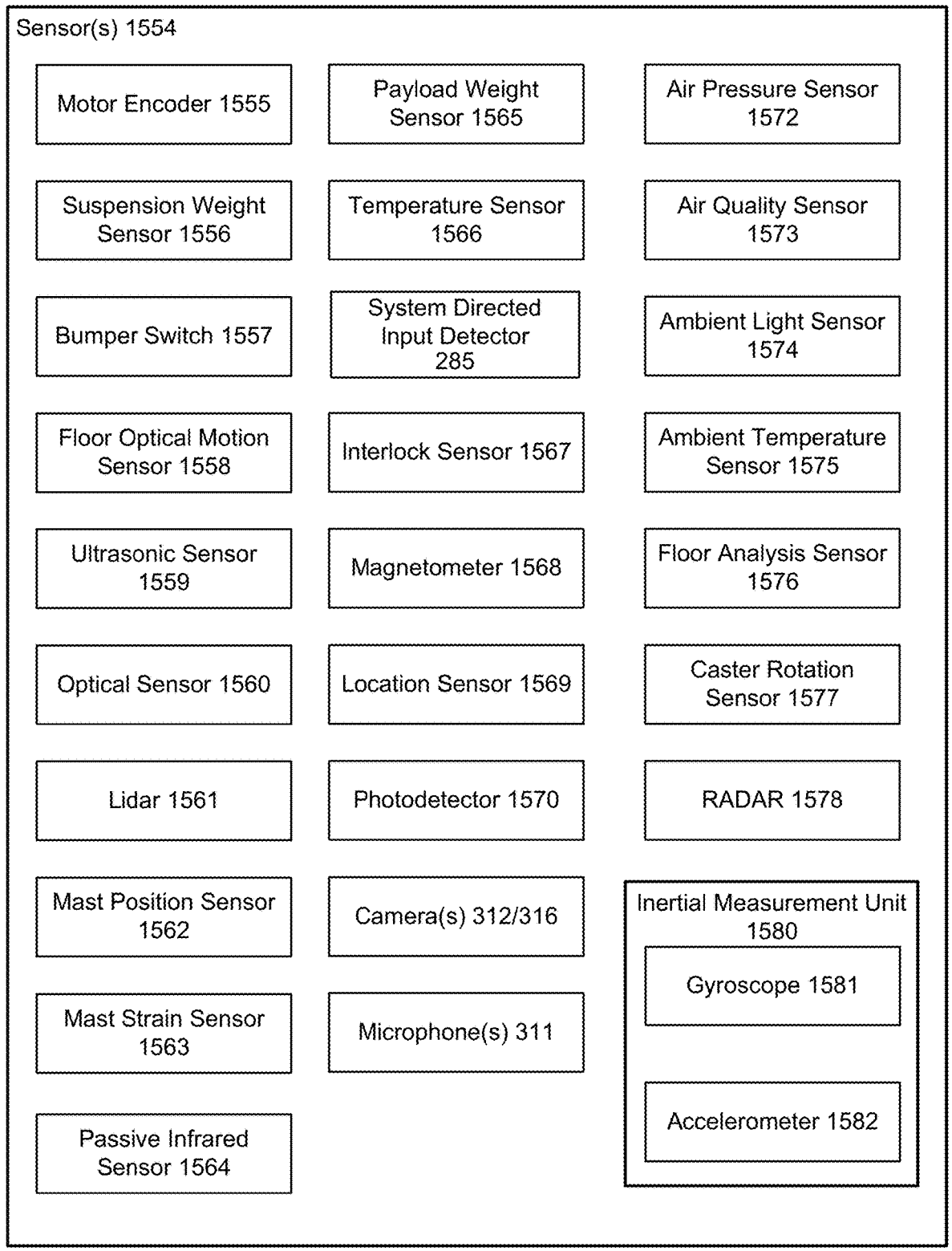
FIG. 15D illustrates sensors that may be included as part of an autonomously motile device according to embodiments of the present disclosure.

FIG. 15B illustrates components that may be stored in a memory of the device 110 according to embodiments of the present disclosure. Although illustrated as included in memory 1506, the components (or portions thereof) may also be included in hardware and/or firmware. FIG. 15C illustrates data that may be stored in a storage of the device 110 according to embodiments of the present disclosure. Although illustrated as stored in storage 1508, the data may be stored in memory 1506 or in another component. FIG. 15D illustrates sensors that may be included as part of the device 110 according to embodiments of the present disclosure.

A position determination component 1532 determines position data 1544 indicative of a position 384 of the feature 386 in the environment 390. In one implementation the position 384 may be expressed as a set of coordinates with respect to the first camera 312a. The position determination component 1532 may use a direct linear transformation triangulation process to determine the position 384 of a feature 386 in the environment 390 based on the difference in apparent location of that feature 386 in two images acquired by two cameras 312 separated by a known distance.

A movement determination module 1533 determines if the feature 386 is stationary or non-stationary. First position data 1544a indicative of a first position 384a of a feature 386 depicted in the first pair of images 382a acquired at time t_1 is determined by the position determination component 1532. Second position data 1544b of the same feature 386 indicative of a second position 384b of the same feature 386 as depicted in the second pair of images 382b acquired at time t_2 is determined as well. Similar determinations made for data relative to first position 384a and second position 384b may also be made for third position 384c, and so forth.

The movement determination module 1533 may use inertial data from the IMU 1580 or other sensors that provides information about how the device 110 moved between time t_1 and time t_2. The inertial data and the first position data 1544a is used to provide a predicted position of the feature 386 at the second time. The predicted position is compared to the second position data 1544b to determine if the feature is stationary or non-stationary. If the predicted position is less than a threshold value from the second position 384b in the second position data 1544b, then the feature 386 is deemed to be stationary.

Features 386 that have been deemed to be stationary may be included in the second feature data. The second feature data may thus exclude non-stationary features 386 and comprise a subset of the first feature data 1548 which comprises stationary features 386.

The second feature data may be used by a simultaneous localization and mapping (SLAM) component 1534. The SLAM component 1534 may use second feature data to determine pose data 1545 that is indicative of a location of the device 110 at a given time based on the appearance of features 386 in pairs of images 382. The SLAM component 1534 may also provide trajectory data indicative of the trajectory 380 that is based on a time series of pose data 1545 from the SLAM component 1534.

Other information, such as depth data from a depth sensor, the position data 1544 associated with the features 386 in the second feature data, and so forth, may be used to determine the presence of obstacles 383 in the environment 390 as represented by an occupancy map as represented by occupancy map data 1549.

The occupancy map data 1549 may comprise data that indicates the location of one or more obstacles 383, such as a table, wall, stairwell, and so forth. In some implementations, the occupancy map data 1549 may comprise a plurality of cells with each cell of the plurality of cells representing a particular area in the environment 390. Data, such as occupancy values, may be stored that indicates whether an area of the environment 390 associated with the cell is unobserved, occupied by an obstacle 383, or is unoccupied. An obstacle 383 may comprise an object or feature that prevents or impairs traversal by the device 110. For example, an obstacle 383 may comprise a wall, stairwell, and so forth.

The occupancy map data 1549 may be manually or automatically determined. For example, during a learning phase the user may take the device 110 on a tour of the environment 390, allowing the mapping component 1530 of the device 110 to determine the occupancy map data 1549. The user may provide input data such as tags designating a particular obstacle type, such as "furniture" or "fragile". In another example, during subsequent operation, the device 110 may generate the occupancy map data 1549 that is indicative of locations and types of obstacles such as chairs, doors, stairwells, and so forth as it moves unattended through the environment 390.

Modules described herein, such as the mapping component 1530, may provide various processing functions such as de-noising, filtering, and so forth. The mapping component 1530 may also make use of a feature component 1531 which may process data related to features, such as those discussed above in reference to FIGS. 3D-3F. Processing of sensor data 1547, such as image data from a camera 312, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1547. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1547 or other data. For example, the ANN may be trained using a supervised learning algorithm such that object identifiers are associated with images of particular objects within training images provided to the ANN. Once trained, the ANN may be provided with the sensor data 1547 and produce output indicative of the object identifier.

A navigation map component 1535 uses the occupancy map data 1549 as input to generate a navigation map as represented by navigation map data 1550. For example, the navigation map component 1535 may produce the navigation map data 1550 by inflating or enlarging the apparent size of obstacles 383 as indicated by the occupancy map data 1549.

An autonomous navigation component 1536 provides the device 110 with the ability to navigate within the environment 390 without real-time human interaction. The autonomous navigation component 1536 may implement, or operate in conjunction with, the mapping component 1530 to determine one or more of the occupancy map data 1549, the navigation map data 1550, or other representations of the environment 390.

The device 110 autonomous navigation component 1536 may generate path plan data 1552 that is indicative of a path through the environment 390 from the current location to a destination location. The device 110 may then begin moving along the path.

While moving along the path, the device 110 may assess the environment 390 and update or change the path as appropriate. For example, if an obstacle 383 appears in the path, the mapping component 1530 may determine the presence of the obstacle 383 as represented in the occupancy map data 1549 and navigation map data 1550. The now updated navigation map data 1550 may then be used to plan an alternative path to the destination location.

The device 110 may utilize one or more task components 1541. The task component 1541 comprises instructions that, when executed, provide one or more functions. The task components 1541 may perform functions such as finding a user, following a user, present output on output devices of the device 110, perform sentry tasks by moving the device 110 through the environment 390 to determine the presence of unauthorized people, and so forth.

The device 110 includes one or more output devices, such as one or more of a motor, light, speaker, display, projector, printer, and so forth. One or more output devices may be used to provide output during operation of the device 110.

The device 110 may use the network interfaces 1519 to connect to network(s) 199. For example, the network(s) 199 may comprise a wireless local area network, that in turn is connected to a wide area network such as the Internet.

The device 110 may be configured to dock or connect to a docking station. The docking station may also be connected to the network(s) 199. For example, the docking station may be configured to connect to the network(s) 199 (e.g., wireless local area network) such that the docking station and the device 110 may communicate. The docking station may provide external power which the device 110 may use to charge a battery of the device 110.

The device 110 may access one or more servers of the system(s) 120 via the network(s) 199. For example, the device 110 may utilize a wakeword detection component to determine if the user is addressing a request to the device 110. The wakeword detection component may hear a specified word or phrase and transition the device 110 or portion thereof to the wake operating mode. Once in the wake operating mode, the device 110 may then transfer at least a portion of the audio spoken by the user to one or more servers for further processing. The servers may process the spoken audio and return to the device 110 data that may be subsequently used to operate the device 110.

The device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomously motile devices may use the systems and techniques described herein. For example, the device 110 may comprise an autonomous ground vehicle that is moving on a street, an autonomous aerial vehicle in the air, autonomous marine vehicle, and so forth.

The device 110 may include one or more batteries (not shown) to provide electrical power suitable for operating the components in the device 110. In some implementations other devices may be used to provide electrical power to the device 110. For example, power may be provided by wireless power transfer, capacitors, fuel cells, storage flywheels, and so forth.

One or more clocks may provide information indicative of date, time, ticks, and so forth. For example, the processor 1504 may use data from the clock to associate a particular time with an action, sensor data 1547, and so forth.

The device 110 may include one or more hardware processors 1504 (processors) configured to execute one or more stored instructions. The processors 1504 may comprise one or more cores. The processors 1504 may include microcontrollers, systems on a chip, field programmable gate arrays, digital signal processors, graphic processing units, general processing units, and so forth.

The device 110 may include one or more communication component 1540 such as input/output (I/O) interfaces 1502, network interfaces 1519, and so forth. The communication component 1540 enable the device 110, or components thereof, to communicate with other devices or components. The communication component 1540 may include one or more I/O interfaces 1502. The I/O interfaces 1502 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1502 may couple to one or more I/O devices. The I/O devices may include input devices such as one or more of a sensor 1554, keyboard, mouse, scanner, and so forth. The I/O devices may also include output devices such as one or more of a motor, light, speaker 1512, display 314, projector, printer, and so forth. In some embodiments, the I/O devices may be physically incorporated with the device 110 or may be externally placed.

The I/O interface(s) 1502 may be configured to provide communications between the device 110 and other devices such as other devices 110, docking stations, routers, access points, and so forth, for example through antenna 1510 and/or other component. The I/O interface(s) 1502 may include devices configured to couple to personal area networks (PANs), local area networks (LANs), wireless local area networks (WLANS), wide area networks (WANs), and so forth. For example, the network interfaces 1519 may include devices compatible with Ethernet, Wi-Fi, Bluetooth, Bluetooth Low Energy, ZigBee, and so forth. The device 110 may also include one or more busses 1524 or other internal communications hardware or software that allow for the transfer of data between the various modules and components of the device 110.

As shown in FIG. 15A, the device 110 includes one or more memories 1506. The memory 1506 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1506 provides storage of computer-readable instructions, data structures, program modules, and other data for the operation of the device 110. A few example functional modules are shown stored in the memory 1506, although the same functionality may alternatively be implemented in hardware, firmware, or as a system on a chip (SoC).

The memory 1506 may include at least one operating system (OS) component 1539. The OS component 1539 is configured to manage hardware resource devices such as the I/O interfaces 1502, the I/O devices, the communication component 1540, and provide various services to applications or modules executing on the processors 1504. The OS component 1539 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Washington.

Also stored in the memory 1506, or elsewhere may be a data store 1508 and one or more of the following modules. These modules may be executed as foreground applications, background tasks, daemons, and so forth. The data store 1508 may use a flat file, database, linked list, tree, executable code, script, or other data structure to store information. In some implementations, the data store 1508 or a portion of the data store 1508 may be distributed across one or more other devices including other devices 110, system(s) 120, network attached storage devices, and so forth.

A communication component 1540 may be configured to establish communication with other devices, such as other devices 110, an external server of the system(s) 120, a docking station, and so forth. The communications may be authenticated, encrypted, and so forth.

Other modules within the memory 1506 may include a safety component 1529, the mapping component 1530, the navigation map component 1535, the autonomous navigation component 1536, the one or more components 1541, a speech processing component 1537 (which may one or more components of speech processing 240), or other components. The components may access data stored within the data store 1508, including safety tolerance data 1546, sensor data 1547, inflation parameters, other data, and so forth.

The safety component 1529 may access the safety tolerance data 1546 to determine within what tolerances the device 110 may operate safely within the environment 390. For example, the safety component 1529 may be configured to stop the device 110 from moving when an extensible mast of the device 110 is extended. In another example, the safety tolerance data 1546 may specify a minimum sound threshold which, when exceeded, stops all movement of the device 110. Continuing this example, detection of sound such as a human yell would stop the device 110. In another example, the safety component 1529 may access safety tolerance data 1546 that specifies a minimum distance from an object that the device 110 is to maintain. Continuing this example, when a sensor 1554 detects an object has approached to less than the minimum distance, all movement of the device 110 may be stopped. Movement of the device 110 may be stopped by one or more of inhibiting operations of one or more of the motors, issuing a command to stop motor operation, disconnecting power from one or more the motors, and so forth. The safety component 1529 may be implemented as hardware, software, or a combination thereof.

The safety component 1529 may control other factors, such as a maximum speed of the device 110 based on information obtained by the sensors 1554, precision and accuracy of the sensor data 1547, and so forth. For example, detection of an object by an optical sensor may include some error, such as when the distance to an object comprises a weighted average between an object and a background. As a result, the maximum speed permitted by the safety component 1529 may be based on one or more factors such as the weight of the device 110, nature of the floor, distance to the object, and so forth. In the event that the maximum permissible speed differs from the maximum speed permitted by the safety component 1529, the lesser speed may be utilized.

The navigation map component 1535 uses the occupancy map data 1549 as input to generate the navigation map data 1550. The navigation map component 1535 may produce the navigation map data 1550 to inflate or enlarge the obstacles 383 indicated by the occupancy map data 1549. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the device 110, and so forth.

The speech processing component 1537 may be used to process utterances of the user. Microphones may acquire audio in the presence of the device 110 and may send audio data 211 to an acoustic front end (AFE). The AFE may transform the audio data 211 (for example, a single-channel, 16-bit audio stream sampled at 16 kHz), captured by the microphone(s), into audio feature vectors that may ultimately be used for processing by various components, such as a wakeword detection module 220, speech recognition engine, or other components. The AFE may reduce noise in the raw audio data 211. The AFE may also perform acoustic echo cancellation (AEC) or other operations to account for output audio data that may be sent to a speaker of the device 110 for output. For example, the device 110 may be playing music or other audio that is being received from network(s) 199 in the form of output audio data. To prevent the output audio interfering with the device's ability to detect and process input audio, the AFE or other component may perform echo cancellation to remove the output audio data from the input raw audio data 211, or other operations.

The AFE may divide the raw audio data 211 into frames representing time intervals for which the AFE determines a number of values (i.e., features) representing qualities of the raw audio data 602/211, along with a set of those values (i.e., a feature vector or audio feature vector) representing features/qualities of the raw audio data 602 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 211, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 602/211) may be input into a wakeword detection module 220 that is configured to detect keywords spoken in the audio. The wakeword detection module 220 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/ recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local device 110 may "wake" and begin transmitting audio data (which may include one or more of the raw audio data 602 or the audio feature vectors) to one or more server(s) of the system(s) 120 for speech processing. The audio data corresponding to audio obtained by the microphone may be processed locally on one or more of the processors 1504, sent to a server for routing to a recipient device or may be sent to the system(s) 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the device 110 before processing by the navigation map component 1535, prior to sending to the server and/or the system(s) 120, and so forth.

The speech processing component 1537 may include components such as those discussed above in reference to FIG. 2, such as speech processing component 240. For example speech processing component 1537 may include an ASR module 250, NLU module 260, or other components from a speech processing system such as TTS component 280, orchestrator 230, or the like. An ASR module may accept as input audio data 211, audio feature vectors, or other sensor data 1547 and so forth and may produce as output the input data comprising a text string or other data representation. The input data comprising the text string or other data representation may be processed by the navigation map component 1535 to determine the command to be executed. For example, the utterance of the command "robot, come here" may result in input data comprising the text string "come here". The wakeword "robot" may be omitted from the input data.

The autonomous navigation component 1536 provides the device 110 with the ability to navigate within the environment 390 without real-time human interaction. The autonomous navigation component 1536 may implement, or operate in conjunction with, the mapping component 1530 to determine the occupancy map data 1549, the navigation map data 1550, or other representation of the environment 390. In one implementation, the mapping component 1530 may use one or more simultaneous localization and mapping ("SLAM") techniques. The SLAM algorithms may utilize one or more of maps, algorithms, beacons, or other techniques to navigate. The autonomous navigation component 1536 may use the navigation map data 1550 to determine a set of possible paths along which the device 110 may move. One of these may be selected and used to determine path plan data 1552 indicative of a path. For example, a possible path that is the shortest or has the fewest turns may be selected and used to determine the path. The path is then subsequently used to determine a set of commands that drive the motors connected to the wheels. For example, the autonomous navigation component 1536 may determine the current location within the environment 390 and determine path plan data 1552 that describes the path to a destination location such as the docking station.

The autonomous navigation component 1536 may utilize various techniques during processing of sensor data 1547. For example, image data 221 obtained from cameras 312/316 on the device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The device 110 may move responsive to a determination made by an onboard processor 1504, in response to a command received from one or more network interfaces 1519, as determined from the sensor data 1547, and so forth. For example, the system(s) 120 may send a command that is received using the network interface 1519. This command may direct the device 110 to proceed to find a particular user, follow a particular user, and so forth. The device 110 may then process this command and use the autonomous navigation component 1536 to determine the directions and distances associated with carrying out the command. For example, the command to "come here" may result in a task component 1541 sending a command to the autonomous navigation component 1536 to move the device 110 to a particular location near the user and orient the device 110 in a particular direction.

The device 110 may connect to the network(s) 199 using one or more of the network interfaces 1519. In some implementations, one or more of the modules or other functions described here may execute on the processors 1504 of the device 110, on the system(s) 120, or a combination thereof. For example, the system(s) 120 may provide various functions, such as ASR, natural language understanding (NLU), providing content such as audio or video to the device 110, and so forth.

The other components may provide other functionality, such as object recognition, speech synthesis, user identification, and so forth. The other components may comprise a speech synthesis module that is able to convert text data to human speech. For example, the speech synthesis module may be used by the device 110 to provide speech that a user is able to understand.

The data store 1508 may store the other data as well. For example, localization settings may indicate local preferences such as language, user identifier data may be stored that allows for identification of a particular user, and so forth.

As shown in FIG. 15D, the device 110 may include one or more of the following sensors 1554 which may generate sensor data 1547 (such as image data 221, audio data 602, and/or other sensor data 1551). The sensors 1554 depicted here are provided by way of illustration and not necessarily as a limitation. It is understood that other sensors 1554 may be included or utilized by the device 110, while some sensors 1554 may be omitted in some configurations.

A motor encoder 1555 provides information indicative of the rotation or linear extension of a motor. The motor may comprise a rotary motor, or a linear actuator. In some implementations, the motor encoder 1555 may comprise a separate assembly such as a photodiode and encoder wheel that is affixed to the motor. In other implementations, the motor encoder 1555 may comprise circuitry configured to drive the motor. For example, the autonomous navigation component 1536 may utilize the data from the motor encoder 1555 to estimate a distance traveled.

A suspension weight sensor 1556 provides information indicative of the weight of the device 110 on the suspension system for one or more of the wheels or the caster. For example, the suspension weight sensor 1556 may comprise a switch, strain gauge, load cell, photodetector, or other sensing element that is used to determine whether weight is applied to a particular wheel, or whether weight has been removed from the wheel. In some implementations, the suspension weight sensor 1556 may provide binary data such as a "1" value indicating that there is a weight applied to the wheel, while a "0" value indicates that there is no weight applied to the wheel. In other implementations, the suspension weight sensor 1556 may provide an indication such as so many kilograms of force or newtons of force. The suspension weight sensor 1556 may be affixed to one or more of the wheels or the caster. In some situations, the safety component 1529 may use data from the suspension weight sensor 1556 to determine whether or not to inhibit operation of one or more of the motors. For example, if the suspension weight sensor 1556 indicates no weight on the suspension, the implication is that the device 110 is no longer resting on its wheels, and thus operation of the motors may be inhibited. In another example, if the suspension weight sensor 1556 indicates weight that exceeds a threshold value, the implication is that something heavy is resting on the device 110 and thus operation of the motors may be inhibited.

One or more bumper switches 1557 provide an indication of physical contact between a bumper or other member that is in mechanical contact with the bumper switch 1557. The safety component 1529 utilizes sensor data 1547 obtained by the bumper switches 1557 to modify the operation of the device 110. For example, if the bumper switch 1557 associated with a front of the device 110 is triggered, the safety component 1529 may drive the device 110 backwards.

A floor optical motion sensor 1558 provides information indicative of motion of the device 110 relative to the floor or other surface underneath the device 110. In one implementation, the floor optical-motion sensors 1558 may comprise a light source such as light-emitting diode (LED), an array of photodiodes, and so forth. In some implementations, the floor optical-motion sensors 1558 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1558 may provide other information, such as data indicative of a pattern present on the floor, composition of the floor, color of the floor, and so forth. For example, the floor optical-motion sensors 1558 may utilize an optoelectronic sensor that may detect different colors or shades of gray, and this data may be used to generate floor characterization data. The floor characterization data may be used for navigation.

An ultrasonic sensor 1559 utilizes sounds in excess of 20 kHz to determine a distance from the sensor 1554 to an object. The ultrasonic sensor 1559 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1559 may provide information indicative of a presence of an object, distance to the object, and so forth. Two or more ultrasonic sensors 1559 may be utilized in conjunction with one another to determine a location within a two-dimensional plane of the object.

In some implementations, the ultrasonic sensor 1559 or a portion thereof may be used to provide other functionality. For example, the emitter of the ultrasonic sensor 1559 may be used to transmit data and the detector may be used to receive data transmitted that is ultrasonic sound. In another example, the emitter of an ultrasonic sensor 1559 may be set to a particular frequency and used to generate a particular waveform such as a sawtooth pattern to provide a signal that is audible to an animal, such as a dog or a cat.

An optical sensor 1560 may provide sensor data 1547 indicative of one or more of a presence or absence of an object, a distance to the object, or characteristics of the object. The optical sensor 1560 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1560 may utilize one or more sensing elements. For example, the optical sensor 1560 may comprise a 4×4 array of light sensing elements. Each individual sensing element may be associated with a field of view that is directed in a different way. For example, the optical sensor 1560 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 1554 such as an image sensor or camera 312. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1560 may operate as a depth camera, providing a two-dimensional image of a scene, as well as data that indicates a distance to each pixel.

Data from the optical sensors 1560 may be utilized for collision avoidance. For example, the safety component 1529 and the autonomous navigation component 1536 may utilize the sensor data 1547 indicative of the distance to an object in order to prevent a collision with that object.

Multiple optical sensors 1560 may be operated such that their field-of-view overlap at least partially. To minimize or eliminate interference, the optical sensors 1560 may selectively control one or more of the timing, modulation, or frequency of the light emitted. For example, a first optical sensor 1560 may emit light modulated at 30 kHz while a second optical sensor 1560 emits light modulated at 33 kHz.

A lidar 1561 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1547 may be generated that is indicative of the presence of objects and the relative positions, shapes, and so forth that are visible to the lidar 1561. Data from the lidar 1561 may be used by various modules. For example, the autonomous navigation component 1536 may utilize point cloud data generated by the lidar 1561 for localization of the device 110 within the environment 390.

The device 110 may include a mast. A mast position sensor 1562 provides information indicative of a position of the mast of the device 110. For example, the mast position sensor 1562 may comprise limit switches associated with the mast extension mechanism that indicate whether the mast is at an extended or retracted position. In other implementations, the mast position sensor 1562 may comprise an optical code on at least a portion of the mast that is then interrogated by an optical emitter and a photodetector to determine the distance to which the mast is extended. In another implementation, the mast position sensor 1562 may comprise an encoder wheel that is attached to a mast motor that is used to raise or lower the mast. The mast position sensor 1562 may provide data to the safety component 1529. For example, if the device 110 is preparing to move, data from the mast position sensor 1562 may be checked to determine if the mast is retracted, and if not, the mast may be retracted prior to beginning movement.

A mast strain sensor 1563 provides information indicative of a strain on the mast with respect to the remainder of the device 110. For example, the mast strain sensor 1563 may comprise a strain gauge or load cell that measures a side-load applied to the mast or a weight on the mast or downward pressure on the mast. The safety component 1529 may utilize sensor data 1547 obtained by the mast strain sensor 1563. For example, if the strain applied to the mast exceeds a threshold amount, the safety component 1529 may direct an audible and visible alarm to be presented by the device 110.

The device 110 may include a modular payload bay. A payload weight sensor 1565 provides information indicative of the weight associated with the modular payload bay. The payload weight sensor 1565 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1565 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1565 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1529 may utilize the payload weight sensor 1565 to determine if the modular payload bay has been overloaded. If so, an alert or notification may be issued.

One or more device temperature sensors 1566 may be utilized by the device 110. The device temperature sensors 1566 provide temperature data of one or more components within the device 110. For example, a device temperature sensor 1566 may indicate a temperature of one or more the batteries, one or more motors, and so forth. In the event the temperature exceeds a threshold value, the component associated with that device temperature sensor 1566 may be shut down.

One or more interlock sensors 1567 may provide data to the safety component 1529 or other circuitry that prevents the device 110 from operating in an unsafe condition. For example, the interlock sensors 1567 may comprise switches that indicate whether an access panel is open. The interlock sensors 1567 may be configured to inhibit operation of the device 110 until the interlock switch indicates a safe condition is present.

An inertial measurement unit (IMU) 1580 may include a plurality of gyroscopes 1581 and accelerometers 1582 arranged along different axes. The gyroscope 1581 may provide information indicative of rotation of an object affixed thereto. For example, a gyroscope 1581 may generate sensor data 1547 that is indicative of a change in orientation of the device 110 or a portion thereof.

The accelerometer 1582 provides information indicative of a direction and magnitude of an imposed acceleration. Data such as rate of change, determination of changes in direction, speed, and so forth may be determined using the accelerometer 1582. The accelerometer 1582 may comprise mechanical, optical, micro-electromechanical, or other devices. For example, the gyroscope 1581 in the accelerometer 1582 may comprise a prepackaged solid-state unit.

A magnetometer 1568 may be used to determine an orientation by measuring ambient magnetic fields, such as the terrestrial magnetic field. For example, the magnetometer 1568 may comprise a Hall effect transistor that provides output compass data indicative of a magnetic heading.

The device 110 may include one or more location sensors 1569. The location sensors 1569 may comprise an optical, radio, or other navigational system such as a global positioning system (GPS) receiver. For indoor operation, the location sensors 1569 may comprise indoor position systems, such as using Wi-Fi Positioning Systems (WPS). The location sensors 1569 may provide information indicative of a relative location, such as "living room" or an absolute location such as particular coordinates indicative of latitude and longitude, or displacement with respect to a predefined origin.

A photodetector 1570 provides sensor data 1547 indicative of impinging light. For example, the photodetector 1570 may provide data indicative of a color, intensity, duration, and so forth.

A camera 312 generates sensor data 1547 indicative of one or more images. The camera 312 may be configured to detect light in one or more wavelengths including, but not limited to, terahertz, infrared, visible, ultraviolet, and so forth. For example, an infrared camera 312 may be sensitive to wavelengths between approximately 700 nanometers and 1 millimeter. The camera 312 may comprise charge coupled devices (CCD), complementary metal oxide semiconductor (CMOS) devices, microbolometers, and so forth. The device 110 may use image data acquired by the camera 312 for object recognition, navigation, collision avoidance, user communication, and so forth. For example, a pair of cameras 312 sensitive to infrared light may be mounted on the front of the device 110 to provide binocular stereo vision, with the sensor data 1547 comprising images being sent to the autonomous navigation component 1536. In another example, the camera 312 may comprise a 10 megapixel or greater camera that is used for videoconferencing or for acquiring pictures for the user.

The camera 312 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 312, particularly those associated with navigation or autonomous operation, may utilize a global shutter. In other implementations, the camera(s) 312 providing images for use by the autonomous navigation component 1536 may be acquired using a rolling shutter and subsequently may be processed to mitigate image artifacts.

One or more microphones 311 may be configured to acquire information indicative of sound present in the environment 390. In some implementations, arrays of microphones 311 may be used. These arrays may implement beamforming techniques to provide for directionality of gain. The device 110 may use the one or more microphones 311 to acquire information from acoustic tags, accept voice input from users, determine a direction of an utterance, determine ambient noise levels, for voice communication with another user or system, and so forth.

An air pressure sensor 1572 may provide information indicative of an ambient atmospheric pressure or changes in ambient atmospheric pressure. For example, the air pressure sensor 1572 may provide information indicative of changes in air pressure due to opening and closing of doors, weather events, and so forth.

An air quality sensor 1573 may provide information indicative of one or more attributes of the ambient atmosphere. For example, the air quality sensor 1573 may include one or more chemical sensing elements to detect the presence of carbon monoxide, carbon dioxide, ozone, and so forth. In another example, the air quality sensor 1573 may comprise one or more elements to detect particulate matter in the air, such as the photoelectric detector, ionization chamber, and so forth. In another example, the air quality sensor 1573 may include a hygrometer that provides information indicative of relative humidity.

An ambient light sensor 1574 may comprise one or more photodetectors or other light-sensitive elements that are used to determine one or more of the color, intensity, or duration of ambient lighting around the device 110.

An ambient temperature sensor 1575 provides information indicative of the temperature of the ambient environment 390 proximate to the device 110. In some implementations, an infrared temperature sensor may be utilized to determine the temperature of another object at a distance.

A floor analysis sensor 1576 may include one or more components that are used to generate at least a portion of floor characterization data. In one implementation, the floor analysis sensor 1576 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1576 may be used by one or more of the safety component 1529, the autonomous navigation component 1536, the task component 1541, and so forth. For example, if the floor analysis sensor 1576 determines that the floor is wet, the safety component 1529 may decrease the speed of the device 110 and generate a notification alerting the user.

The floor analysis sensor 1576 may include other components as well. For example, a coefficient of friction sensor may comprise a probe that comes into contact with the surface and determines the coefficient of friction between the probe and the floor.

A caster rotation sensor 1577 provides data indicative of one or more of a direction of orientation, angular velocity, linear speed of the caster, and so forth. For example, the caster rotation sensor 1577 may comprise an optical encoder and corresponding target that is able to determine that the caster transitioned from an angle of 0° at a first time to 49° at a second time.

The sensors 1554 may include a radar 1578. The radar 1578 may be used to provide information as to a distance, lateral position, and so forth, to an object.

The sensors 1554 may include a passive infrared (PIR) sensor 1564. The PIR 1564 sensor may be used to detect the presence of users, pets, hotspots, and so forth. For example, the PIR sensor 1564 may be configured to detect infrared radiation with wavelengths between 8 and 14 micrometers.

The device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 390 to provide landmarks for the autonomous navigation component 1536. One or more touch sensors may be utilized to determine contact with a user or other objects.

The device 110 may include one or more output devices. A motor (not shown) may be used to provide linear or rotary motion. A light 358 may be used to emit photons. A speaker 1512 may be used to emit sound. A display 314 may comprise one or more of a liquid crystal display, light emitting diode display, electrophoretic display, cholesteric liquid crystal display, interferometric display, and so forth. The display 314 may be used to present visible information such as graphics, pictures, text, and so forth. In some implementations, the display 314 may comprise a touchscreen that combines a touch sensor and a display 314.

In some implementations, the device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the device 110 may include a haptic output device that provides output that produces particular touch sensations to the user. Continuing the example, a motor with an eccentric weight may be used to create a buzz or vibration to allow the device 110 to simulate the purr of a cat.

As noted above, multiple devices may be employed in a single system. In such a multi-device system, each of the devices may include different components for performing different aspects of the system's processing. The multiple devices may include overlapping components. The components of the device 110 and/or the system(s) 120 as described herein, are illustrative, and may be located as a stand-alone device or may be included, in whole or in part, as a component of a larger device or system.

Various machine learning techniques may be used to train models or other computer components used in the present system For example, machine learning techniques may be used with regard to user recognition 295, system directed input detector 285, sentiment detection 275, image processing 245, speech processing 240, TTS 280, angle determination component 640, beamformers (e.g., FBF 608*a*-*n*, such as in creating the weight values of the covariance matrix), beam selector 624, etc. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. In particular, CRFs are a type of discriminative undirected probabilistic graphical models and may predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves may be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

As illustrated in FIG. 17, multiple devices (110*a*-110*g* and 120) may contain components of the system and the devices may be connected over a network(s) 199. The network(s) 199 may include a local or private network or may include a wide network such as the Internet. Devices may be connected to the network(s) 199 through either wired or wireless connections. As illustrated in FIG. 17, a tablet computer 110*a*, a smart phone 110*b*, a smart watch 110*c*, speech-detection device(s) with a display 110*d*, speech-detection device(s) 110*e*, input/output (I/O) limited device 110*f*, and/or a motile device 110*g* (e.g., device capable of autonomous motion) may be connected to the network(s) 199 through a wired and/or wireless connection. For example, the devices 110 may be connected to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like.

Other devices are included as network-connected support devices, such as the system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component, etc. of the system(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving a plurality of audio signals from a microphone array of a device;
performing beamforming using the plurality of audio signals to determine:
first audio data corresponding to a first direction relative to the device, and
second audio data corresponding to a second direction relative to the device, the second direction different from the first direction;
determining first signal quality data corresponding to the first audio data;
determining second signal quality data corresponding to the second audio data;
based at least in part on the first signal quality data and the second signal quality data, determining a first confidence value representing a likelihood that a user is positioned in the first direction relative to the device;
receiving first image data from at least one image capture component of a device;
processing the first image data to determine a second confidence value corresponding to a likelihood that the user is positioned in a second direction relative to the device;
determining, based at least in part on the first direction and the first confidence value, first adjusted position data;
determining based at least in part on the second direction and the second confidence value, second adjusted position data;
determining, based at least in part on the first confidence value and the second confidence value, third adjusted position data;
based at least in part on the first adjusted position data, the second adjusted position data and third adjusted position data, determining that the user is positioned in the second direction relative to the device; and
causing speech processing to be performed using the second audio data.

2. The computer-implemented method of claim 1, further comprising:
determining, using the first image data, that a face is represented in the first image data and a score associated with the face;
determining that the face corresponds to the second direction relative to the device; and
determining the second confidence value using the score.

3. The computer-implemented method of claim 1, further comprising, after causing speech processing to be performed using the second audio data:
receiving second image data from the at least one image capture component, the second image data representing a later time than the first image data;
processing the second image data to determine a third confidence value corresponding to a likelihood the user is positioned in a third direction relative to the device during the later time, the third direction different from the second direction and the first direction;
based at least in part on the third confidence value, determining that the user is positioned in the third direction at the later time;
determining third audio data corresponding to the third direction at the later time; and
causing further speech processing to be performed using the third audio data.

4. The computer-implemented method of claim 1, wherein:
the first confidence value comprises first variance data;
the second confidence value comprises second variance data; and
the method further comprises:
determining first data representing a first angle representing the first direction,
multiplying the first variance data by the first data to determine the first adjusted position data,
determining second data representing a second angle representing the second direction,
multiplying the second variance data by the second data to determine the second adjusted position data,
based at least in part on the first signal quality data and the second signal quality data, determining third variance data representing a likelihood a user is positioned in the second direction relative to the device,
multiplying the third variance data by the second data to determine the third adjusted position data,
determining a value by summing the first adjusted position data, the second adjusted position data and the third adjusted position data, and
using the value to determine that the user is positioned in the second direction relative to the device.

5. A computer-implemented method, comprising:
receiving a plurality of audio signals from a microphone array of a device;
based at least in part on the plurality of audio signals, determining first data corresponding to a first estimated position of a user, the first estimated position corresponding to a first direction relative to the device;
based at least in part on the plurality of audio signals, determining a first confidence value corresponding to the first data;
receiving sensor data corresponding to a sensor of the device;
based at least in part on the sensor data, determining second data corresponding to a second estimated position of the user;
based at least in part on the sensor data, determining a second confidence value corresponding to the second data;
based at least in part on the first confidence value and the first direction, determining first adjusted position data;
based at least in part on the second confidence value and the second estimated position, determining second adjusted position data;
based at least in part on the first adjusted position data and the second adjusted position data, determining a third estimated position of the user;
performing beamforming using the plurality of audio signals to determine first audio data corresponding to the third estimated position of the user; and determining output data corresponding to the third estimated position of the user.

6. The computer-implemented method of claim 5, wherein:
the sensor comprises an image capture component;
the sensor data comprises image data; and
the method further comprises:
  processing the image data to determine a representation of a face; and
  determining the face corresponds to the second estimated position of the user, wherein the second confidence value corresponds to a confidence the face is represented in the image data.

7. The computer-implemented method of claim 5, wherein:
the sensor comprises an image capture component;
the sensor data comprises image data; and
the method further comprises:
  processing the image data to determine a representation of a face; and
  processing at least a portion of the plurality of audio signals to determine an utterance, wherein the second confidence value corresponds to a confidence that the face corresponds to a speaker of the utterance.

8. The computer-implemented method of claim 5, further comprising:
prior to performing the beamforming, performing second beamforming using the plurality of audio signals to determine:
  first audio data corresponding to the first direction relative to the device, and second audio data corresponding to a second direction relative to the device;
  first signal quality data corresponding to the first audio data;
  second signal quality data corresponding to the second audio data; and
  based at least in part on the first signal quality data and the second signal quality data, the first confidence value.

9. The computer-implemented method of claim 5, wherein the output data includes the first audio data.

10. The computer-implemented method of claim 5, further comprising:
sending the first audio data to a speech processing component; and
sending the output data to a component configured to determine a position of a user.

11. The computer-implemented method of claim 5, further comprising, after determination of the first audio data:
receiving second sensor data from the sensor of the device, the second sensor data representing a later time than the sensor data;
processing the second sensor data to determine a third confidence value corresponding to a likelihood the user is at a fourth estimated position different from the third estimated position;
based at least in part on the third confidence value, determining that the user is positioned at the fourth estimated position at the later time; and
determining second output data corresponding to the fourth estimated position at the later time.

12. The computer-implemented method of claim 5, wherein:
the first confidence value comprises first variance data;
the second confidence value comprises second variance data; and
the method further comprises:
  determining first angle data representing a first angle representing the first direction,
  multiplying the first variance data by the first angle data to determine the first adjusted position data,
  determining second angle data representing a second angle corresponding to the second estimated position,
  multiplying the second variance data by the second angle data to determine the second adjusted position data,
  determining a value by summing at least the first adjusted position data and the second adjusted position data, and
  using the value to determine the third estimated position of the user.

13. A system comprising:
a plurality of microphones;
at least one processor; and
at least one memory including instructions that, when executed by the at least one processor, cause the system to:
  receive a plurality of audio signals from a microphone array of a device;
  based at least in part on the plurality of audio signals, determine first data corresponding to a first estimated position of a user, the first estimated position corresponding to a first direction relative to the device;
  based at least in part on the plurality of audio signals, determine a first confidence value corresponding to the first data;
  receive sensor data corresponding to a sensor of the device;
  based at least in part on the sensor data, determine second data corresponding to a second estimated position of the user;
  based at least in part on the sensor data, determine a second confidence value corresponding to the second data;
  based at least in part on the first confidence value and the first direction, determine a first adjusted position data;
  based at least in part on the second confidence value and the second estimated position, determine a second adjusted position data;
  based at least in part on the first adjusted position data and the second adjusted position data, determine a third estimated position of the user;
  perform beamforming using the plurality of audio signals to determine first audio data corresponding to the third estimated position of the user; and
  determine output data corresponding to the third estimated position of the user.

14. The system of claim 13, wherein:
the sensor comprises an image capture component;
the sensor data comprises image data; and
the at least one memory further comprises instructions that, when executed by the at least one processor, further cause the system to:
  process the image data to determine a representation of a face; and
  determine the face corresponds to the second estimated position of the user, wherein the second confidence value corresponds to a confidence the face is represented in the image data.

15. The system of claim 13, wherein:

the sensor comprises an image capture component;

the sensor data comprises image data; and the at least one memory further comprises instructions that, when executed by the at least one processor, further cause the system to:
- process the image data to determine a representation of a face; and
- process at least a portion of the plurality of audio signals to determine an utterance, wherein the second confidence value corresponds to a confidence that the face corresponds to a speaker of the utterance.

16. The system of claim 13, wherein the at least one memory further comprises instructions that, when executed by the at least one processor, further cause the system to:
- prior to performing the beamforming, perform second beamforming using the plurality of audio signals to determine:
  - first audio data corresponding to the first direction relative to the device, and second audio data corresponding to a second direction relative to the device;
  - first signal quality data corresponding to the first audio data;
  - second signal quality data corresponding to the second audio data; and
  - based at least in part on the first signal quality data and the second signal quality data, the first confidence value.

17. The system of claim 13, wherein the output data includes the first audio data.

18. The system of claim 13, wherein the at least one memory further comprises instructions that, when executed by the at least one processor, further cause the system to:
- send the first audio data to a speech processing component; and
- send the output data to a component configured to determine a position of a user.

19. The system of claim 13, wherein the at least one memory further comprises instructions that, when executed by the at least one processor, further cause the system to, after determination of the first audio data:
- receive second sensor data from the sensor of the device, the second sensor data representing a later time than the sensor data;
- process the second sensor data to determine a third confidence value corresponding to a likelihood the user is at a fourth estimated position different from the third estimated position;
- based at least in part on the third confidence value, determine that the user is positioned at the fourth estimated position at the later time; and
- determine second output data corresponding to the fourth estimated position at the later time.

20. The system of claim 13, wherein:

the first confidence value comprises first variance data;

the second confidence value comprises second variance data; and the at least one memory further comprises instructions that, when executed by the at least one processor, further cause the system to:
- determine first angle data representing a first angle representing the first direction,
- multiply the first variance data by the first angle data to determine the first adjusted position data,
- determine second angle data representing a second angle corresponding to the second estimated position,
- multiply the second variance data by the second angle data to determine the second adjusted position data,
- determine a value by summing at least the first adjusted position data and the second adjusted position data, and
- use the value to determine the third estimated position of the user.

* * * * *